(12) United States Patent
Sung et al.

(10) Patent No.: US 10,698,892 B2
(45) Date of Patent: Jun. 30, 2020

(54) ORDER-INDEPENDENT MULTI-RECORD HASH GENERATION AND DATA FILTERING

(71) Applicant: SAP SE, Walldorf (DE)

(72) Inventors: Nosub Sung, Seoul (KR); Myunggon Park, Seoul (KR); Taehyung Lee, Seoul (KR); Chul Won Lee, Seoul (KR); Juchang Lee, Seoul (KR); Sung Heun Wi, Seongnam (KR)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/950,013

(22) Filed: Apr. 10, 2018

(65) Prior Publication Data

US 2019/0311057 A1    Oct. 10, 2019

(51) Int. Cl.
   *G06F 15/16* (2006.01)
   *G06F 16/2453* (2019.01)
   *G06F 16/14* (2019.01)
   *G06F 16/2455* (2019.01)

(52) U.S. Cl.
   CPC ...... *G06F 16/24542* (2019.01); *G06F 16/152* (2019.01); *G06F 16/24552* (2019.01)

(58) Field of Classification Search
   None
   See application file for complete search history.

(56) References Cited

U.S. PATENT DOCUMENTS

| | | | |
|---|---|---|---|
| 6,086,617 A | 7/2000 | Waldon et al. | |
| 7,168,065 B1 | 1/2007 | Naccache et al. | |
| 7,305,421 B2 | 12/2007 | Cha et al. | |
| 7,930,274 B2 | 4/2011 | Hwang et al. | |
| 8,046,334 B2 | 10/2011 | Hwang et al. | |
| 8,442,962 B2 | 5/2013 | Lee et al. | |
| 8,504,691 B1 | 8/2013 | Tobler | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |

(Continued)

OTHER PUBLICATIONS

"Concurrency Control: Locking, Optimistic, Degrees of Consistency," retrieved from https://people.eecs.berkeley.edu/~brewer/cs262/cc.pdf, on or before Sep. 2017, 6 pages.

(Continued)

*Primary Examiner* — Alex Gofman
(74) *Attorney, Agent, or Firm* — Klarquist Sparkman, LLP

(57) ABSTRACT

A process is provided for independently hashing and filtering a data set, such as during preprocessing. For the data set, one or more records, separately having one or more fields, may be identified. A record hash value set, containing one or more record hash values for the respective one or more records, may be generated. Generating a given record hash value may be accomplished as follows. For a given record, a hash value set may be generated, having one or more field hash values for the respective one or more fields of the given record. The record hash value for the given record may be generated based on the hash value set. A total hash value for the data set may be generated based on the record hash value set. The records of the data set may be filtered based on classification of the query that generated the records.

18 Claims, 40 Drawing Sheets

(56) References Cited

U.S. PATENT DOCUMENTS

| | | |
|---|---|---|
| 8,880,508 B2 | 11/2014 | Jeong et al. |
| 8,918,436 B2 | 12/2014 | Yoon et al. |
| 8,935,205 B2 | 1/2015 | Hildenbrand et al. |
| 9,009,182 B2 | 4/2015 | Renkes et al. |
| 9,037,677 B2 | 5/2015 | Lee et al. |
| 9,063,969 B2 | 6/2015 | Lee et al. |
| 9,098,522 B2 | 8/2015 | Lee et al. |
| 9,119,056 B2 | 8/2015 | Hourani et al. |
| 9,165,010 B2 | 10/2015 | Faerber et al. |
| 9,171,020 B2 | 10/2015 | Faerber et al. |
| 9,336,262 B2 | 5/2016 | Lee et al. |
| 9,336,284 B2 | 5/2016 | Lee et al. |
| 9,361,340 B2 | 6/2016 | Jeong et al. |
| 9,465,829 B2 | 10/2016 | Faerber et al. |
| 9,465,843 B2 | 10/2016 | Yoon et al. |
| 9,465,844 B2 | 10/2016 | Faerber et al. |
| 9,483,516 B2 | 11/2016 | Lee et al. |
| 9,501,502 B2 | 11/2016 | Lee et al. |
| 9,558,229 B2 | 1/2017 | Lee et al. |
| 9,558,258 B2 | 1/2017 | Yoon et al. |
| 9,594,799 B2 | 3/2017 | Faerber et al. |
| 9,619,514 B2 | 4/2017 | Mindnich et al. |
| 9,635,093 B2 | 4/2017 | Lee et al. |
| 9,720,949 B2 | 8/2017 | Lee et al. |
| 9,720,992 B2 | 8/2017 | Lee et al. |
| 9,740,715 B2 | 8/2017 | Faerber et al. |
| 9,792,318 B2 | 10/2017 | Schreter et al. |
| 9,798,759 B2 | 10/2017 | Schreter et al. |
| 9,805,074 B2 | 10/2017 | Lee et al. |
| 9,824,134 B2 | 11/2017 | Schreter et al. |
| 9,846,724 B2 | 12/2017 | Weyerhaeuser et al. |
| 9,892,163 B2 | 2/2018 | Kim et al. |
| 2002/0015829 A1 | 2/2002 | Faerber et al. |
| 2002/0191797 A1 | 12/2002 | Perlman et al. |
| 2003/0061537 A1 | 3/2003 | Cha et al. |
| 2005/0099960 A1 | 5/2005 | Boss et al. |
| 2005/0262512 A1 | 11/2005 | Schmidt et al. |
| 2008/0033914 A1 | 2/2008 | Cherniack et al. |
| 2008/0091806 A1 | 4/2008 | Shen |
| 2008/0097960 A1 | 4/2008 | Dias |
| 2008/0065670 A1 | 5/2008 | Cha et al. |
| 2009/0070330 A1 | 3/2009 | Hwang et al. |
| 2009/0254774 A1 | 10/2009 | Chamdani |
| 2010/0205323 A1 | 8/2010 | Barsness et al. |
| 2011/0161300 A1 | 6/2011 | Hwang et al. |
| 2011/0276550 A1 | 11/2011 | Colle |
| 2012/0084273 A1 | 4/2012 | Lee et al. |
| 2012/0084274 A1 | 4/2012 | Renkes et al. |
| 2012/0150913 A1 | 6/2012 | De Smet et al. |
| 2012/0166407 A1 | 6/2012 | Lee et al. |
| 2012/0167098 A1 | 6/2012 | Lee et al. |
| 2012/0173515 A1 | 7/2012 | Jeong et al. |
| 2012/0216244 A1 | 8/2012 | Kumar et al. |
| 2012/0221519 A1 | 8/2012 | Papadomanolakis |
| 2013/0042003 A1 | 2/2013 | Franco et al. |
| 2013/0124475 A1 | 5/2013 | Hildenbrand et al. |
| 2013/0144866 A1 | 6/2013 | Jerzak |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0275457 A1 | 10/2013 | Lee et al. |
| 2013/0275467 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0052726 A1* | 2/2014 | Amberg ............... G06F 16/244 707/737 |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerbert et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0222418 A1 | 8/2014 | Richtarsky et al. |
| 2014/0244628 A1 | 8/2014 | Yoon et al. |
| 2014/0297686 A1 | 10/2014 | Lee et al. |
| 2014/0304219 A1 | 10/2014 | Yoon et al. |
| 2015/0026154 A1 | 1/2015 | Jeong et al. |
| 2015/0074082 A1 | 3/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149442 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2015/0347410 A1 | 12/2015 | Kim et al. |
| 2015/0363463 A1 | 12/2015 | Mindnich et al. |
| 2016/0004786 A1 | 1/2016 | Bosman et al. |
| 2016/0042016 A1 | 2/2016 | Faerber et al. |
| 2016/0042028 A1 | 2/2016 | Faerber et al. |
| 2016/0140175 A1 | 5/2016 | Weyerhaeuser et al. |
| 2016/0147617 A1 | 5/2016 | Lee et al. |
| 2016/0147618 A1 | 5/2016 | Lee et al. |
| 2016/0147813 A1 | 5/2016 | Lee et al. |
| 2016/0147814 A1 | 5/2016 | Goel et al. |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter et al. |
| 2016/0147862 A1 | 5/2016 | Schreter et al. |
| 2016/0147906 A1 | 5/2016 | Schreter |
| 2016/0292227 A1 | 10/2016 | Jeong et al. |
| 2016/0350394 A1* | 12/2016 | Gaumnitz ............ G06F 16/285 |
| 2016/0364440 A1 | 12/2016 | Lee et al. |
| 2016/0371319 A1 | 12/2016 | Park et al. |
| 2016/0371356 A1 | 12/2016 | Lee et al. |
| 2016/0371357 A1 | 12/2016 | Park et al. |
| 2016/0371358 A1 | 12/2016 | Lee et al. |
| 2016/0378813 A1 | 12/2016 | Yoon et al. |
| 2016/0378826 A1 | 12/2016 | Bensberg et al. |
| 2017/0004158 A1 | 1/2017 | Faerber et al. |
| 2017/0004177 A1 | 1/2017 | Faerber et al. |
| 2017/0068608 A1 | 3/2017 | Covell et al. |
| 2017/0083538 A1 | 3/2017 | Tonder et al. |
| 2017/0097977 A1 | 4/2017 | Yoon et al. |
| 2017/0123877 A1 | 5/2017 | Gongloor et al. |
| 2017/0147628 A1 | 5/2017 | Park et al. |
| 2017/0147638 A1 | 5/2017 | Park et al. |
| 2017/0147639 A1 | 5/2017 | Lee et al. |
| 2017/0147644 A1 | 5/2017 | Lee et al. |
| 2017/0147645 A1 | 5/2017 | Song et al. |
| 2017/0147646 A1 | 5/2017 | Lee et al. |
| 2017/0147671 A1 | 5/2017 | Bensberg et al. |
| 2017/0177658 A1 | 6/2017 | Lee et al. |
| 2017/0177697 A1 | 6/2017 | Lee et al. |
| 2017/0177698 A1 | 6/2017 | Lee et al. |
| 2017/0185642 A1 | 6/2017 | Faerber et al. |
| 2017/0322972 A1 | 11/2017 | Lee et al. |
| 2017/0329835 A1 | 11/2017 | Lee et al. |
| 2017/0351718 A1 | 12/2017 | Faerber et al. |
| 2017/0357575 A1 | 12/2017 | Lee et al. |
| 2017/0357576 A1 | 12/2017 | Lee et al. |
| 2017/0357577 A1 | 12/2017 | Lee et al. |
| 2018/0013692 A1 | 1/2018 | Park et al. |
| 2018/0074919 A1 | 3/2018 | Lee et al. |
| 2018/0075083 A1 | 3/2018 | Lee et al. |

OTHER PUBLICATIONS

"Database SQL Language Reference. Types of SQL Statements," retrieved from https://docs.oracle.com/cd/B19306_01/server.102/b14200/statements_1001.htm, on or before Apr. 18, 2016, 4 pages.

"Explain Plan," retrieved from https://help.sap.com/viewer/4fe29514fd584807ac9f2a04f6754767/2.0.00/en-US/

(56) References Cited

OTHER PUBLICATIONS

20d9ec5575191014a251e58ecf90997a.html, on Apr. 18, 2016, 5 pages.
"Oracle Database 11g: The Top New Features for DBAs and Developers—Database Replay," retrieved from http://www.oracle.com/technetwork/articles/sql/11g-replay-099279.html on Apr. 22, 2016, 11 pages.
"Performance Trace Options," retrieved from https://help.sap.com/doc/bed8c14f9f024763b0777aa72b5436f6/2.0.00/en-US/80dcc904a81547a69a7e7105f77e0e91.html, on Apr. 18, 2016, 1 page.
"Relay Server logging and SAP Passports," retrieved from http://dcx.sybase.com/sa160/fr/relayserver/rs-sap-passport-support.html, on Apr. 18, 2016, 1 page.
"SAP Cloud Computing," retrieved from http://computing1501.rssing.com/chan-8466524/all_p7.html, on Apr. 12, 2016, 67 pages.
"SAP Controls Technology Part 3," retrieved from http://www.itpsap.com/blog/2012/06/23/sap-controls-technology-part-3/, on Apr. 18, 2016, 4 pages.
"SAP HANA SPS 09—What's New?," retrieved from https://www.slideshare.net/SAPTechnology/sap-hana-sps-09-smart-data-streaming, Nov. 2014, 44 pages.
"SQL Statements in SAP HANA," retrieved from http://sapstudent.com/hana/sql-statements-in-sap-hana, on Apr. 18, 2016, 3 pages.
"Stop and Start a Database Service," retrieved from https://help.sap.com/doc/6b94445c94ae495c83a19646e7c3fd56/2.0.00/en-US/c13db243bb571014bd35a3f2f6718916.html, on Apr. 18, 2016, 2 pages.
"Week 5 Unit 1: Server-Side JavaScript (XSJS)" retrieved from https://www.scribd.com/document/277530934/Week-05-Exposing-and-Consuming-Data-With-Server-Side-JavaScript-Presentation, on Apr. 18, 2016, 29 pages.
Binnig, C. et al., "Distributed Snapshot Isolation: Global Transactions Pay Globally, Local Transactions Pay Locally", VLDB J. 23(6): 987-1011 (2014), 25 pages.
Cha et al., "An Extensible Architecture for Main-Memory Real-Time Storage Systems", RTCSA : 67-73 (1996), 7 pages.
Cha et al., "An Object-Oriented Model for FMS Control", J. Intelligent Manufacturing 7(5): 387-391 (1996), 5 pages.
Cha et al., "Cache-Conscious Concurrency Control of Main-Memory Indexes on Shared-Memory Multiprocessor Systems", VLDB: 181-190 (2001), 10 pages.
Cha et al., "Efficient Web-Based Access to Multiple Geographic Databases Through Automatically Generated Wrappers", WISE : 34-41 (2000), 8 pages.
Cha et al., "Interval Disaggregate: A New Operator for Business Planning", PVLDB 7(13): 1381-1392 (2014), 12 pages.
Cha et al., "Kaleidoscope Data Model for an English-like Query Language", VLDB : 351-361 (1991), 11 pages.
Cha et al., "Kaleidoscope: A Cooperative Menu-Guided Query Interface", SIGMOD Conference : 387 (1990), 1 page.
Cha et al., "MEADOW: A Middleware for Efficient Access to Multiple Geographic Databases Through OpenGIS Wrappers", Softw., Pract. Exper. 32(4): 377-402 (2002), 26 pages.
Cha et al., "Object-Oriented Design of Main-Memory DBMS for Real-Time Applications", RTCSA : 109-115 (1995), 7 pages.
Cha et al., "P*TIME: Highly Scalable OLTP DBMS for Managing Update-Intensive Stream Workload", VLDB: 1033-1044 (2004), 12 pages.
Cha et al., "Paradigm Shift to New DBMS Architectures: Research Issues and Market Needs", ICDE: 1140 (2005), 1 page.
Cha et al., "Xmas: An Extensible Main-Memory Storage System", CIKM : 356-362 (1997), 7 pages.
Colle, et al., "Oracle Database Replay," retrieved from http://www.vldb.org/pvldb/2/vldb09-588.pdf, on or before Sep. 2017, 4 pages.
Dasari, Sreenivasulau "Modify Parameters to Optimize HANA universe," retrieved from https://blogs.sap.com/2014/05/03/modify-parameters-to-optimize-hana-universe/, on Apr. 15, 2016, 2 pages.
Farber et al., SAP HANA Database—Data Management for Modern Business Applications. SIGMOD Record 40(4): 45-51 (2011), 8 pages.
Hwang et al., "Performance Evaluation of Main-Memory R-tree Variants", SSTD: 10-27 (2003), 18 pages.
Kim et al., "Optimizing Multidimensional Index Trees for Main Memory Access", SIGMOD Conference: 139-150 (2001), 12 pages.
Lee et al., "A Performance Anomaly Detection and Analysis Framework for DBMS Development", IEEE Trans. Knowl. Data Eng. 24(8): 1345-1360 (2012), 16 pages.
Lee et al., "Differential Logging: A Commutative and Associative Logging Scheme for Highly Parallel Main Memory Databases", ICDE 173-182 (2001), 10 pages.
Lee et al., "High-Performance Transaction Processing in SAP HANA", IEEE Data Eng. Bull. 36(2): 28-33 (2013), 6 pages.
Lee et al., "SAP HANA Distributed In-Memory Database System: Transaction, Session, and Metadata Management", ICDE 1165-1173 (2013), 9 pages.
Park et al., Xmas: An Extensible Main-Memory Storage System for High-Performance Applications. SIGMOD Conference : 578-580 (1998), 3 pages.
Sikka et al., "Efficient Transaction Processing in SAP HANA Database: The End of a Column Store Myth", SIGMOD Conference : 731-742 (2012), 11 pages.
Yoo et al., "A Middleware Implementation of Active Rules for ODBMS", DASFAA: 347-354 (1999), 8 pages.
Yoo et al., "Integrity Maintenance in a Heterogeneous Engineering Database Environment", Data Knowl. Eng. 21(3): 347-363 (1997), 17 pages.

\* cited by examiner

| 2604 | |
|---|---|
| TA1: W(T2, STS=10) |
| TA3: R(T1, STS=11) |
| TA1: C(T1, T2, CID=14) |
| TA2: W(T1, STS=11) |
| TA3: C(T1, CID=13) |
| TA1: R(T2, STS=10) |
| TA2: C(T1, CID=12) |
| TA3: W(T1, STS=12) |
| TA3: R(T1, STS=12) |
| TA1: R(T1, STS=10) |

| 2608 | |
|---|---|
| E1: TA1: W(T2, STS=10) |
| E2: TA1: R(T2, STS=10) |
| E3: TA1: R(T1, STS=10) |
| E4: TA3: R(T1, STS=11) |
| E5: TA2: W(T1, STS=11) |
| E6: TA2: C(T1, CID=12) |
| E7: TA3: R(T1, STS=12) |
| E8: TA3: W(T1, STS=12) |
| E9: TA3: C(T1, CID=13) |
| E10: TA1: C(T1, T2, CID=14) |

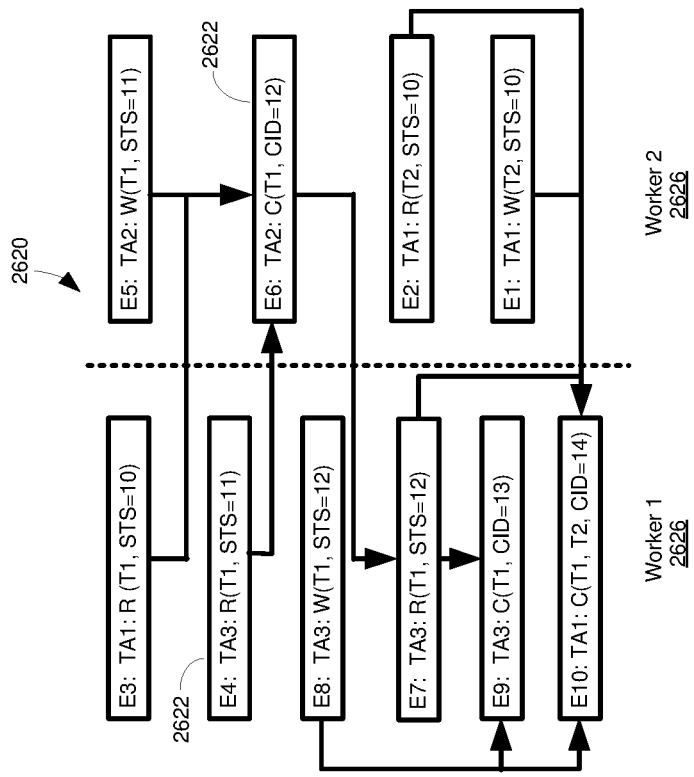
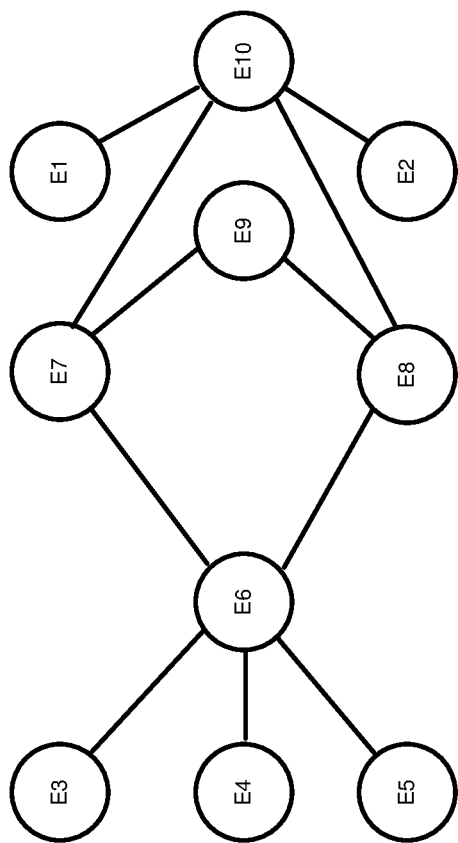
FIG. 26F
FIG. 26G

_US 10,698,892 B2_

ORDER-INDEPENDENT MULTI-RECORD HASH GENERATION AND DATA FILTERING

FIELD

The present disclosure generally relates to preprocessing a captured database workload. Particular implementations relate to hashing and filtering a captured database workload, so as to avoid inaccurate result comparisons and false positives during replay.

BACKGROUND

It is typically desirable to optimize the performance of a database system. Changing operational parameters of the database system, or changing to a new version of software implementing the database system, can, in some cases, have a negative effect on the processing speed or resource use of the database system. Before changing database system parameters or software, it can be useful to evaluate the performance of a test database system, such as to compare its performance with a production database system or to optimize parameters for when the database system is updated. Typically, a simulated or emulated workload is run on the test system. However, the simulated or emulated workload may not accurately reflect the workload experienced by the production database system. Accordingly, results from the test system may not accurately reflect the performance of the production database system under the changed parameters or software.

Further, comparison of results between two systems may not always be accurate, depending on the method of comparison or the specific tests run. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for preprocessing a data set. In a particular implementation, preprocessing may include independently hashing a data set or filtering a data set based on typing or classification of queries that generate at least a portion of the data set.

In one embodiment, a process is provided for independently hashing a data set. For a data set, one or more first data groups of a first grouping, separately having one or more second data groups of a second grouping, may be identified. A first data group hash value set, having one or more first data group hash values for the respective one or more first data groups, may be generated. Generating a given first data group hash value may be accomplished as follows. For a given first data group, a second data group hash value set may be generated, having one or more second data group hash values for the respective one or more second data groups of the given first data group. The first data group hash value for the given first data group may be generated based on the second data group hash value set. A total hash value for the data set may be generated based on the first data group hash value set.

In another embodiment, a process for preprocessing a data set including hashing is provided. For a first record in the data set, having one or more fields, a first record hash value may be generated. Generating the first record hash value may be accomplished as follows. A first field hash value for a first field in the first record may be generated via a hash function. A second field hash value for the second field in the first record may be generated via the hash function. The first field hash value and the second field hash value may be added together. The first record hash value may be generated based on the added first field hash value and the second field hash value via the hash function.

For a second record in the data set, having one or more other fields, a second record hash value may be generated. Generating the second record hash value may be accomplished as follows. A first other field hash value for a first other field in the second record may be generated via the hash function. A second other field hash value for a second other field in the second record may be generated via the hash function. The first other field hash value and the second other field hash value may be added together. The second record hash value may be generated based on the added first other field hash value and the second other field hash value via the hash function.

The first record hash value and the second record hash value may be added together. A total hash value for the data set based on the added first record hash value and the second record hash value may be generated via the hash function.

In a further embodiment, a process for preprocessing a data set including filtering and independently hashing is provided. A database query for a first data set may be received. The database query may analyzed to determine a query type. A classification flag for the database query may be set based on the determined query type. The database query may be stored in the first data set, which may include storing the query results from executing the query at a first database and the classification flag. Based on the classification flag, a first total hash value for the first data set may be generated. Generating the first total hash value may be accomplished as follows.

For a first record in the first data set, having one or more fields, a first record hash value may be generated. Generating the first record hash value may be accomplished as follows. A first field hash value for a first field in the first record may be generated via a hash function. A second field hash value for the second field in the first record may be generated via the hash function. The first field hash value and the second field hash value may be added together. The first record hash value may be generated based on the added first field hash value and the second field hash value via the hash function.

For a second record in the first data set, having one or more other fields, a second record hash value may be generated. Generating the second record hash value may be accomplished as follows. A first other field hash value for a first other field in the second record may be generated via the hash function. A second other field hash value for a second other field in the second record may be generated via the hash function. The first other field hash value and the second other field hash value may be added together. The second record hash value may be generated based on the added first other field hash value and the second other field hash value via the hash function.

The first record hash value and the second record hash value may be added together. A total hash value for the first data set based on the added first record hash value and the second record hash value may be generated via the hash function. Based on the classification flag in the first data set, the database query may be executed in a second database to obtain a second data set. A second total hash value for the second data set may be generated, following the same process as for generating the first total hash value for the first data set. The second total hash value may be compared to the first total hash value to determine equivalency of the second data set to the first data set.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 26F is a graph of the requests for database operations of FIG. 26B, where edges between vertices indicate interdependent requests for database operations.

FIG. 26G is a diagram of the requests for database operations of FIG. 26B, illustrating requests that can be executed in parallel by first and second worker processes.

DETAILED DESCRIPTION

Figure 1:
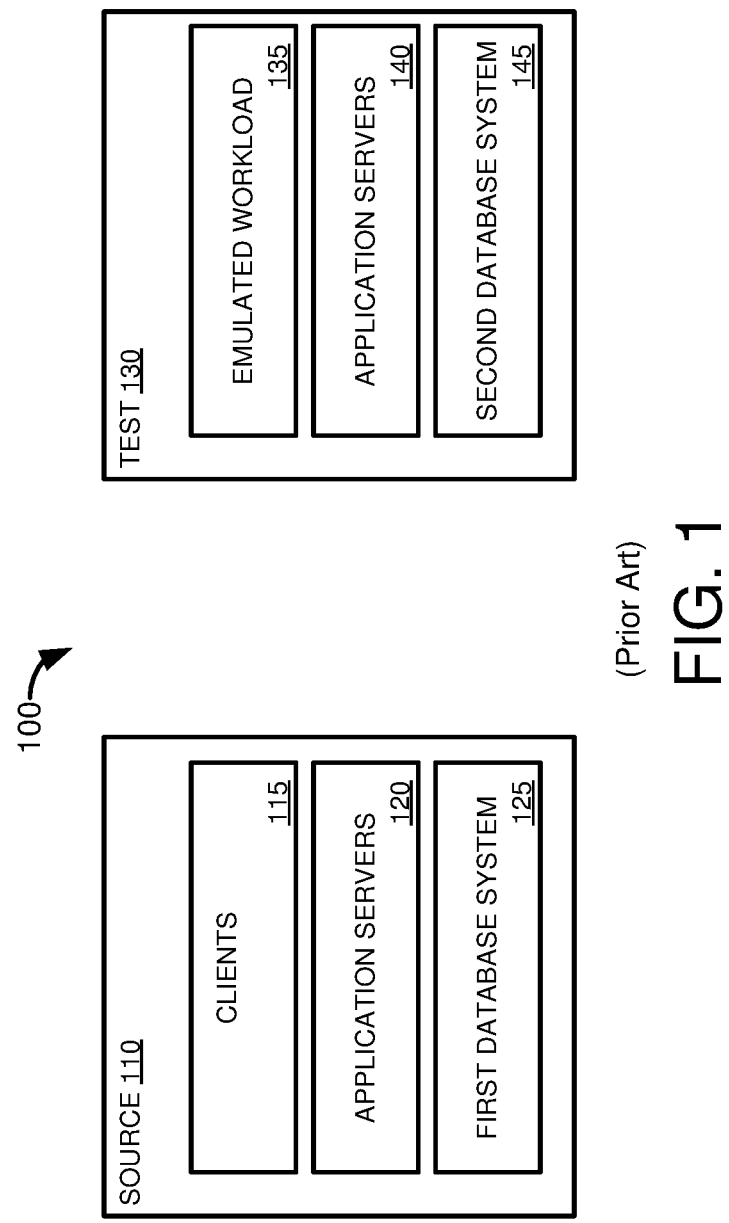
FIG. 1 is a diagram depicting a first database environment having a first database system and a second database environment having a second database system executing an emulated workload of the first database system.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Preprocessing Data Workload Overview

It is typically desirable to optimize the performance of a database system. Changing operational parameters of the database system, or changing to a new version of software implementing the database system, can, in some cases, have a negative effect on the processing speed or resource use of the database system. Before changing database system parameters or software, it can be useful to evaluate the performance of a test database system, such as to compare its performance with a production database system or to optimize parameters for when the database system is updated. Typically, a simulated or emulated workload is run on the test system. However, the simulated or emulated workload may not accurately reflect the workload experienced by the production database system. Accordingly, results from the test system may not accurately reflect the performance of the production database system under the changed parameters or software.

Testing a database system may include running queries in a source database system, running the same queries in an updated database system, and then comparing the results (with both database systems housing the same data). In some scenarios, the source database system may be a control database system, or may be a production database system. In some scenarios, an updated database system may be a target database system. Both systems may house a very large amount of data, for more effective and realistic testing. However, the results generated from queries over such large databases may be prohibitively large to compare row by row. Thus, the results may be compared by comparing hashes of the results. The source database system and the updated, or test, database system may be any two database systems (including, for example, database systems using software by different vendors, or comparing databases maintained as a row store versus databases maintained as a column store) that can be meaningfully compared.

However, merely hashing the entire result set may lead to false positive error reports or other inaccuracies. For example, some queries will nearly always provide different results, even when functionally the two database systems performed comparatively (e.g. a false positive error). Such queries may be queries of system tables, random number queries or time/date stamp queries (e.g. a function query, such as a non-deterministic function query, or a query including such a function as one part of the query), monitoring queries (such as for memory usage), or others.

Filtering such queries may reduce the false positive reports of errors during database testing. Filtering may be performed during data capture, such as at the source database system, or during data replay, such as when the queries are executed at the updated database system. Alternatively, the filtering may be performed on the results, thus allowing the queries to run but ignoring all or a portion of the data obtained by a query (e.g. a "filtered" query), which may assist in comparing overall run times of sets of queries between the database systems.

Alternatively, the queries may be classified, such as during data capture, and their classification included in the data set captured. Such an embodiment allows the queries to be run, skipped, run in part, or manipulated based on the particular test being run, preferences of the tester, or other factors. Classification may be general, such as identifying if a particular query is a potential failure type or not, or may be more specific, such as indicating if the particular query is a monitoring query, a primary key query, a non-primary key query, and so on.

Further, the method of hashing itself may also introduce errors or false positives in comparing the results from the source database system and the updated database system. For example, the same rows may be returned from each, but in a different order, which may result in a different hash value. In such a scenario, the results may be considered to be the same, but the hash values would be different, and so an error or difference would be indicated.

Some fields in a database store more than the substantive data value (e.g. deterministic data), but may include metadata (e.g. non-deterministic data), such as pointers to other memory locations, which may be different between different database systems even when the substantive data value is the same. Similarly, some queries or other operations of a database management system can involve a timestamp. If the timestamp between a capture operation and a replay operation differ, different actual results may be returned, even though there is no practical difference in the results.

The same types of issues can arise when result values are evaluated using a hash function. That is, non-deterministic values can also introduce differences between hash values of the results from different systems, even when the substantive results are the same. Accordingly, more meaningful hash results can be obtained if they can be one or both of being order-independent (e.g., independent of in what order a row or column of data appears) and excluding unnecessary or non-substantive (e.g., non-deterministic values) data that may introduce unwanted differences.

Generating an order-independent hash result from a data set, as described herein, may be a row-independent hash result or may be a column-independent hash result, depending on the type of database, such as row-store or column-store. For example, a data set may have one or more records or tuples, and the records may be rows or columns (or some other grouping) depending on the nature of the database storage or other data source from which the data set was obtained. Thus, a generated hash result for a data set may be record order independent.

Also, hashing is generally described as being carried out on fields of a row (also referred to as a record or tuple), regardless of whether the table is maintained in row-store or column-store format. However, hashing could be carried out column-wise on either a row-store or column-store. For example, values for a first column of all records (or portions thereof, such as those returned in response to a query) could be added and hashed, or all individual values for the column could be added and hashed. Values for any additional columns could be similarly hashed. The hash values for all columns could then be added together to produce a total hash value for the results. Thus, just as when row-based hashing is used, column-based hashing can produce results that are independent of any order in which results are returned. Columns of non-deterministic data (or even some columns of deterministic data) can be ignored in a similar manner as described for row-based hashing.

By filtering queries that are likely to generate false positive difference indications, and by implementing order-independent hashing that avoids non-deterministic data, the false positive rate when comparing data sets may be reduced. Further these preprocessing techniques may thus increase the accuracy of the error-testing techniques and reports generated from the comparisons when used as part of the testing or comparison processes, as described herein.

Such reports may be generated after replay, and may describe different results, depending on the replay and testing performed. For example, testing and the resulting reports may focus on result verification (e.g. are the results the same), performance, a combination of both, or other aspects of the tested database systems. Performance testing may include resource utilization when executing the queries or speed of processing the queries. Such different tests may benefit differently from the described preprocessing techniques. The reports may provide details on results verification or on performance, and may be generated at the request of a user, such as a system tester or system administrator.

In some cases, non-deterministic values can produce different results when executed at different times, on different systems, or otherwise different operating conditions. Some aspects of the present disclosure describe checking whether execution results are different between source (capture) or target (replay) systems. As will be described, in some cases, if execution results are different, the differences can be identified and flagged (such as for reporting purposes). In other cases, at least some different execution results can be ignored, such as when it is known that an operation (such as a query) uses non-deterministic values.

For the same operation, regardless of whether the operation results are used for determining whether results are the same between capture and replay, operation performance parameters (such as execution time, resource use, such as memory, network, or processor use) can be compared between capture and replay systems. That is, whether an operation produces different results on capture and replay systems may or may not be relevant to a user, but the execution performance may be relevant even if the results are different. For example, a user may want to evaluate the performance of all (or at least a larger amount) of database workload operations, even those operation were not exactly identical (such as in terms of results) between the two systems. A user may choose to generate and view a report of any similarities or differences in execution results between two or more systems, a report of performance differences between two or more systems, or both types of reports.

Example 2—Data Capture and Replay Overview

It is often of interest to optimize the processing of database operations. Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers. Because OLAP processes can involve complex analysis of a large number of records, they can require significant processing time.

Timely processing of OLTP workloads is important, as they can directly affect business operation and performance. However, timely processing of OLAP workloads is also important, as even relatively small improvements can result in significant time savings.

The programs responsible for implementing a database system are typically periodically updated. In addition, users, such as database administrators, may wish to change various database parameters in order to determine whether such changes may improve database performance.

Migrating a database system to a new program version, or seeking to optimize database operational parameters, can be problematic. For example, for a production (currently in operational use) database system, parameter or software version changes may negatively affect the usability, stability, or speed of the database system. Users may seek to create a test database system in order to evaluate the performance impact of using a new program version, or changing the parameters of a new or existing program version, in order to avoid negative impacts on a production database system.

In at least some embodiments, a workload refers to an amount of work, such as work involving data transfer or processing at a database system, over time. The workload can include requests for database operations received by the database system from database clients. The workload can also include internal database operations, such as transferring or copying information in memory to persistent storage, the generation of temporary tables or other data (including data or metadata associated with a request for a database operation), and incorporating of temporary or other data into primary data sources.

FIG. 1 illustrates a database environment 100 having a first, source database environment 110 that includes one or more clients 115, one or more applications servers 120 available to service requests for database operations from the clients, and a first database system 125 on which the database operations are carried out. The database environment 100 also includes a second, test database environment 130 having an emulated workload 135, such as a workload that seeks to replicate a workload produced by the clients 115 of the first database environment 110. The second database environment 130 includes application servers 140 to service requests for database operations from the emulated workload 135. The database operations are carried out on a second database system 145, such as a database system 145 having different operational parameters or a different software version than the first database system 125.

Testing the performance of the second database system 145 under a workload at least similar to that experienced by the first database system 125 can be problematic. Typically, a test database system is evaluated using an artificially generated workload, such as the emulated workload 135. However, these artificial workloads may not accurately reflect the actual workloads experienced by the first, production database system 125. Thus, predicted negative or positive performance impacts observed on the second database system 145 may not accurately reflect performance under a workload experienced by the first database system 125.

Capturing a workload from the first database environment 110 to run at the second database environment 130 can also be problematic. For example, it may be difficult to capture all the inputs necessary to replicate the workload generated by the clients 115. In addition, the capture process itself may negatively impact the performance of the first database system 125, such as by increasing the processing load on a computing system operating the database system, or delaying processing of operations on the first database system 125.

Figure 2:
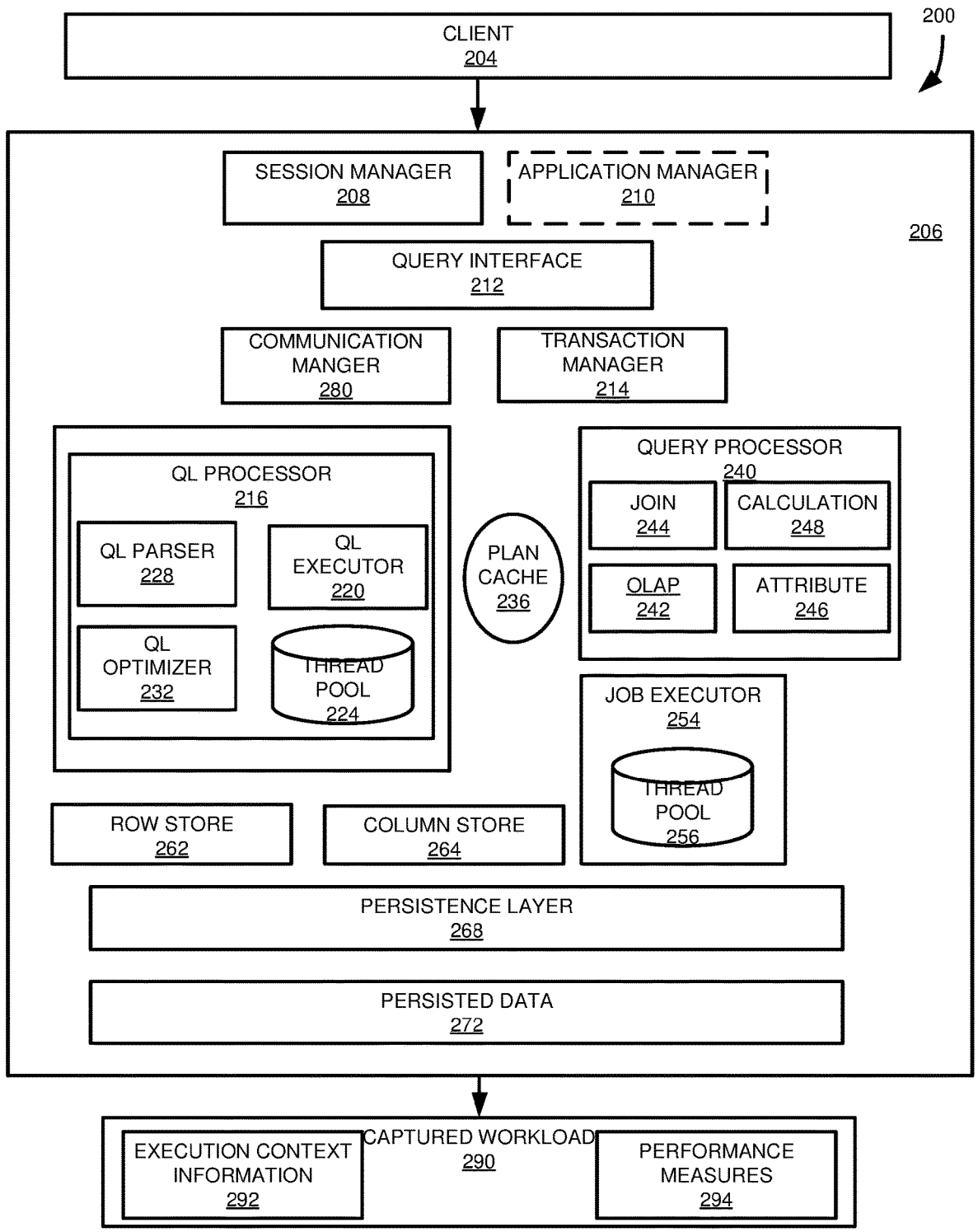
FIG. 2 is a diagram depicting a database environment providing for processing of requests for database operations.

FIG. 2 illustrates an example database environment 200. The database environment 200 can include a client 204. Although a single client 204 is shown, the client 204 can represent multiple clients. The client or clients 204 may be OLAP clients, OLTP clients, or a combination thereof.

The client 204 is in communication with a database server 206. Through various subcomponents, the database server 206 can process requests for database operations, such as requests to store, read, or manipulate data. A session manager component 208 can be responsible for managing connections between the client 204 and the database server 206, such as clients communicating with the database server using a database programming interface, such as Java Database Connectivity (JDBC), Open Database Connectivity (ODBC), or Database Shared Library (DBSL). Typically, the session manager 208 can simultaneously manage connections with multiple clients 204. The session manager 208 can carry out functions such as creating a new session for a client request, assigning a client request to an existing session, and authenticating access to the database server 206. For each session, the session manager 208 can maintain a context that stores a set of parameters related to the session, such as settings related to committing database transactions or the transaction isolation level (such as statement level isolation or transaction level isolation).

For other types of clients 204, such as web-based clients (such as a client using the HTTP protocol or a similar transport protocol), the client can interface with an application manager component 210. Although shown as a component of the database server 206, in other implementations, the application manager 210 can be located outside of, but in communication with, the database server 206. The application manager 210 can initiate new database sessions with the database server 206, and carry out other functions, in a similar manner to the session manager 208.

The application manager 210 can determine the type of application making a request for a database operation and mediate execution of the request at the database server 206, such as by invoking or executing procedure calls, generating query language statements, or converting data between formats useable by the client 204 and the database server 206. In particular examples, the application manager 210 receives requests for database operations from a client 204, but does not store information, such as state information, related to the requests.

Once a connection is established between the client 204 and the database server 206, including when established through the application manager 210, execution of client requests is usually carried out using a query language, such as the structured query language (SQL). In executing the request, the session manager 208 and application manager 210 may communicate with a query interface 212. The query interface 212 can be responsible for creating connections with appropriate execution components of the database server 206. The query interface 212 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 214. The transaction manager component 214 can be responsible for operations such as coordinating transactions, managing transaction isolation, tracking running and closed transactions, and managing the commit or rollback of transactions. In carrying out these operations, the transaction manager 214 can communicate with other components of the database server 206.

The query interface 212 can communicate with a query language processor 216, such as a structured query language processor. For example, the query interface 212 may forward to the query language processor 216 query language statements or other database operation requests from the client 204. The query language processor 216 can include a query language executor 220, such as a SQL executor, which can include a thread pool 224. Some requests for database operations, or components thereof, can be executed directly by the query language processor 216. Other requests, or components thereof, can be forwarded by the query language processor 216 to another component of the database server 206. For example, transaction control statements (such as commit or rollback operations) can be forwarded by the query language processor 216 to the transaction manager 214. In at least some cases, the query language processor 216 is responsible for carrying out operations that manipulate data (e.g., SELECT, UPDATE, DELETE). Other types of operations, such as queries, can be sent by the query language processor 216 to other components of the database server 206. The query interface 212, and the session manager 208, can maintain and manage context information associated with requests for database operation. In particular implementations, the query interface 212 can maintain and manage context information for requests received through the application manager 210.

When a connection is established between the client 204 and the database server 206 by the session manager 208 or the application manager 210, a client request, such as a query, can be assigned to a thread of the thread pool 224, such as using the query interface 212. In at least one implementation, a thread is a context for executing a processing activity. The thread can be managed by an operating system of the database server 206, or by, or in combination with, another component of the database server. Typically, at any point, the thread pool 224 contains a plurality of threads. In at least some cases, the number of threads in the thread pool 224 can be dynamically adjusted, such in response to a level of activity at the database server 206. Each thread of the thread pool 224, in particular aspects, can be assigned to a plurality of different sessions.

When a query is received, the session manager 208 or the application manager 210 can determine whether an execution plan for the query already exists, such as in a plan cache 236. If a query execution plan exists, the cached execution plan can be retrieved and forwarded to the query language executor 220, such as using the query interface 212. For example, the query can be sent to an execution thread of the thread pool 224 determined by the session manager 208 or the application manager 210. In a particular example, the query plan is implemented as an abstract data type.

If the query is not associated with an existing execution plan, the query can be parsed using a query language parser 228. The query language parser 228 can, for example, check query language statements of the query to make sure they have correct syntax, and confirm that the statements are otherwise valid. For example, the query language parser 228 can check to see if tables and records recited in the query language statements are defined in the database server 206.

The query can also be optimized using a query language optimizer 232. The query language optimizer 232 can manipulate elements of the query language statement to allow the query to be processed more efficiently. For example, the query language optimizer 232 may perform operations such as unnesting queries or determining an optimized execution order for various operations in the query, such as operations within a statement. After optimization, an execution plan can be generated for the query. In at least some cases, the execution plan can be cached, such as in the plan cache 236, which can be retrieved (such as by the session manager 208 or the application manager 210) if the query is received again.

Once a query execution plan has been generated or received, the query language executor 220 can oversee the execution of an execution plan for the query. For example, the query language executor 220 can invoke appropriate subcomponents of the database server 206.

In executing the query, the query language executor 220 can call a query processor 240, which can include one or more query processing engines. The query processing engines can include, for example, an OLAP engine 242, a join engine 244, an attribute engine 246, or a calculation engine 248. The OLAP engine 242 can, for example, apply rules to create an optimized execution plan for an OLAP query. The join engine 244 can be used to implement relational operators, typically for non-OLAP queries, such as join and aggregation operations. In a particular implementation, the attribute engine 246 can implement column data structures and access operations. For example, the attribute engine 246 can implement merge functions and query processing functions, such as scanning columns.

In certain situations, such as if the query involves complex or internally-parallelized operations or sub-operations, the query executor 220 can send operations or sub-operations of the query to a job executor component 254, which can include a thread pool 256. An execution plan for the query can include a plurality of plan operators. Each job execution thread of the job execution thread pool 256, in a particular implementation, can be assigned to an individual plan operator. The job executor component 254 can be used to execute at least a portion of the operators of the query in parallel. In some cases, plan operators can be further divided and parallelized, such as having operations concurrently access different parts of the same table. Using the job executor component 254 can increase the load on one or more processing units of the database server 206, but can improve execution time of the query.

The query processing engines of the query processor 240 can access data stored in the database server 206. Data can be stored in a row-wise format in a row store 262, or in a column-wise format in a column store 264. In at least some cases, data can be transformed between a row-wise format and a column-wise format. A particular operation carried out by the query processor 240 may access or manipulate data in the row store 262, the column store 264, or, at least for certain types of operations (such a join, merge, and subquery), both the row store 262 and the column store 264.

A persistence layer 268 can be in communication with the row store 262 and the column store 264. The persistence layer 268 can be responsible for actions such as committing write transaction, storing redo log entries, rolling back transactions, and periodically writing data to storage to provided persisted data 272.

In executing a request for a database operation, such as a query or a transaction, the database server 206 may need to access information stored at another location, such as another database server. The database server 206 may include a communication manager 280 component to manage such communications. The communication manger 280 can also mediate communications between the database server 206 and the client 204 or the application manager 210, when the application manager is located outside of the database server.

In some cases, the database server 206 can be part of a distributed database system that includes multiple database servers. At least a portion of the database servers may include some or all of the components of the database server 206. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 206 may need to access other database servers, or other information sources, within the database system. The communication manager 280 can be used to mediate such communications. For example, the communication manager 280 can receive and route requests for information from components of the database server 206 (or from another database server) and receive and route replies.

One or more components of the database system 200, including components of the database server 206, can be used to produce a captured workload 290 that includes execution context information 292 and one or more performance measures 294. The captured workload 290 can be replayed, such as after being processed, at another database system.

Example 3—Improved Capture Mechanism and Structure

Figure 3:
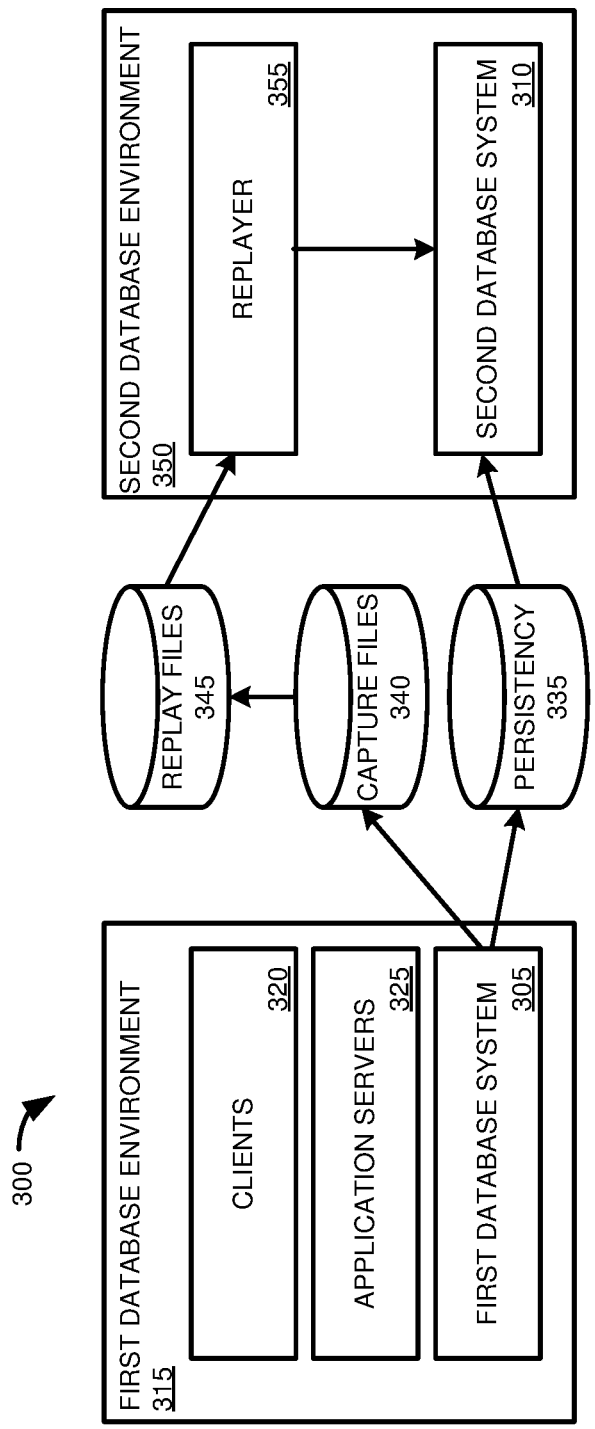
FIG. 3 is a diagram illustrating database environments for capturing a database workload at a first database system and replaying the workload at a second database system.

FIG. 3 provides a diagram of a database environment 300 for implementing a method according to this Example 2 for improving the performance comparison of a first database system 305 with a second database system 310. In some cases, the first database system 305 and the second database system 310 use different versions of the same computer program. In other cases, the first database system 305 and the second database system 310 use the same version of the same computer program, but with different settings. In yet further cases, the first database system 305 and the second database system 310 may use different computer programs for implementing a database system The first database system 305 is part of a first database environment 315. The first database environment 315 can include one or more clients 320 issuing requests for database operations to one or more application servers 325. The one or more application servers 325 can send the requests for database operations to be carried out by the first database system 305.

In carrying out the requests, the first database system 305 can store information regarding the operations in a persistency layer 335. The persistency layer 335 can include, for example, data stored in a persistent, non-transitory computer-readable storage medium. In addition, the first database system 305 can generate information about the requests, which can be stored, such as in one or more capture files 340. The capture files 340 can include information regarding the request (including the request), data, including metadata, generated during execution of the request, the results of the request, and information about the first database environment 315, the clients 320, or the first database system 305. In at least some cases, the capture files 340 can be stored in a compressed format.

In some cases, each capture file 340, or a particular collection of files includes data associated with, and organized by, a capture unit. The capture unit can be, for example, a session, such as described in Example 1, between a client 320 and the first database system 305 mediated by an application server 325. The session may include one or more requests for database operations, such as one or more statements in a query processing language, such as a query or a transaction. In other cases, the capture files 340, or particular collection of files, represents another processing unit, such as a statement, or a collection of statements over a time period.

The capture files 340 can be processed, such as by the first database system 305, the second database system 310, or another computing system, to produce data, such as replay files 345, suitable for being replayed at a second database environment 350, which includes the second database system 310. The replay files 345 can, for example, decompress information in the capture files 340, or otherwise manipulate the data of the capture files 340 into a form more easily executed at the second database environment 350. In addition to information used for replaying requests for database operations, the capture files 340 can include information that is used to evaluate the performance of the second database system using the captured workload, instead of, or in addition to, being used for replay purposes.

The second database environment 350 can including a replayer component 355. The replayer component 355 may use the replay files 345 to send requests for database operations to the second database system 310 that emulate the requests issued by the clients 320 to the first database system 315.

The system of FIG. 3 can provide a number of advantages. For example, in at least some cases, the capture files 340 can be generated using components of the first database system 305. For example, information in the capture files 340 can include information generated by components of the first database system 305 in carrying out a request for a database operation. The use of existing components, operations, and generated data can reduce the processing load on the first database system 305 in saving a workload, or elements thereof, to be replayed at the second database system 310. In at least some cases, the capture files 340 can include less than all of the information generated during execution of the requests for database operations at the first database system 305, which can also reduce the amount of memory or storage needed to reproduce the workload at the second database system 310. In addition, the conversion of capture files 340 to replay files 345 can be carried out asynchronously and at a different computing system than the first database system 305.

Information included in the capture files 340 can come from one or more sources. In some implementations, capture files 340 can be organized by, or otherwise include data for, capture units, such as database sessions, or another set or subset of requests for database operations. A capture unit, its operations, and data and metadata created during execution of requests for database operations contained in the capture unit (including data returned in response to a query language statement, such as query results), can be associated with a context. In at least some aspects, a context, such as an execution context, is information that describes, or provides details regarding, a particular capture unit, which can be represented by a fact. As described below, the capture unit can be associated with additional facts, such as performance measures.

For example, the session itself may be associated with a session content. The session context can include information such as:
- how statements or transactions are committed, such as whether statements are automatically committed after being executed
- transaction isolation level, such as read committed or repeatable read
- client geographical location
- syntax used in the session, such whether strings are null terminated
- how deferred writing of large objects is carried out
- a connection identifier
- a user identifier/user schema
- an application identifier
- verbosity settings for logging
- task execution identifiers
- debugger information As previously mentioned, elements of a session, such as a transaction, can also be associated with a context. A transaction context can include information such as:
- snapshot timestamp (such as used for multi-version concurrency control)
- statement sequence number
- commit ID
- updates to a transaction identifier Similarly, when the statement is a query, such as a query having a query execution plan (as described in Example 1), a plan context can include information such as:
- query ID/query string
- query plan
- compilation time
- statement hash
- memory statistics associated with the statement or plan Applications interacting with the database system may be associated with a context, an application context can include information such as:
- application name
- application user name application source code identifier
a client identifier
location information
variable mode (such as whether strings are null terminated)

Along with these various contexts, various values, such as facts or performance measures, associated with a workload capture unit, or an element thereof, may be of interest, and stored in the capture files 340. For example, facts or measures may include:
an identifier, such as a timestamp, associated with the capture unit
elapsed time (such as session duration)
processor usage
memory usage
number of executions carried out
number of network calls
number of input/output operations
any waits encountered while the session was active In some cases, the capture files 340, such as one or more of the contexts and the measure, can include non-deterministic values, such as non-deterministic values associated with a query language statement or its associated operations. Nondeterministic values refer to values that may be different between different computing devices (e.g., different between a database system (or server thereof) where a workload is captured and a database system (or a server thereof) where the workload is replayed. For example, a timestamp function will return a current timestamp value when run on the first database system 305, which may be a different timestamp value than when run at a later time on the second database system 310. Other examples of non-deterministic values include updated database sequence values, generation of random numbers, connection identifiers, and identifiers related to updated transactions.

In particular examples, it can be beneficial to use the same nondeterministic value as used during execution of a request for a database operation at the first database system 305 when the request is carried out at the second database system 310. In implementations where the same value is to be used, the nondeterministic function can be evaluated once (e.g., on the first database system 305) and the resulting value can be provided in the capture files 340 so that when the request (or other workload element) is executed on the second database system 310, the same value will be used (the same value that was used at the workload capture database system).

Although workload capture has been described as occurring with external clients 320, in at least some embodiments, workload capture may also include capture of internal database operations for inclusion in the workload capture files 340. The captured internal operations can be replayed at the second database environment 350. For example, the replay of the captured internal operations at the second database environment 350 may affect the performance of the second database system 310, including the performance of replayed workload elements originating at the clients 320. In other examples, the captured internal operations are not replayed at the replica database system 310, but are used to compare the performance of the first database system 305 with the performance of the second database system 310. For example, the performance comparison can include comparing a number of internal operations generated by the workload at the first database system 305 with a number of internal operations generated by the second database system 310.

In some cases, the internal operations may be triggered by a user. In other cases, the internal operations occur automatically during operation of the database system. For example, with reference to FIG. 2, periodically, the state (such as changed records and redo logs) of the database server 206 can be written as persisted data 272 by the persistence layer 268, such as to create a save point. Save points, in some examples, may be requested by a user. In other examples, save points may occur automatically, such as according to a schedule, when a threshold number of records have been changed, or when a threshold number of request for database operations have been received or executed. Similarly, storage snapshots, file system backups, data backups, and log backup operations can be captured and, optionally, replayed.

Changes to database records, such as records in the column store 264, can, in some examples, be written to temporary copies of the database records. Periodically, the changes reflected in the temporary copies can be merged into the source database records. Making changes to temporary copies can improve the performance of write operations, including concurrent write operations. The temporary copies can, for example, be maintained in an uncompressed state, or state with reduced compression, compared with the primary database records. Merge operations can be captured and included in the capture files 340.

Internal operations can also include housekeeping operations. For example, in some cases, the first database system 305 can have recent or often-used data in-memory, and older, or less commonly used, data can be stored in persistent storage, such as persistent storage 335 or another persistent storage. The capture files 340 can store information regarding the transfer of data between persistent storage and memory.

The capture files 340 may include all or a portion of these contexts, context elements or values, facts, and measures. In addition, the capture files 340 can include additional information, such as information that may be of assistance in replaying the workload at the second database system 310 or in evaluating the performance of the execution of the workload at the first database system 305, such as nondeterministic values.

In at least some implementations, the volume of information that can be collected for a workload can be large. In at least some cases, the volume of information can be reduced by only including a portion of the information, such as a portion of the context information, in the capture files 340. In addition, to assist with organization and compression of the information, in some implementations, the information can be organized in a schema or a dimensional model, such as a star schema. For example, the measures and facts can be used as the central fact table or tables, which reference as points one or more dimensions, each dimension including one or more contexts. In a particular implementation, each point represents a discrete context, and, in addition to any facts or measures, the fact table includes identifiers for corresponding information in the dimensions.

Figure 4:
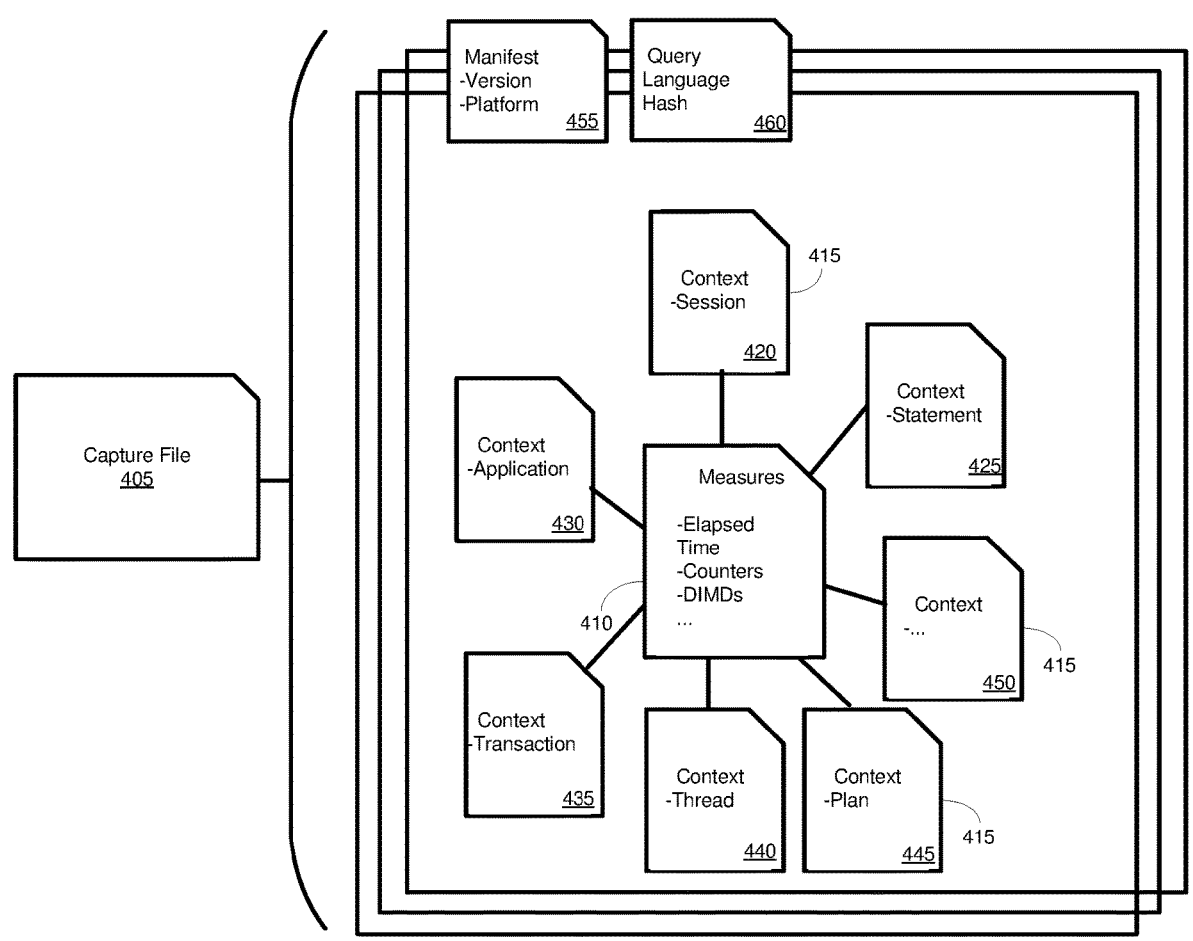
FIG. 4 is a diagram of a workload capture file schema for storing execution context data and performance data.

An example of this schema is shown in FIG. 4. FIG. 4 illustrates a capture file 405 that includes a fact table 410 correlated with a plurality of dimensions 415 associated with the fact table 410. Specifically, the fact table 410 is shown as associated with dimensions 415 representing contexts for a session 420, a statement 425, an application 430, a transaction 435, a thread 440, a plan (such as a query execution plan) 445, and other parameters 450. The fact table 410 includes various measures, such as elapsed time and any counters associated with the capture unit associated with the capture file 340 or collection of capture files (such as a session). The fact table 410 also includes dimension IDs (DIMIDs) used to correlate entries in the fact table 410 with each of the dimensional contexts 420, 425, 430, 435, 440, 445, 450. Although a single fact table 410 is shown, in some implementations, multiple fact tables 410 may be used.

The fact table 410 (or tables) and the dimension tables 415 can include records for a plurality of capture units (such as sessions) of the first database system 305. In some cases, the fact table (or tables) 410 and each of the dimension tables 415 can be stored as separate files. That is, there may be one file for the fact table 410 (when a single fact table is used) and one file for each of the dimension tables 415. In a particular example, the capture file 405 can incorporate the files for the fact table 410 and the files for each of the dimension tables 415. In some cases, the capture file 405 can be compressed, such as using a compression algorithm. Similarly, files for one or more of the fact tables 410 and then dimension tables 415 can be compressed. In implementations where a database system from which a workload is captured includes more than one server or node, the capture file 405 can, in some aspects, represent activity occurring at a single node of the first database system 305. In other aspects, the capture file 405 can be associated with multiple nodes of the first database system 305.

The capture file 405 can include additional information. For example, the capture file 405 is shown as including manifest information 455. Manifest information 455 can include, for example, information related to the first database system 305, such as a identifier for the program version used to implement the first database system 305 and information relating to the computing system used to implement the first database system 305 (such as the number and type of processors, amount and organization of memory and physical storage, information related to networked devices implementing the first database system, or configuration information for the first database system 305 or its components). The manifest information 455 can also include a timestamp associated with the capture file 405 (such as a time the capture file was generated, a time the workload capture was initiated, or a time the workload capture was discontinued). When filters were used to select workload elements to capture, the filter information can also be included in the manifest information 455. When used to store information related to multiple database nodes, the fact table 410 or dimension tables 415 can include information regarding which of the multiple database nodes was involved in executing operations of the workload capture unit, or a subcomponent thereof (such as in executing a statement associated with a particular session). In a particular example, the manifest information 455 can be stored in a file, such as a compressed file, and included within the capture file 405.

The capture file 405 can also include hash information 460. For example, query language statements in the fact table 410 or the dimension tables 415 can be represented by a hash. The hash information 460 can include a hash table correlating hash values to query language statements. By only storing the hash value of the query language statement in the measure file 410 or one or more of the context files 415, the amount of memory needed to store the workload capture can be reduced.

As will be further described in Example 4, hash values can be used to confirm that execution of requests for database operations at the second database system 310 produced the same results as when originally executed at the first database system 305. In some cases, the granularity of hashing can be specified, such as by a user, in such cases, the hash level can be included in the capture file 405, such as in the manifest information 455.

In particular examples, the fact table 410 and the dimension or context tables 415 can be stored as files, and the fact or dimension files grouped together in the context file 405, optionally including a file for the manifest information 455 or a file for the hash information 460. In a particular example, each of the context tables 415 is stored as a separate file within the capture file 405. Each of the capture files can include a dimension identifier (DIMID) field, and one or more value fields. In a specific example, the values can be written in comma separated value format. Similarly, each measure can be stored as a separate file within the capture file 405. Each of the measure files can include a chronological identifier, such as a clock timestamp (such as for the overall database system from which the workload was captured). The chronological identifier can be used, for example, in staging replay of the capture units (such as sessions) represented in the capture file 405. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some cases, context files and one or more measure files can be stored for each of a plurality of services in a database system. The set of context files and one or more measure files for each of the services can be included in the capture file 405 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or http-based interactions, that manage various memory stores (such as transferring data between persistent storage and in-memory storage), and that monitor resource (such as CPU or memory) use in the database system (including across multiple database servers, when the database system is a distributed system).

Figure 5:
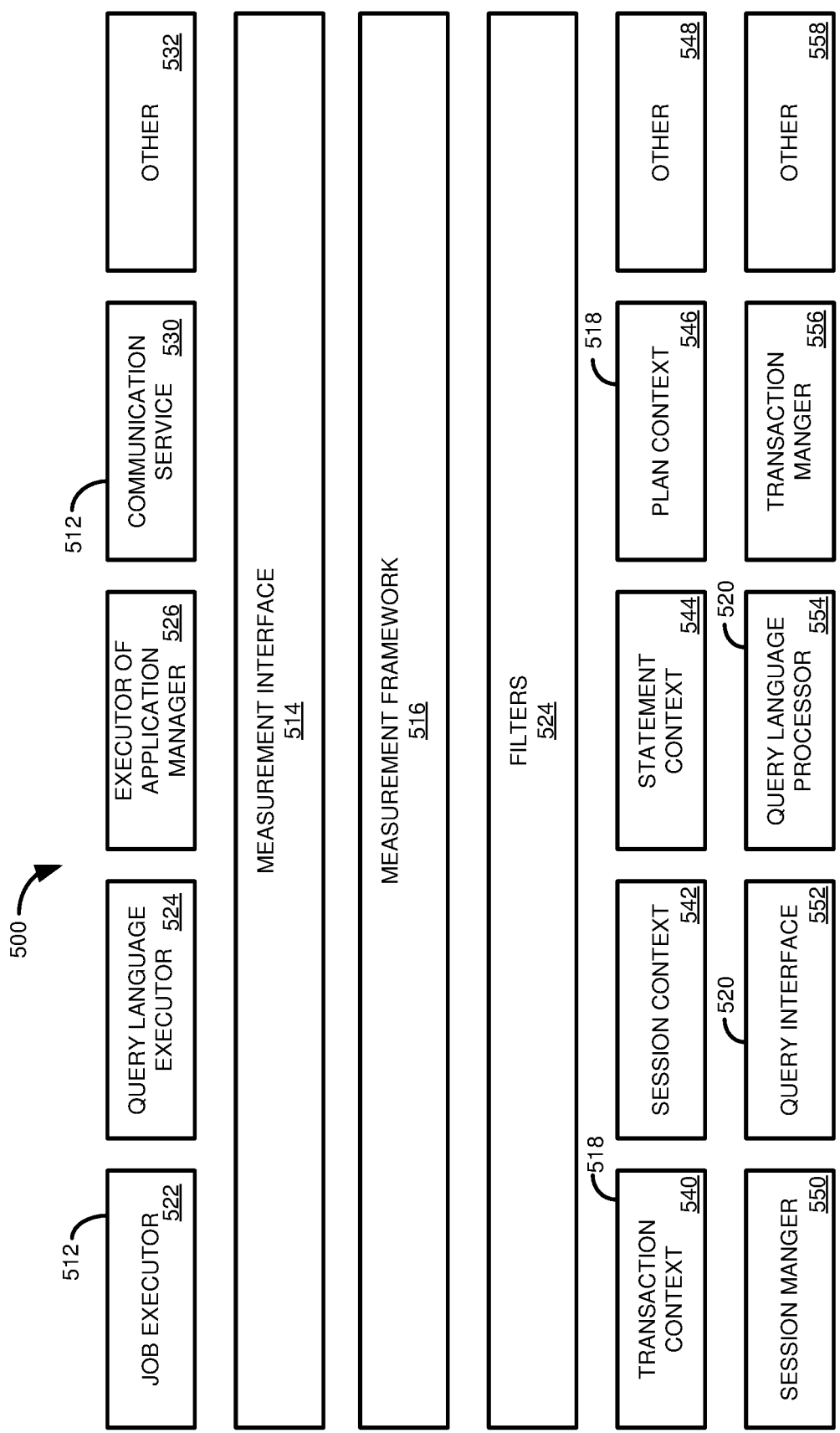
FIG. 5 is a block diagram of an example software architecture for implementing workload capture according to an embodiment of the present disclosure.

FIG. 5 illustrates components of a database environment 500 that can be used to measure and collect workload capture information to be stored, such as in the capture file 405 of FIG. 4. In at least some cases, the measuring and collecting can be carried out by existing components of a database system. For example, the measuring and collecting can be carried out during normal processing of requests for database operations. In this way, the overhead (such as processor load and delay) associated with the capture process can be reduced.

As shown in FIG. 5, the database environment 500 includes measuring (or execution) components 512, a measurement interface 514, a measurement framework 516, contexts 518, and context management components 520. Each of the measuring components 512 can be responsible for executing various processes associated with a request for a database operation. The measuring components 512 can provide measures or facts associated with a request for a database operation. In some cases, in executing the requests, the measuring components 512 can generate data about the execution of the request, or used in carrying out the request.

For example, the measuring components 512 can generate performance information associated with execution of the request.

The measuring components 512 can be registered with the measurement framework 516 using the measurement interface 514. The measurement framework 516 can collect information generated by, or otherwise associated with, the measuring components 512. The measurement framework 516, optionally in conjunction with one or more additional components, can be responsible for generating the capture file 405 of FIG. 4, including the dimension or context tables 415, the fact table or tables 410, the manifest information 455, and the query language hash file 460. In at least some cases, the use of multiple fact or context tables or files allows multiple tables or files to be written in parallel, which can speed the workload capture process.

As discussed above, in at least some implementations, the contexts 518 may include more information than may be needed to replay the requests for database operations in a second database environment, or to compare the performance of the first database system with a second database system. In such cases, a filter layer 524 can be included between the measurement framework 516 and the contexts 518 associated with the measuring components 512. The filter layer 524 can be configured to pass selected information from contexts 518 to the measurement framework 516.

The contexts 518 can be managed, or used, by the context management components 520. In addition, the context management components 520 can be used to provide information to the contexts 518 or to the measuring components 512. In some cases, the context management components 520 can be responsible for information in a context 518 related to dimensional data associated with the context.

Measuring components 512 can include a job executor 522, a query language executor 524, an executor for an application manager 526, a communication service 530, and other components 532 (such as components executing internal database operations, such as merge and savepoint operations). Contexts 518 can include a transaction context 540, a session context 542, a statement context 544, a plan context 546, and other contexts 548 (such as contexts associated with internal database operations). Context management components 520 can include a session manager 550, a query interface 552, a query language processor 554, a transaction manger 556, and others 558 (such as a component managing a context for an internal database operation).

As an example, one context management component 520 can be the session manager component 550, such as the session manager 208 of FIG. 2. The session manager component 550 can coordinate particular sessions, including requests for database operations associated with the sessions. The session manager component 550 can, for example, store information associated with a session in the session context 542. The session context 542 can include values for the parameters identified for the session context table 420 of FIG. 4.

Another of the contexts 518 can be a plan context 546. The plan context 546 can include values for parameters such as described above for the plan context table 445 of FIG. 4. The plan context 546 can, in some cases, be managed by the query language processor 554, such as the query language processor 216 of FIG. 2. The query language processor 554 can also manage a statement context 544. The statement context 544 can include values for parameters such as allowed memory usage, allowed CPU usage, number of allowed parallel threads, priority, user ID, and a sequence identifier.

For a particular capture unit, the measurement framework 516 can aggregate facts and measures, such as performance measures, generated by the measuring units 512 and associate them with the corresponding contexts 518 for the capture unit. The aggregated facts and measures, and the corresponding context information, can be stored in a capture file, such as using the schema of FIG. 4.

Figure 6:
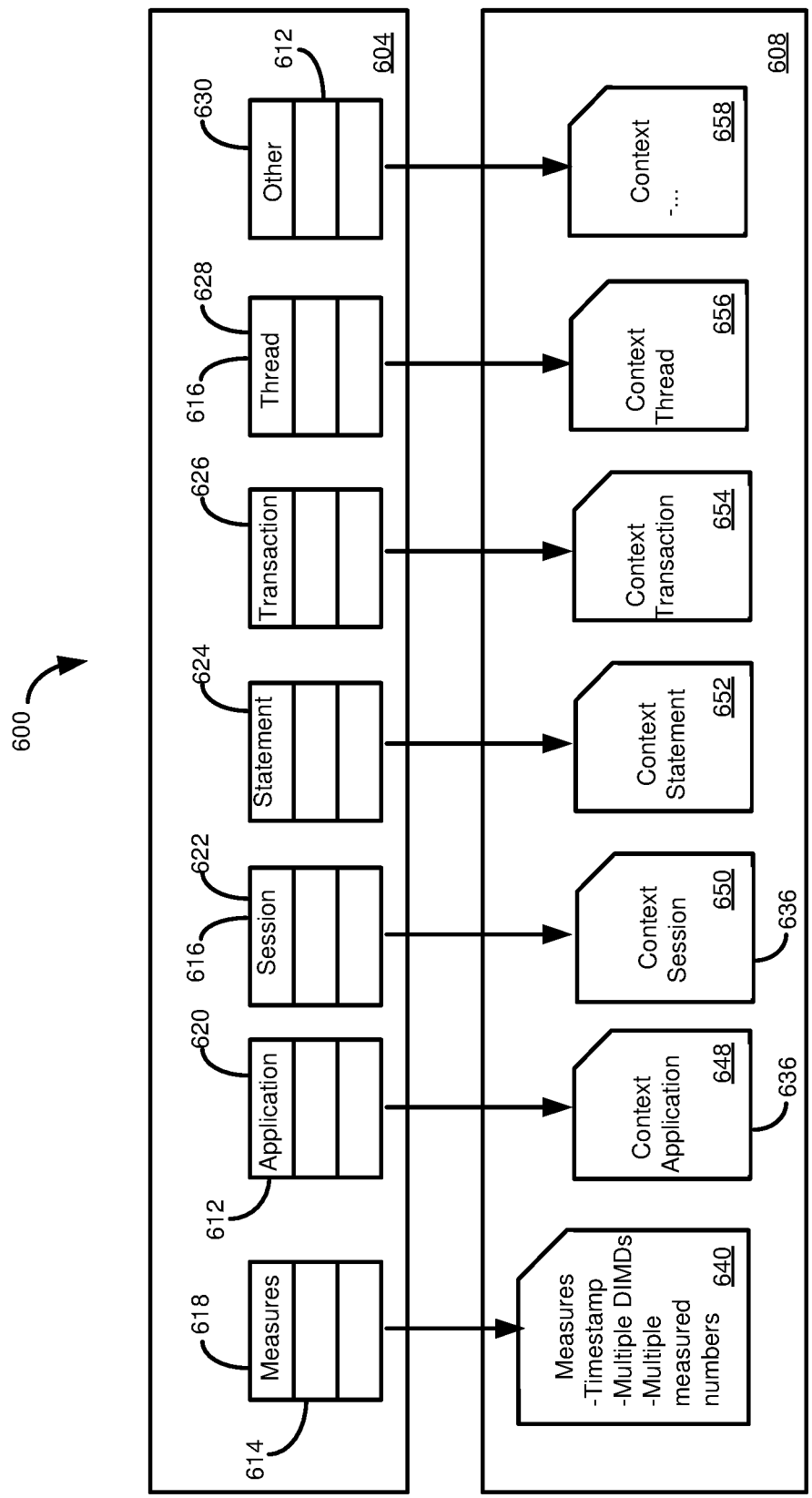
FIG. 6 is a diagram depicting storing, such as writing to a plurality of files, of buffered workload capture data according to an embodiment of the present disclosure.

FIG. 6 illustrates a database environment 600 depicting a process for storing information from a measurement framework 604 in a capture file 608, such as capture file using the schema of FIG. 4. For each of the capture units, the measurement framework 604 can store a mapping of facts and measurements associated with the capture unit with the corresponding context information. In particular examples, the mapping can be stored in memory, such as in buffers 612 for each of a plurality of contexts and a buffer 614 for measures 618 associated with capture units. FIG. 6 illustrates buffers 612 for contexts 616, including an application context 620, a session context 622, a statement context 624, a transaction context 626, a thread context 628, and, optionally, other contexts 630.

The buffers 612 can be written to the schema of the capture file 608. In some cases, the buffers 612 can be written to separate files 636 for each of the contexts 616, such as files for context data for an application 648, a session 650, a statement 652, a transaction 654, threads 656, and, optionally, other context information 658. The buffer 614 can be written to a measure file 640. The data in the buffers 612, 614 can be compressed prior to being written.

Although a single buffer 614 and a single measure file 640 are shown for the measures 618, in other cases, multiple buffers 614 or files 640 can be used. For example, multiple buffers 614 can be used when the capture file 604 includes multiple measure files 640, or information from multiple buffers 614, such as buffers representing different measures or facts, can be aggregated into one or more measure files 640. The measure file 640 can store information for one or more capture units, including an identifier, one or more facts or measures, and identifiers for context information stored in the context files 636.

In some cases, the buffers 612, 614 may be written to their corresponding files 636, 640 when a workload capture is completed. In other cases, the buffers 612, 614 can be written periodically during workload capture. For example, each of the buffers 612 and the buffer 614 can be assigned a threshold size. If a particular buffer of the buffers 612, or the buffer 614, exceeds the threshold, the buffer can be written to its corresponding file 636, 640 and emptied. In other cases, the buffers 612, 614 can be written periodically in another manner, such as at particular time intervals or after a particular number of capture units have been added to the buffers. When the workload capture process has been completed, the files 636, 640 can be combined, such into the capture file 405 of FIG. 4. In particular examples, the files 636, 640 can be compressed as they are combined.

The database environment 600 may be implemented in a different manner. In a particular implementation, rather than a single buffer for each of the contexts 616 and the buffer 614 for the measures 618, the database environment can include multiple buffers. For example, two (or more) buffers can be included for each of the contexts 616 and for the measures 618. Data can be written to the first buffers until a buffer is filled, at which time it can be written to a file as described above. During the writing process, information can be stored in the second buffer, which is then written when filled, and new data stored in the first, now empty, buffer. Also, rather than having separate buffers for each of the contexts 616 and the measures 618, the contexts and/or measures may be stored in a common buffer. When filled, the buffer can be written to respective context and measure files 636, 640. The environment 600 can include one or more additional common buffers to be used when a first common buffer is being written.

Figure 7:
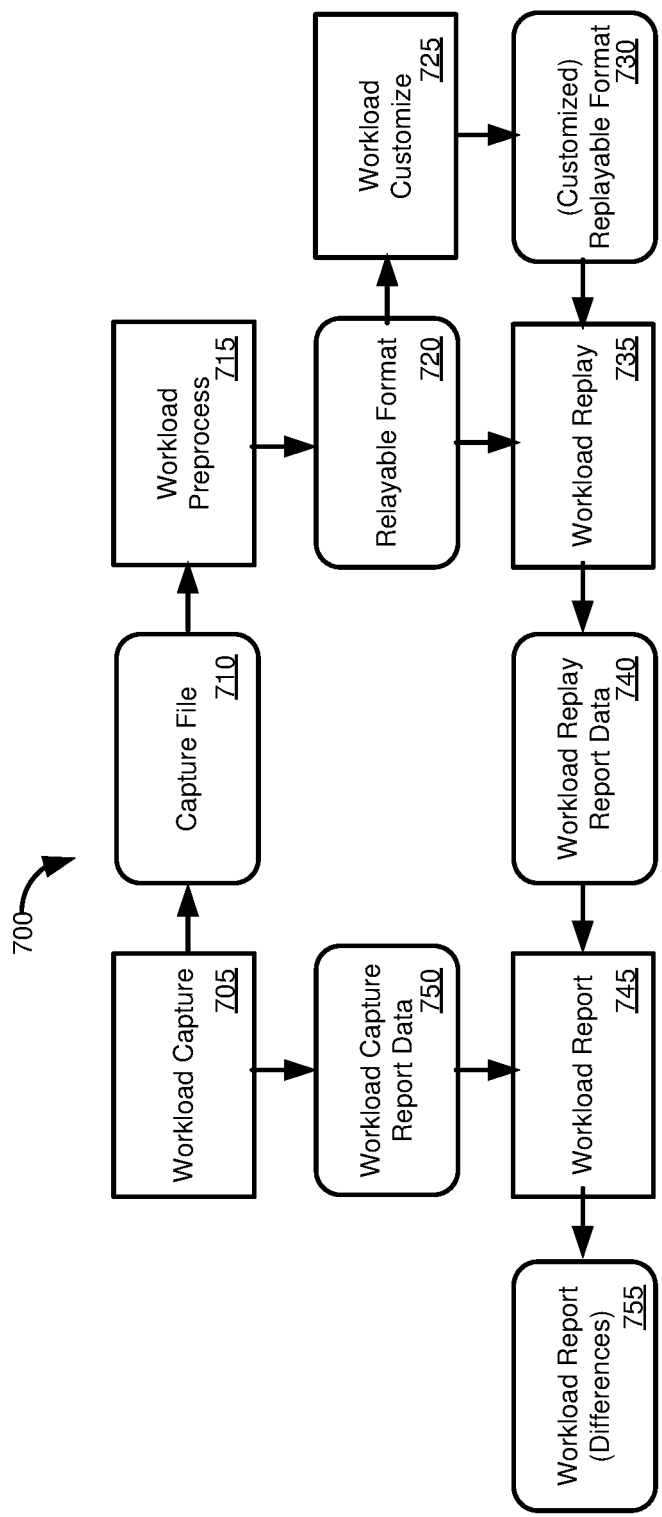
FIG. 7 is a diagram illustrating a method for comparing the performance of a first database system with a second database system.

FIG. 7 is a diagram of a process 700 for comparing performance statistics of a workload executed at a first database environment with performance statistics of the workload executed at a second database environment. In step 705, a workload, such as one or more requests for database operations (which may be associated with one or more database sessions) is captured at a source system, such as described in conjunction with FIGS. 2-5. The capture process 705 generates a capture file 710, such as a capture file having the structure of the capture file 405 of FIG. 4.

The capture file 710 is processed in process 715 to produce captured requests for database operations and associated data in a replayable format 720. The processing in step 715 can include extracting or decompressing individual context and measure files from the workload capture file 710. If the individual context and measure files were compressed, they can also be extracted or decompressed.

During step 715, individual capture units, such as sessions, and/or subcomponents thereof (e.g., statements) can be reconstructed from the context and measure files. For a particular measure, relevant context information can be retrieved based on dimension or context identifiers stored with the measure. For example, statements in a session can be associated with corresponding context information, such as a query language statement and context information (or triggers to generate the context information) that would have been received by the database system from which the workload was captured.

In some cases, the capture units, and operations within the capture units, can be ordered during the processing step 715. For example, the capture units, or operations, can be ordered chronologically use a time associated with the capture units or operations (e.g. a system timestamp, commit timestamp, or other identifier). In other cases, the capture units are reconstructed during processing step 715, but are not ordered. Ordering can occur, for example, during replay of the replayable format 720.

In particular examples, the replayable format 720 can be a replay file, such as a file stored on a hard disc or other persistent storage medium or non-volatile memory. In other examples, the replayable format 720 can be stored in a different manner, such as in volatile memory. While in some cases the replayable format 720 may be a single store or file, in other cases information in the repayable format 720 can be included in multiple stores or files.

The replayable format 720, including a replay file, can include information regarding the workload capture process and workload capture system, such as a database software version associated with the source data system, information regarding the configuration (including processors and available memory) of the source database system, and start and end times for the workload capture. The replayable format 720 can also include information regarding any filters applied to workload elements being captured, such as workload elements associated with particular applications, users, clients, statement types, or elements exceeding a threshold duration. Statistics regarding the capture process, such as the number of capture units (e.g., sessions), statements, and/or committed transactions recorded in the replayable format 720 can also be stored in the replayable format 720. The replayable format 720 can further include information regarding the processing step 715, such as a software version associated with a processing component generating the replayable format, information about a computing system used to carrying out the processing step, and start and end times for the processing.

The replayable format 720 can include additional information. For example, information can be included regarding database users, such as information that would have been transmitted to the source database system when the workload was generated. Information regarding query language elements can be included in the replayable format 720, such as codes for DDL (data definition language), DML (data manipulation language, e.g., SELECT, UPDATE), and DCL (data control language) operations. The replayable format 720 can also include information regarding query language statement strings, such relating an identifier (such as a hash value) to a particular query language statement string.

Other types of information that can be included in the replayable format 720 include information regarding the number of batch updates at the source database system during workload capture, values of nondeterministic functions, and information regarding nested statement in workload capture units, or elements thereof (such as in CALL statements). Hash value results, such as those used to verify consistent execution between the source database system and the second database system can be included in the replayable format 720.

The replayable format 720 can also include information, including in individual files, related to individual capture units, such as database sessions. Information for the capture units can include connection identifiers, information regarding the capture unit, or suboperations thereof, such as a start time for a request, a request type, and context information associated with the request. Parameters, such as measures, associated with the capture unit can be included in the replayable format 720. The replayable format 720 can also include identifier information for the capture unit, such as a session ID, a user name, a particular schema associated with the user, etc.

In optional process 725, the captured workload in the replayable format 720 can be customized to produce a customized captured workload in a replayable format 730. For example, process 725 can include selecting particular users, clients, applications, sessions, etc. associated with the first database environment to be replayed at the second database environment. A user may also select particular segments of a captured workload to be replayed, rather than replaying an entire workload, or can merge multiple workloads (or segments thereof) to be replayed, such as simultaneously or sequentially. In some aspects, a user can also select the speed at which the workload should be replayed. That is, in some cases, requests for database operations can be replayed with the same time interval experienced at the source system. In other cases, the user can select the workload to be replayed in another manner, such as increasing or decreasing the replay speed versus the speed database operations were carried out at the source database system.

In process 735, the captured workload in the replayable format 720, or the customized workload in replayable format 730, is replayed at the second database environment. The replay 735 can include reading information associated with individual capture units, or operations thereof, from the replayable format 720. In some cases, the information can be read sequentially from the replayable format 720. In other cases, a replayer component can select capture units, or operations thereof, to be replayed in a particular order. For example, the replayer may select capture units, or operations, in the replayable format 720 to be replayed based on order in which the capture units or operations were received by the source database system, such as a chronological order. The chronological order can be determined, for example, using an identifier (e.g., a system timestamp, a commit timestamp, or other identifier).

In at least come cases, the replayer cause multiple capture units, or operations, to be sent to, or replayed at, the second database system. In particular implementations, workload elements received by the second database system, to be replayed, can be received in a format analogous to the format in which they were received by the source database system. That is, the replay information can resemble requests for database operations produced by an external database client (or by internal database operations of the source database system). The replay 735 produces an output 740, such as workload replay report data, that includes performance measures associated with the execution of the workload at the second database environment.

A workload report process 745 can be carried out, such as comparing workload replay report data with workload capture report data 750, such as data including performance measures associated with the execution of the workload at the first database environment, such as performance measures associated with the capture file 710, the workload in the replayable format 720, or the workload in the customized workload replayable format 730. In at least some implementations, one or both of the workload capture report data 750 and the workload replay report data 740 can be structured as, or include information in, the capture file 405 of FIG. 4.

The workload report process 745 can produce a workload report 755, such as a report comparing execution of the workload at the first database environment with execution at the second database environment. For example, the workload report can include information regarding processor usage, wait times (such as average execution time), query language statement throughput (such as the number of executed statements), number of connections with other database servers or other components, query performance, comparisons of query results or query plans between two database systems, candidate and execution locations of statements, and information regarding the consistency of tables between the two database environments.

Figure 8:
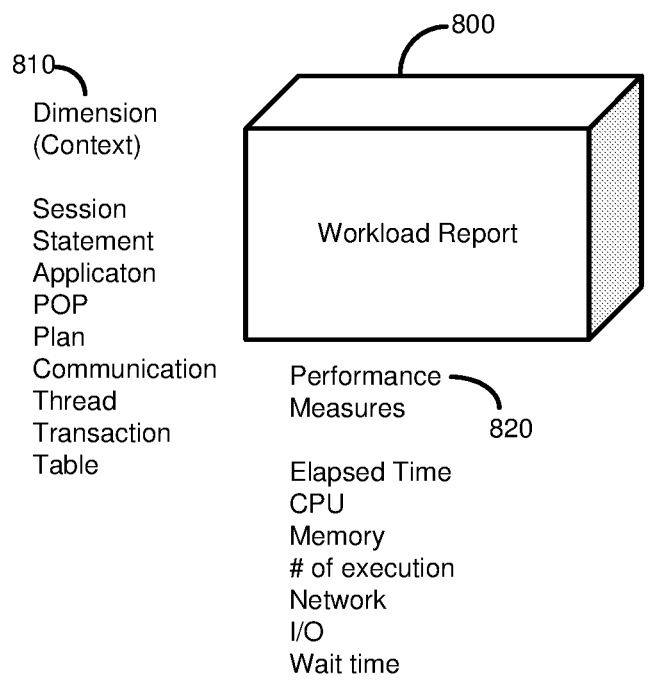
FIG. 8 is a diagram depicting an OLAP cube of workload report useable to compare the performance of a first database system with a second database system according to an embodiment of the present disclosure.

The workload report 755 can include information comparing and summarizing the performance of the entire workload replay, or individual elements of the workload replay. For example, the report 755 can provide information comparing the execution of particular capture units, or particular operations within a capture unit. In a particular example, the report 755 is stored as database records or is derived from database records, such as in an OLAP cube. FIG. 8 illustrates an OLAP cube 800, and dimensions 810 and measures 820 that can be included in the cube. In some cases, the OLAP cube 800 can be a hypercube, having more than three dimensions 810.

Figure 9:
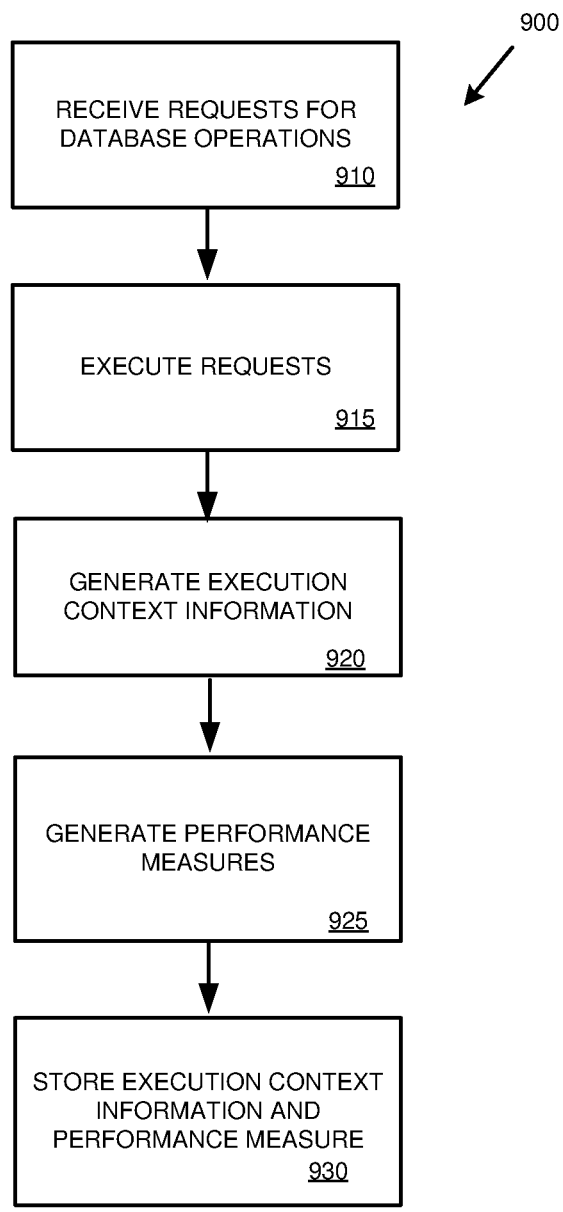
FIG. 9 is a flowchart of an example method for capturing workload information at a database system.

FIG. 9 presents a method 900 of generating one or more workload capture files for a database system. In step 910, the database system receives a plurality of requests for database operations. The plurality of requests are executed in step 915. For the plurality of requests, one or more components of the database system generates execution context information for a plurality of execution contexts in step 920. In step 925, for the plurality of requests for database operations, one or more components of the database system generates a plurality of performance measures associated with the requests. The execution context data and the performance measures are stored in step 930. In at least some implementations, the performance measures and the execution context data can be stored in an analytical schema, such as a star schema. For example, the performance measures can be stored as one or more fact tables associated with one or more dimension tables constructed from the execution context data.

In particular examples, the request for a database operation is a first request for a database operation from a first database client and the method 900 includes receiving a second request for a database operation. Execution context data and performance measures are generated for the second request. The execution data and performance measures for the second request for a database operation are stored with the execution context data and the performance measure for the first database operation, such as in the schema.

Figure 10:
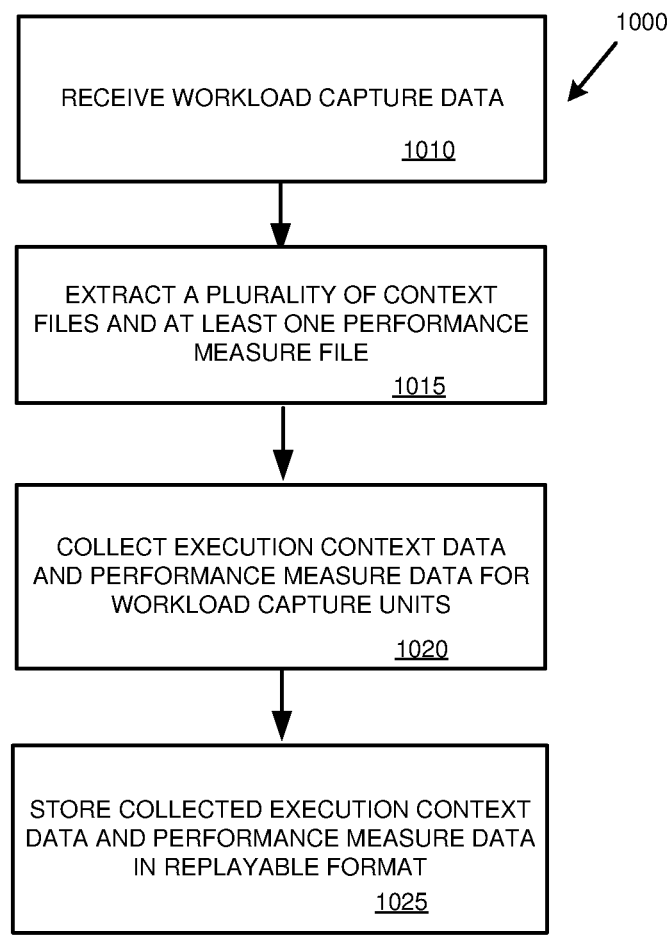
FIG. 10 is a flowchart of an example method for preparing workload replay data from captured workload data.

FIG. 10 illustrates a method 1000 for generating a workload replay file, such as from a workload capture file or other workload capture data. Workload capture data, such as a workload capture file, is received in step 1010. The workload capture data includes stores, such as files, for each of a plurality of execution context and at least one store, such as a file, for performance measures. In step 1015, the plurality of execution context stores and the at least one performance measure store are extracted to provide execution context data and performance measure data. For each of a plurality of workload capture units, execution context data and performance measure data associated with the respective workload capture unit are collected in step 1020. For each of the workload capture units, in step 1025, the collected execution context data and performance measure data are stored in a format replayable by a second database system.

Figure 11:
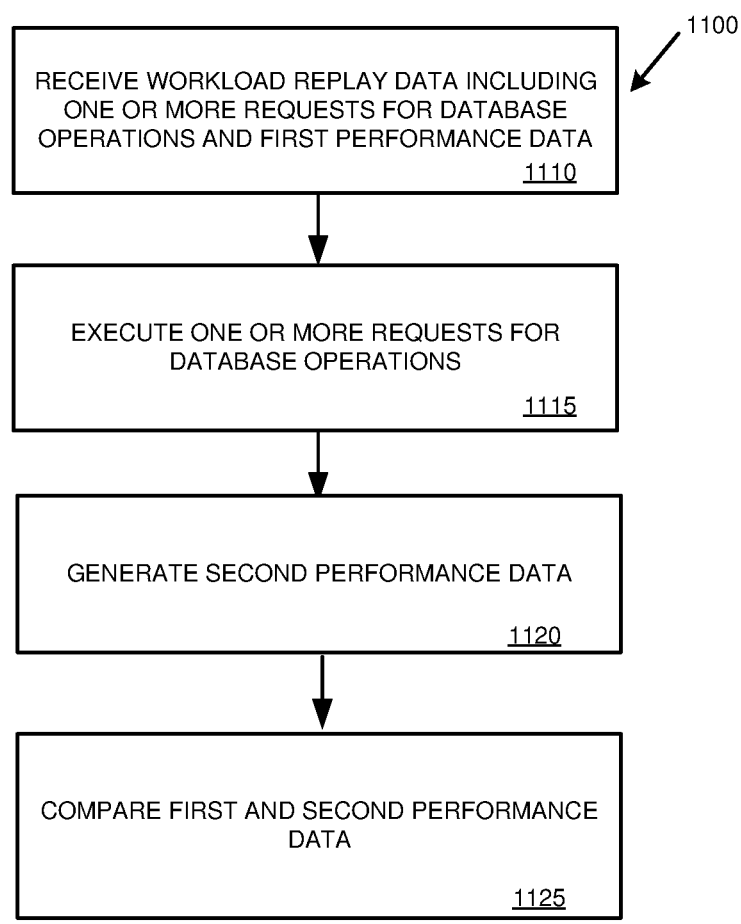
FIG. 11 is a flowchart of an example method for replaying a workload at a database system.

A method 1100 for comparing workload statistics associated with a first database system with workload statistics associated with a second database system in illustrated in FIG. 11. In step 1110, replay data associated with a workload captured at a first database system is received. The workload replay data includes one or more requests for database operations and first performance data associated with the one or more requests. The one or more requests for database operations are executed at the second database system in step 1115. In step 1120, second performance data associated with the execution of the one or more requests for database operations at the second database system are generated. The first and second performance data are compared in step 1125.

Example 4—Replay Initiation with Dynamic System

In some implementations of the present, a second database system can be assumed to not include elements of the workload (such as sessions, or query language statements associated therewith) captured at a first database system. However, in other cases, a workload captured at the first database system can include requests for database operations, or components thereof, that have already been carried out at the second database system. Replay of workload elements at the second database system that have already been carried out by the second database system can lead to inaccurate performance measurements, can potentially cause a database system of the second database system to have different contents than it should, which can potentially affect the outcome of subsequent replay operations.

Each transaction, such as a transaction that writes, updates, or deletes a record of a database table, can be associated with a commit timestamp, such as a commit log sequence number. The state of a database is also typically associated with a snapshot that includes a commit timestamp. When a transaction is to be replayed, its commit timestamp can be compared with the commit timestamp of the second database system. If the transaction commit timestamp is lower than or equal to the snapshot commit timestamp of the second database system, the transaction can be selected to not be replayed. If the transaction commit timestamp is larger than the snapshot commit timestamp of the second database system, the transaction can be replayed, as it is not yet represented in the second database system.

Figure 12:
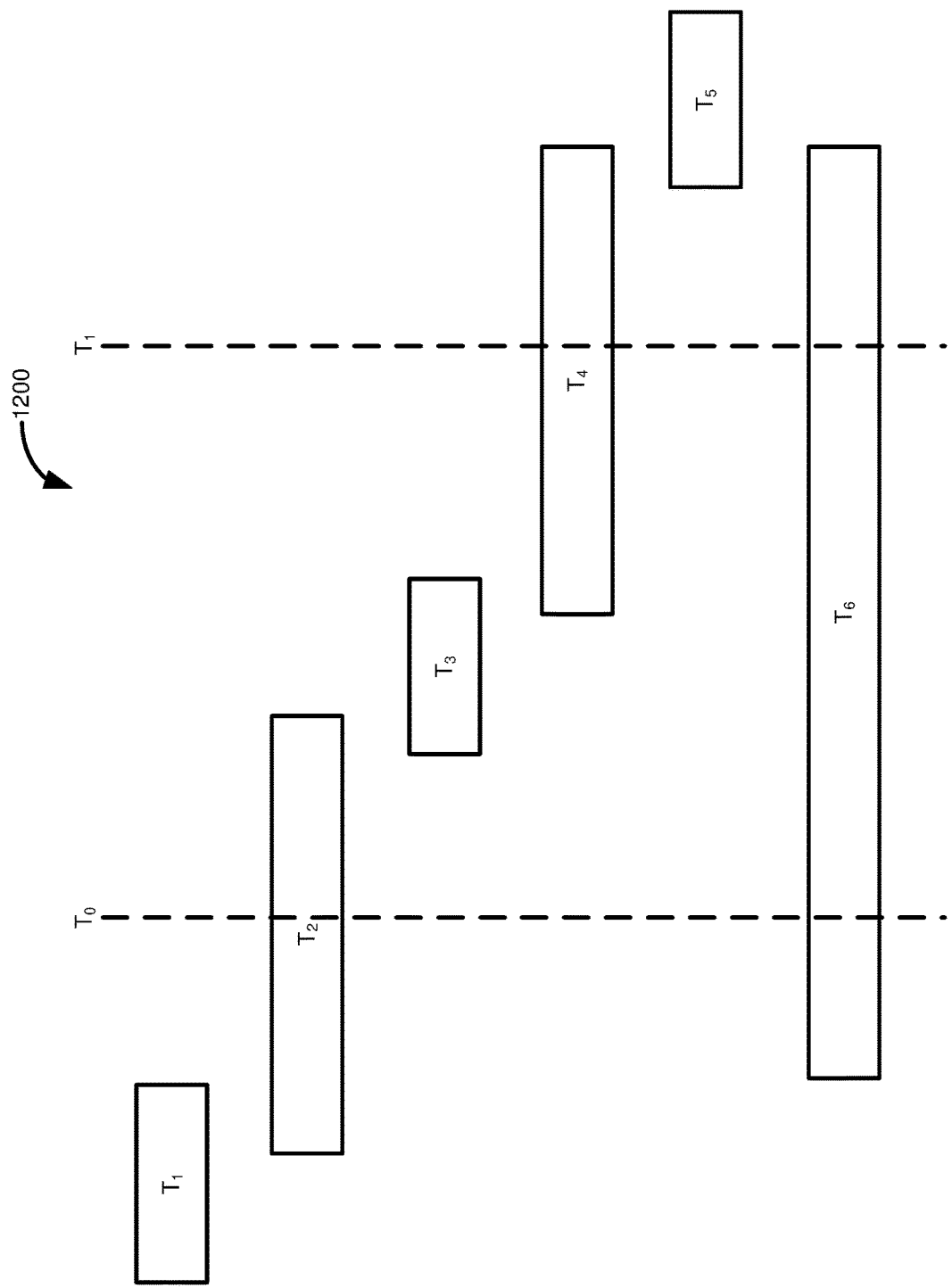
FIG. 12 is a diagram illustrating the execution of transactions at a database system while an image of the database system is being acquired and a workload capture process is being carried out.

FIG. 12 depicts a database environment 1200 having database operations T1 though T6. A workload is captured at the first database system at time $T_0$. An image of the first database system, against which transactions will be replayed at the second database system, is acquired at time $T_1$. During replay, the commit timestamp of transactions T1-T6 are compared with the snapshot commit timestamp associated with $T_1$. Transactions T1-T3 started before $T_0$ and were completed before $T_1$. Accordingly, during workload replay, transactions T1-T3 can be skipped. Transaction T5 started after $T_1$ and therefore will be replayed, as it is not represented in the database image captured at $T_1$.

Transactions T4 and T6 started before $T_1$, but were not completed (committed) when $T_1$ was acquired. Similar to recovery from a backup, when the database image acquired $T_1$ is activated at the second database system, open, uncommitted transaction can be rolled back. Thus, during replay, T4 and T6 will not be represented in the second database system, and can be replayed.

Figure 13:
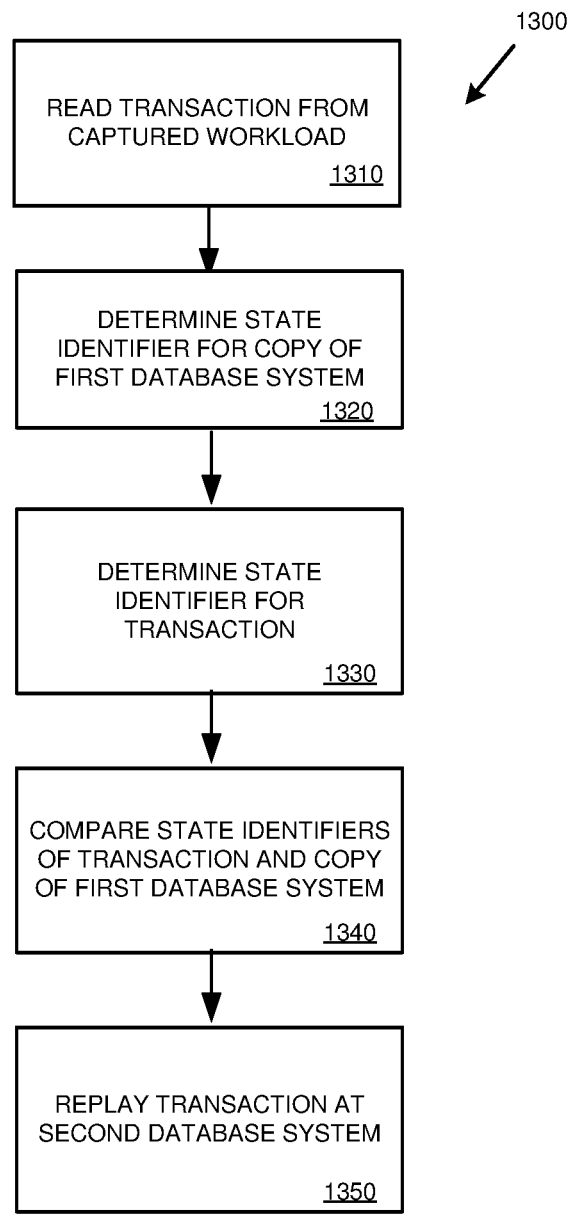
FIG. 13 is a flowchart of an example method for determining whether a request for a database operation should be replayed at a database system.

FIG. 13 illustrates a method 1300 for determining whether a captured query language transaction captured in a workload, such as in a workload capture file or a workload replay file, should be replayed. In step 1310, a transaction is read from a captured workload including execution context data and execution measures associated with the execution of a plurality of requests for database operations at a first database system. In step 1320, a state identifier, such as a timestamp (e.g., a commit timestamp), is determined for a copy of the first database system. In step 1330, a state identifier, such as a timestamp (e.g., a commit timestamp) of the transaction is determined. The state identifier for the transaction, in step 1340, is compared with the state identifier of the copy of the first database system. The transaction is replayed at the second database system in step 1350 if the state identifier of the transaction is larger than the state identifier of the copy of the first database system.

Example 5—Query Result Validation

In carrying out an example of this disclosure, such as Example 2, it can be beneficial to confirm that a captured workload replayed at a second database system produced the same results as when it was originally executed on a first database system. Thus, according to this Example 4, methods and systems of the present disclosure can provide for confirming that the replay outcome matches the original execution outcome.

In a particular implementation, a hash value can be generated for one or more elements of a captured workload. A hash value can be generated when the corresponding element (or elements) is replayed at the second database system. If the hash values are identical, it may indicate that the element was executed identically at the first and second database systems.

Figure 14:
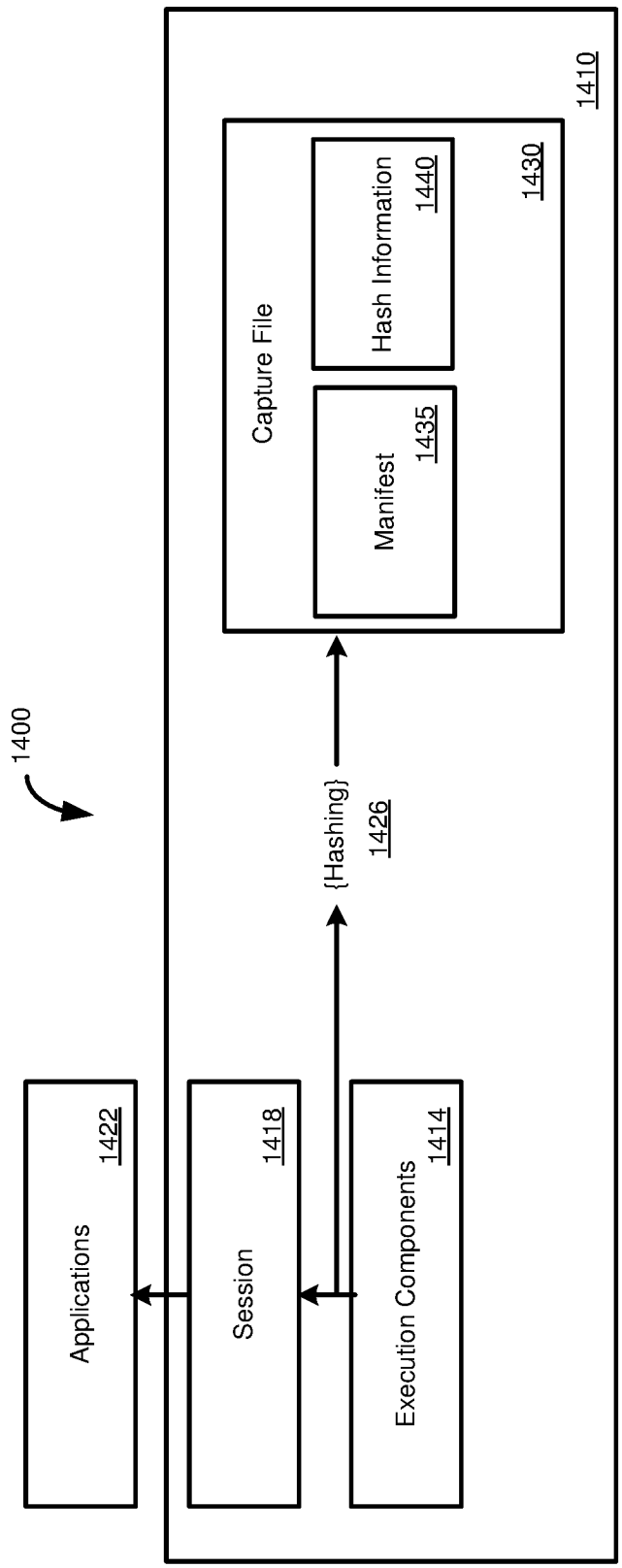
FIG. 14 is a diagram of a database environment for acquiring hash values of execution results associated with the execution of requests for database operations at a database system.

FIG. 14 illustrates a database environment 1400 providing for hashing of captured workload elements. Requests for database operations are carried out by components of a database server 1410. For example, results may be generated by one or more execution components 1414 of the database server 1410, such as the SQL processor 216 of FIG. 2, or one of its subcomponents. In addition to being passed to a session manager component 1418 (and in turned returned to one or more applications 1422), the results can be passed through one or more hashing functions 1426. The hash value can be associated with the result (such as an identifier for the result, or the identifier for a request for a database operation (or the execution thereof). The identifier and hash can be stored, or otherwise associated, with a captured workload, such as with a capture file 1430. In at least some cases, the capture file 1430 can be structured in an analogous manner to the capture file 405 of FIG. 4.

In particular implementations, hashing can be carried out at different levels of granularity. Optionally, multiple levels of hash granularity can be obtained for a request for a database operations, or components thereof. For example, when the workload capture unit is a session, hashing can be carried out for information related to the overall results, such as the results (such as for an entire set of identifiers and/or values returned for the session) or meta information related to the result records. Such meta information can include, for example, the type of result, the length of the results, or numeric contents of the result.

At a finer level of granularity, individual result records can be hashed (such as identifiers and/or results for all columns in a particular result), including meta information related to such records (such as type, length, numeric constants, and length of string data). At a yet finer level of granularity, subcomponents, such as individual table columns in the results, can be analyzed using a hash function. Increasing the granularity of hashing can improve accuracy in verifying that the same results were achieved by the first and second database systems. However, finer levels of granularity typically result in higher overhead for the verification process, both in storing a larger number of hash values, and computational overhead in generating the hash values at the first and second database systems, and then comparing them.

In at least some cases, the system 1400 can provide for determining hash values at multiple levels of granularity. In some cases, multiple levels of granularity may be simultaneously generated by the first database system. In other cases, a user may specify a level of granularity to be used, referred to as a hashing level. In order for the hash values to be compared, the second database system typically should apply the same hash level as the first database system. The hash level, in some implementations, can be included in workload capture information sent to the second database system. For example, the hash level can be included in the capture 405 file of FIG. 4. In a more particular example, the hash level can be included in the manifest information 1435, which can be at least similar to the manifest information 455 of FIG. 4. The capture file 1430 can also include hash information 1440, such as hash values associated with the hashed data of the captured workload (such as in one or more measure files or context files).

Figure 15:
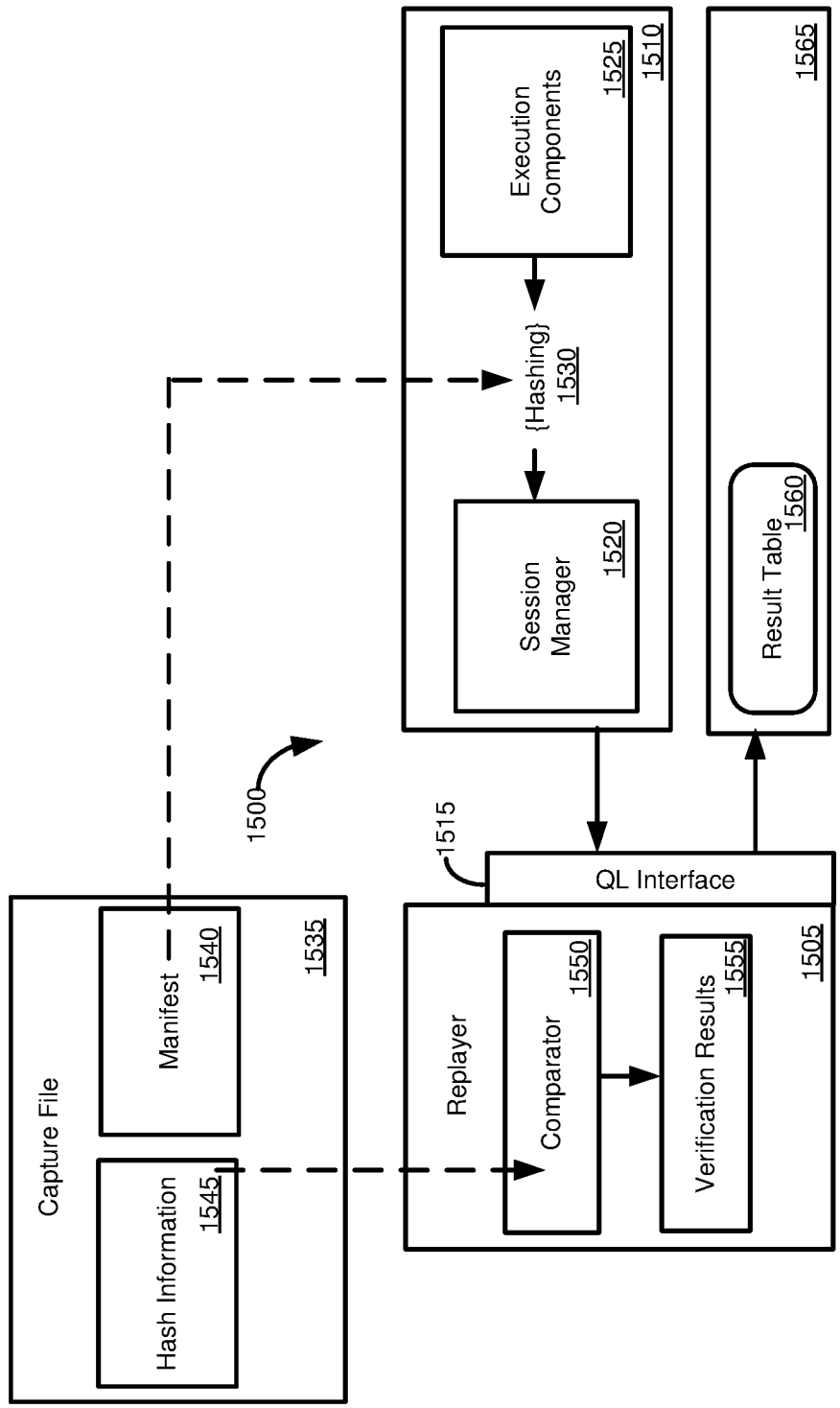
FIG. 15 is diagram of a database environment for comparing hash values of execution results of workload replay at a second database system with hash values of execution results of workload execution at a first database system.

FIG. 15 illustrates hash generation and comparison at a second database environment 1500. The second database environment 1500 includes a replayer 1505 and a second database system 1510. The replayer 1505 include a query language interface 1515 for sending query language statements to the second database system 1510.

The second database system 1510 can include a session manager component 1520, one or more execution components 1525 (such as described in conjunction with the database environment 200 of FIG. 2), and a hash component 1530. The session manager component 1520 can receive requests for database operations from the replayer 1505, such as requests generated through processing of a captured workload, such as a capture file 1535 (e.g., capture file 405 of FIG. 4). The capture file 1535 can include manifest information 1540, which can specify a hashing level or a hashing function.

The session manager component 1520 can forward the requests for database operations to the execution components 1525, or other appropriate components of the second database system 1510. The execution components 1525 (or other components) can generate execution results that are passed to the hashing component 1530. When multiple hash levels are available, the hashing component 1530 can determine a hashing level used at a first database system used to capture the workload to be replayed. For example, the hashing component 1530 can read the hashing level from the manifest information 1540. The hashed values generated by the hashing component 1530, and the results, or identifiers associated with the results, can be returned to the replayer 1505.

The replayer 1505 can include a comparator component 1550. The comparator 1550 can receive hash information 1545 from the capture file 1535. The comparator component 1550 can, for a particular result unit represented by the hash values from the first and second database systems, compare the hash values to determine whether they are the same and generate verification results 1555. In some cases, verification can be skipped for at least certain types of requests for database operations, such as those involving non-deterministic functions or values (particularly when the value at the source system is not included in the workload capture file 1535). The verification, in some examples, is carried out synchronously with the replay process. In other examples, the verification can be carried out asynchronously. In some cases, hash generation or verification for large objects can also be skipped. When a query language statement includes a query that can generate multiple result sets, verification can account for the relationship of the result sets to ensure that the replay hash values are generated appropriately.

The result of the comparison, whether the hash values were or were not the same for the first and second database systems, can be stored, such as in a result table 1560. In a particular example, the result table 1560 can be stored on a control system 1565, such as a computing system in communication with the first database environment, the replayer 1505, and the second database system 1510.

Typically, results are sent in units having a particular size, such as specified by an amount of memory or number of lines. If hash values are returned to the replayer 505 along with execution results, more request fetches may be required to send the same amount of results compared with the number of fetch operations carried out at the first database system. In some cases, if the same number of fetch requests are required, the size of the fetch requests can be increased. However, this may result in higher memory usage at the second database system 1510 compared with the first database system, which may skew a performance comparison between the two systems. In other cases, the fetch request size at the second database system 1510 can be maintained at the same size as the source database system. However, the performance metrics of the second database system 1510 can be adjusted such that the number of fetch requests at the second database system can be adjusted so that only the number of fetch requests required to transmit result data are used in determining performance metrics. For example, the number of fetch requests required for a particular operation can be determined as the size of the execution results divided by the size of a fetch request. In other cases, the number of fetch requests needed to transmit execution results, versus the number needed to transmit execution results and hash values, can be simulated in another manner.

In further implementations, the system 1500 can be arranged differently, or the generation of hash values by the second database system 1510, the comparison of hash values, or the storing or other use of the comparison can be carried out in a different manner. For example, in some cases, the comparator component 1540 can be located elsewhere, such as within the control system 1550. Similarly, rather than being stored in the control system 1565, the result table 1560 can be stored elsewhere, such as the replayer 1505.

Figure 16A:
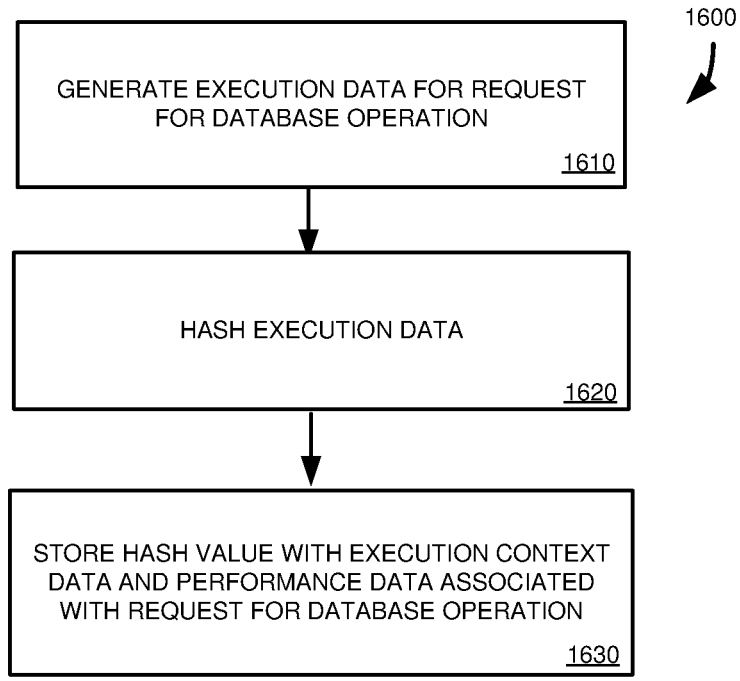
FIG. 16A is a flowchart of an example method for acquiring hash values for execution results of workload execution at a first database system.

FIG. 16A illustrates a method 1600 for determining hash values for a captured workload according to this Example 4. In step 1610, execution data associated with the execution of a request for a database operation, such as query language statement or component thereof, is generated. The data is hashed in step 1620 to produce a hash value. In step 1630 the hash value is stored in a capture file with execution context data and performance data associated with the request for a database operation.

Figure 16B:
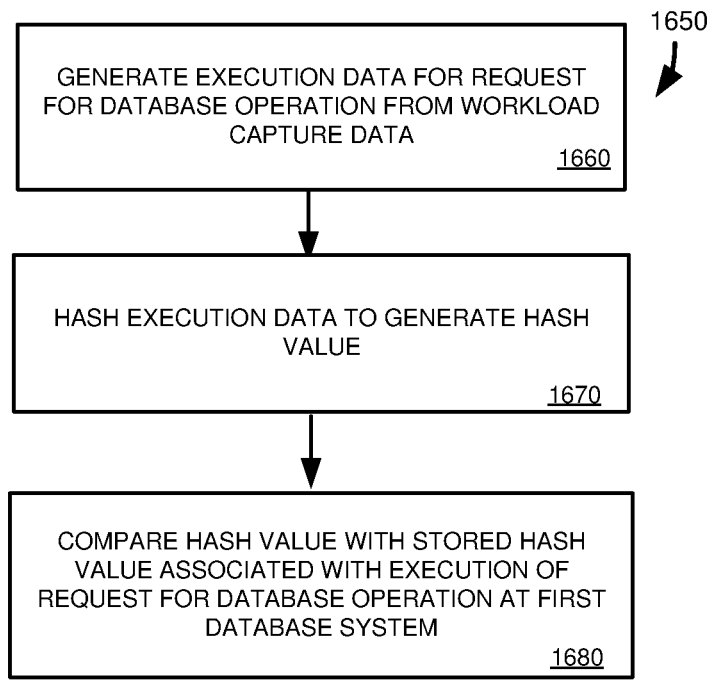
FIG. 16B is a flowchart of an example method for comparing hash values of execution results of workload replay at a second database system with hash values of execution results of a workload executed at a first database system.

FIG. 16B illustrates a method 1650 for verifying the execution of a replayed request for a database operation. In step 1660, a request for a database operation of workload capture data is executed at a second database system to generate execution data. In step 1670, a hash value is calculated for the execution data. The calculated hash value is compared, in step 1680, with a stored hash value associated with the execution of the request for a database operation at a first database system.

Example 6—Replay Capture with Distributed Nodes

In some cases, a database environment may include multiple database servers, which may function as nodes in a database system. A node can serve as a source or master node, and other nodes may serve as replica or slave nodes. In a particular example, a particular node may function as both a source node and a replica node, such as depending on the operations used by, or records accessed with, a particular request for a database operation.

Figure 17:
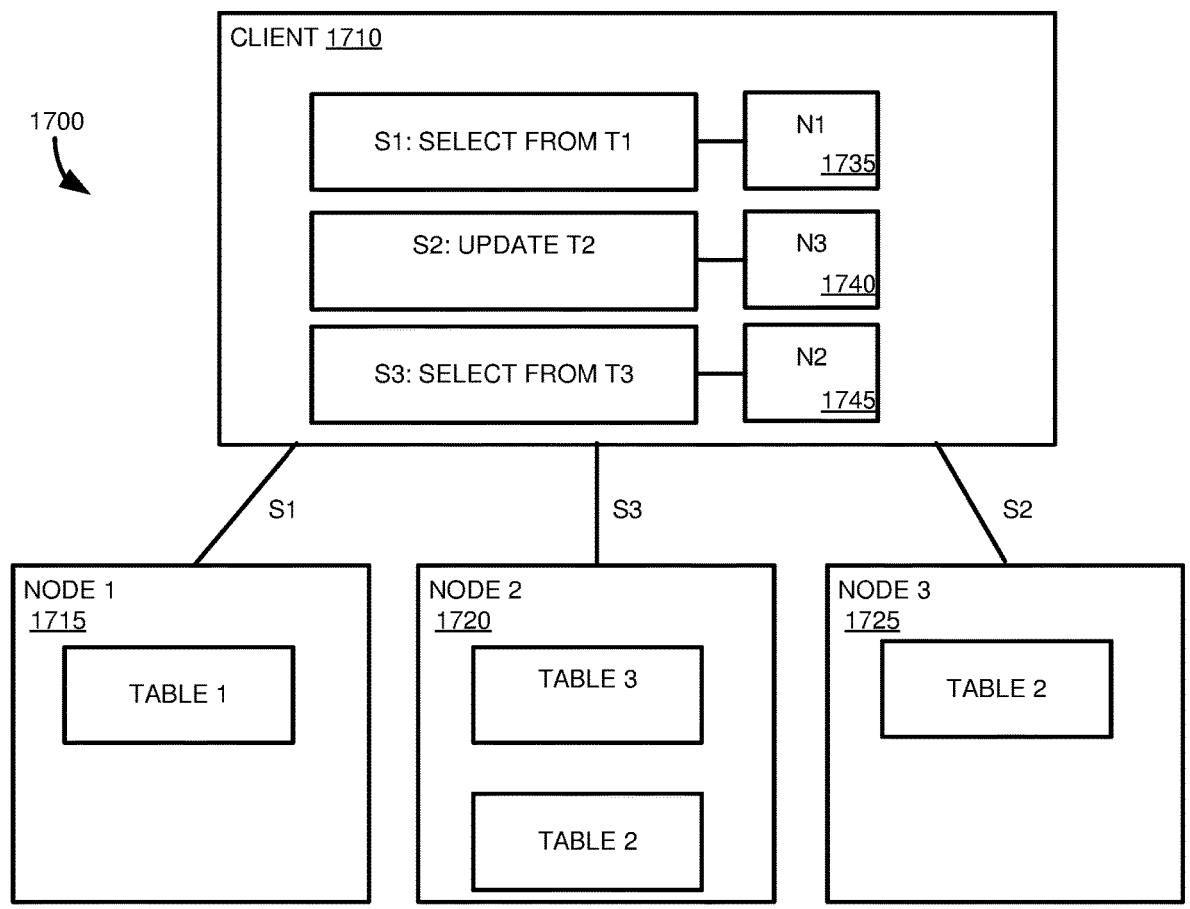
FIG. 17 is a diagram of a database environment for storing database system routing information at a database client.

FIG. 17 illustrates a database environment 1700 having a client 1710 and database nodes 1715 (Node 1), 1720 (Node 2), 1725 (Node 3). Database Node 1 1715 holds a copy of Table 1, database Node 2 1720 holds copies of Tables 2 and 3, and database Node 3 1725 holds a copy of Table 2. In some cases, a database system including the nodes 1715, 1720, 1725 can determine which of the nodes should service a particular request for a database operation, such as a query language statement, from the client 1710. The determining can include determining which of the nodes 1715, 1720, 1725 holds records relevant to the request, or is otherwise appropriate to service the request. In particular examples, more than one of the nodes 1715, 1720, 1725 may be capable of processing a particular request. The database system can determine which of the nodes 1715, 1720, 1725 should receive and process such a request. Once a determination is made as to which node 1715, 1720, 1725 should receive a request, the routing information can be sent to, and stored by, the client 1710. In such a way, on future requests including the statements S1-S3, the client 1710 can route the statement directly to the appropriate node 1715, 1720, 1725.

Client 1710 is illustrated as having a plurality of requests for database operations, including a statement S1 having a SELECT from Table 1, a statement S2 including an UPDATE at Table 2, and a statement S3 having a SELECT from Table 3. The location where the statements S1-S3 should be carried out was previously determined by the database system (such as by one of the nodes 1715, 1720, 1725, including a node operating as source node or a node operating as a replica node) and was cached in corresponding caches 1735, 1740, 1745 for each of the respective statements. Specifically, statement S1 has a cached routing information indicating that S1 should sent to Node 1 1715. Statement S2 and statement S3 have cached routing information indicating that the statements should be sent to Node 3 and Node 2, 1725, 1720, respectively.

In some aspects, routing information stored in the caches 1735, 1740, 1745 can be changed. For example, after executing a statement, the database system operating nodes 1715, 1720, 1725 may determine that a different node should process the request than the previously cached node. The change may be made because it was determined that another node may service the request more quickly, for load balancing purposes, or because of changes to the location of records accessed by the statement. In FIG. 17, while statement S2 presently has cached routing information indicating that Node 3 1725 should process the statement, the statement S2 could also be processed by Node 2 1720. Thus, the database system could replace the value in cache 1740 with Node 2 1720.

Figure 18:
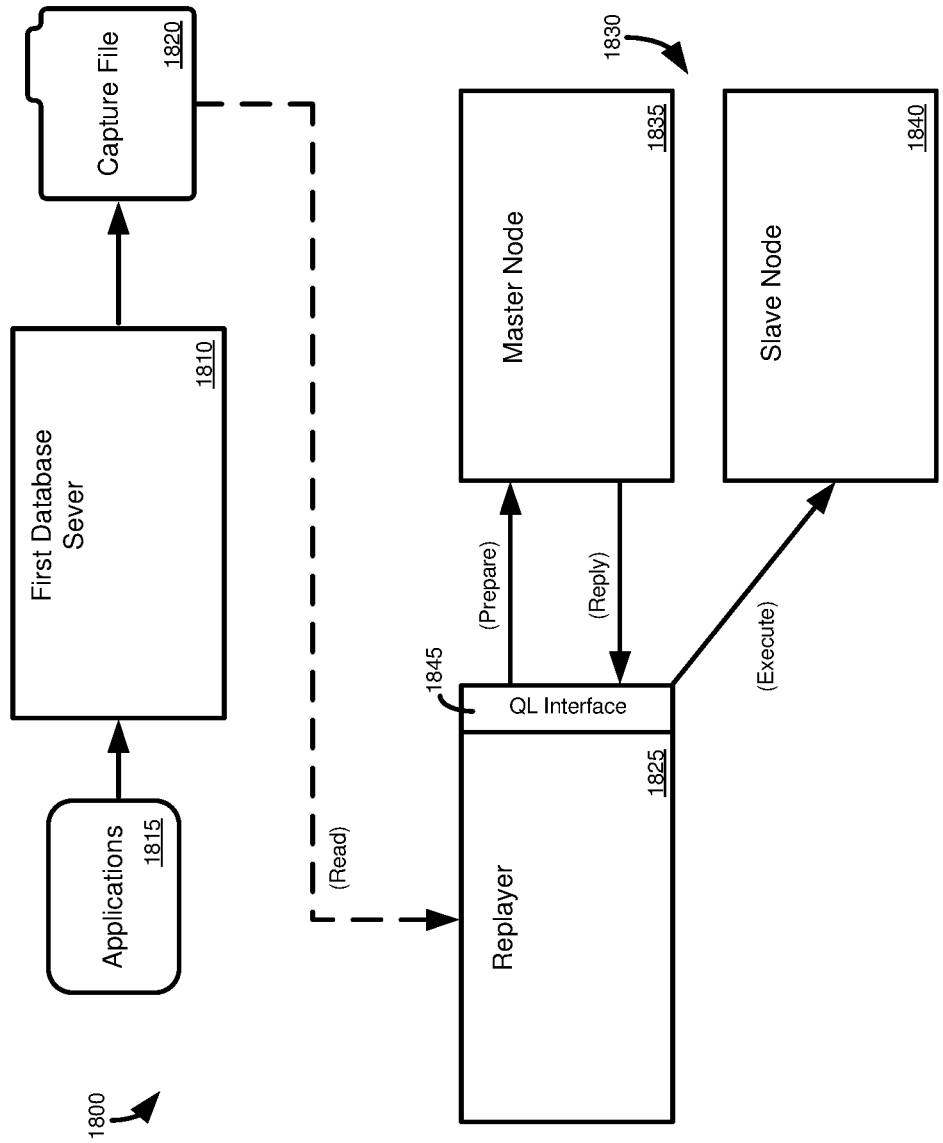
FIG. 18 is a diagram of a database environment for storing routing information associated with requests for database operations captured at a first database system and replaying the requests for database operations at a second database system.

According to this Example 5, methods, systems, and computer-implemented instructions for implementing a workload capture and replay system can include capturing routing information indicating which of a plurality of nodes of a source database system is responsible for processing a particular request for a database operation, or portion thereof, such as a statement. FIG. 18 illustrates a database environment 1800 having a first database server 1810 of a first, such as a source, database system. The first database server 1810 may be, for example, a node in the first multi-node database system, such as a replica node. The first database server can be in communication with one or more applications 1815 which issue requests for database operations to the first database server. During workload capture at the first database system, such as described in conjunction with Example 2, such as summarized in FIG. 3, the first database server 1810 can collect and store, such as using the context framework 516 and associated components of FIG. 5, routing information associated with a request for a database operation, or a portion thereof, such as a statement. The routing information, in a particular example, is a volume identifier or other identifier specifying a particular database node responsible for processing the request at the first database system. The node identifier can be stored in a capture file 1820, which may be structured in a similar manner as the capture file 405 of FIG. 4.

The node identifier stored in the capture file 1820 can be read by a replayer 1825 during workload replay at a second database system 1830 that can include a master node 1835 and a slave node 1840. Slave node 1840 can include records corresponding to the first node 1810. During replay, the replayer 1825 can prepare the request, such as a query language statement, for execution, including the identifier of the node to be accessed for the request. In return, the master node 1835 can return to the replayer 1825 a routing location for the slave node 1840. The replayer 1825, such as using a query language interface 1845, can send the request to be executed at the slave node 1840. In at least some cases, the routing location for the statement can be cached at the replayer 1825 to be used if the request occurs again during workload replay.

Figure 19:
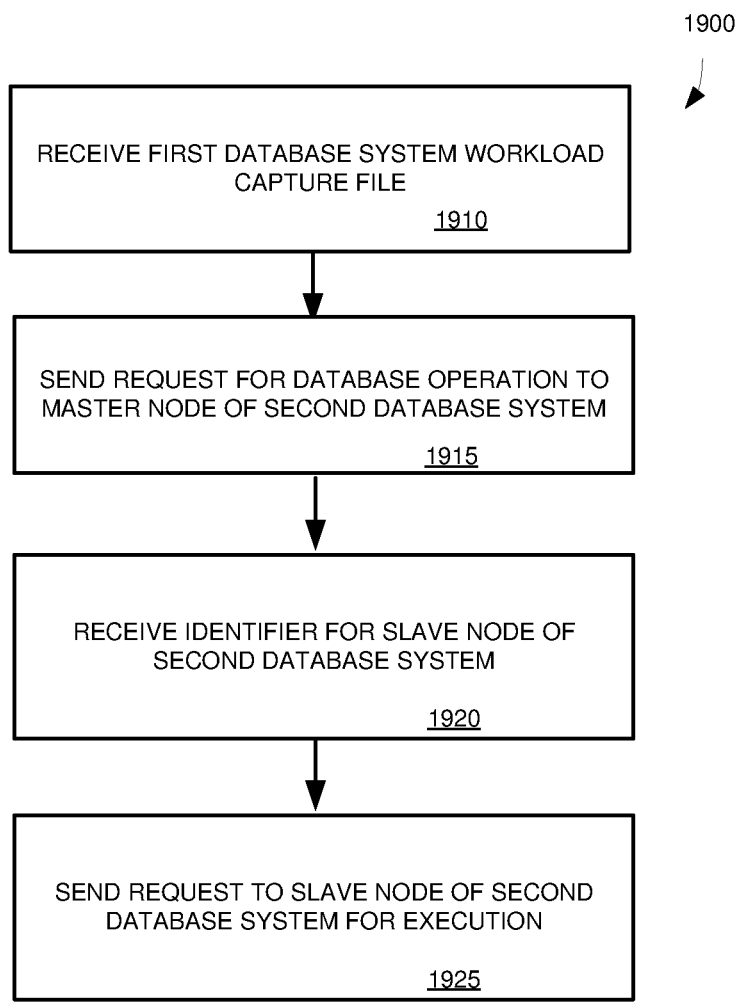
FIG. 19 a flowchart of a method for replaying requests for database operations captured from a first distributed database system at a second database system.

FIG. 19 illustrates a method 1900 of replaying a captured workload of a first, distributed database system at a second, distributed database system. In step 1910, a workload capture file is received that includes a request for a database operation executed at least in part at a slave node of the first database system. The request is associated with an identifier of the slave node of the first database system. In step 1915, the request for a database operation is sent to a master node of the second database system with the identifier of the slave node of the first database system. The master node, in step 1920, returns an identifier for a slave node of the second database system to execute the request. In step 1925, the request for a database operation is forwarded to the slave node of the second database system for execution.

Example 7—Selective Workload Capture

In at least some aspects, workload capture according to an example of the present disclosure can reduce processing loads and storage requirements for generating and storing a captured workload. However, particularly for heavily-used database systems, workload capture can still require significant processing or storage. In addition, capture of less than all workload events may be sufficient to, for example, evaluate the performance of a second database system compared with the first database system.

Figure 20:
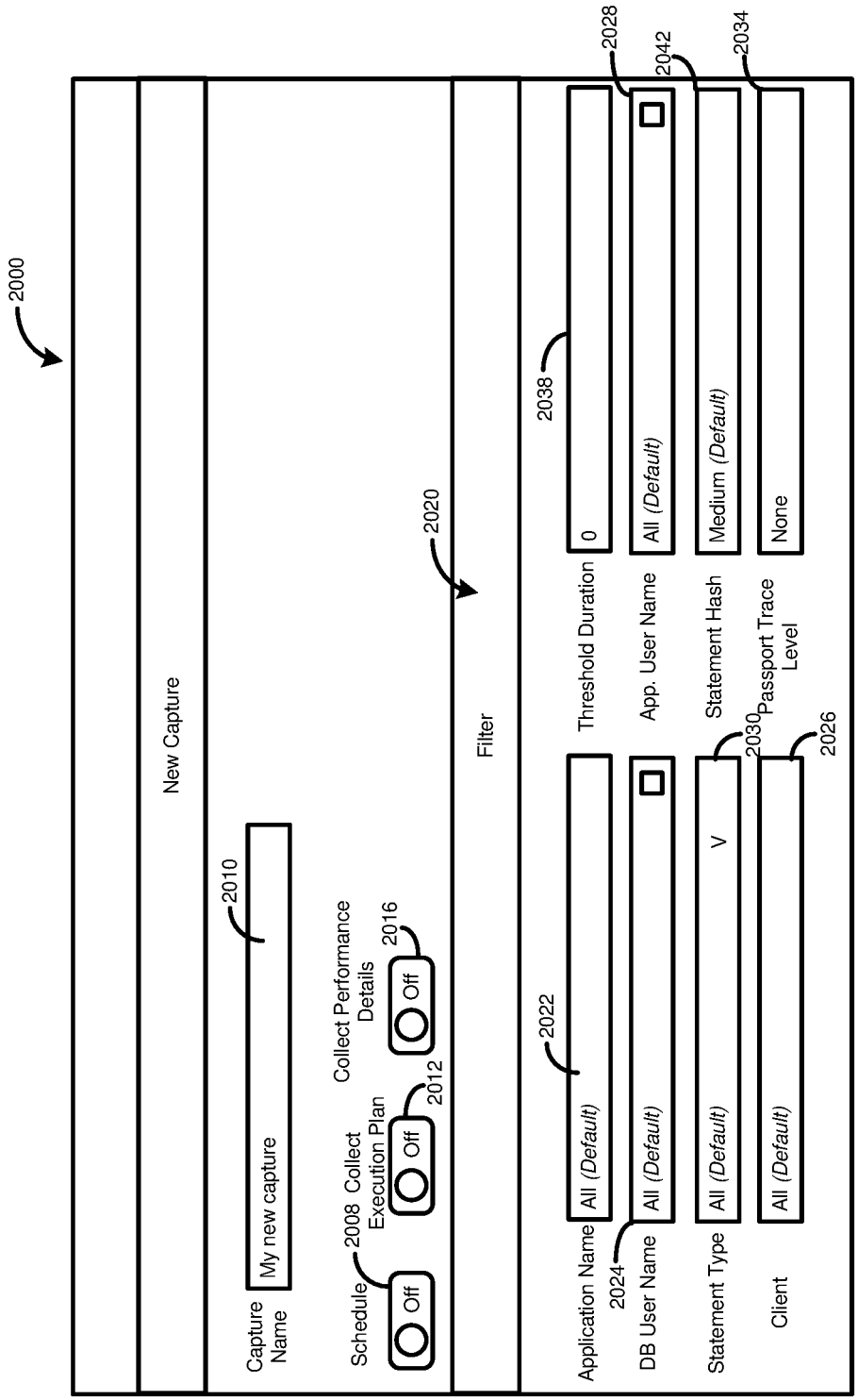
FIG. 20 is an example UI screen for initiating a workload capture, including selection of workload capture filter criteria.

According to this Example 6, a mechanism can be provide to allow a user, such as a database administrator, to select workload elements to be captured when a new workload capture process is initiated. FIG. 20 is an example UI screen 2000 illustrating workload capture options that may be set by a user in a particular implementation of this Example 6. In other implementations, a user may select more, fewer, or different options than presented in FIG. 20. In addition, the UI interface screen 2000 may be structured differently, or the user input specifying capture details can be specified other than through a UI screen. Although shown in conjunction with workload initiation, elements of the screen 2000 allowing workload capture to be defined (including filter criteria) can be included in an analogous UI screen to edit the properties of a previously created workload capture.

Screen 2000 includes a Capture Name field 2010, where a user can enter a name to identify the particular workload capture process being defined. Screen 2000 includes a schedule field 2008, where a user can select whether the workload capture process should be carried out according to a schedule, such as being set to occur at a defined time, or to recur at particular times or intervals. Through field 2012, a user may select whether to collect an execution plan associated with a query language statement, such as a query plan. Similarly, the user may be provided with an option to collect performance details associated with the workload/workload capture units or elements through field 2016. Collecting execution plans and performance details can enable more detailed comparisons to be made between database systems executing the workload, but can increase processor and memory use.

A filter portion 2020 of the screen 2000 can provide a user with filter elements that may be selected for the workload. In at least some aspects, the use of a filter is optional. In some cases, a user may select multiple filter criteria to be applied to workload capture. In other cases, a user may be limited to selecting a particular filter criterion or particular combinations of filter criteria.

The filter portion includes fields allowing a user to select only workloads originating from selected applications 2022, particular database users 2024, clients 2026, and application user names 2028. Using field 2030, a user can select one or more types of statements to be captured. For example, statements can include data manipulation statements (e.g., DELETE, INSERT, REPLACE, SELECT, UPDATE), data definition language statements (e.g. ALTER TABLE, CREATE INDEX, CREATE SCHEMA, CREATE SEQUENCE, CREATE STATISTICS, CREATE TABLE, CREATE VIEW), procedure statements (e.g. CALL, CREATE FUNCTION, CREATE PROCEDURE, CREATE TYPE), transaction statements (e.g. COMMIT, LOCK TABLE, ROLLBACK, SET TRANSACTION), session statements (e.g. CONNECT, SET HISTORY SESSION, SET SCHEMA, SET [SESSION], UNSET [SESSION]), or system statements (e.g. ALTER SYSTEM CONFIGURATION, ALTER SYSTEM SESSION SET, ALTER SYSTEM SAVE PERFTRACE, ALTER SYSTEM SAVEPOINT).

With a trace level field 2034, a user can select that only particular statements associated with a particular tracing level be included in the workload. For example, statements may be associated with a high, medium, or low tracing level. As tracing level moves from low to high, an increasing amount of information can be captured for the statements, such as access level logging for low tracing levels, packet logging at a medium trace level, and entire statement contents being traced at a high level of tracing. In particular implementations, a user may select to change the tracing level normally associated with a particular type of statement such that the statements are captured by the workload capture filter.

In field 2038, a user can select that only statements meeting or exceeding a threshold duration are captured. For example, if there are a significant number of requests for database operations, such as requests which include queries, capturing only requests (or components thereof) exceeding a threshold can reduce any performance impact of the workload capture process.

In field 2042, a user can select a statement hash level to be used in the workload capture, such as described above in Example 5. The hash level can be used to determine the granularity of result verification during the replay process. While a higher granularity can improve result verification, it can result in higher resource use at the workload capture database system and the replay database system.

Figure 21:
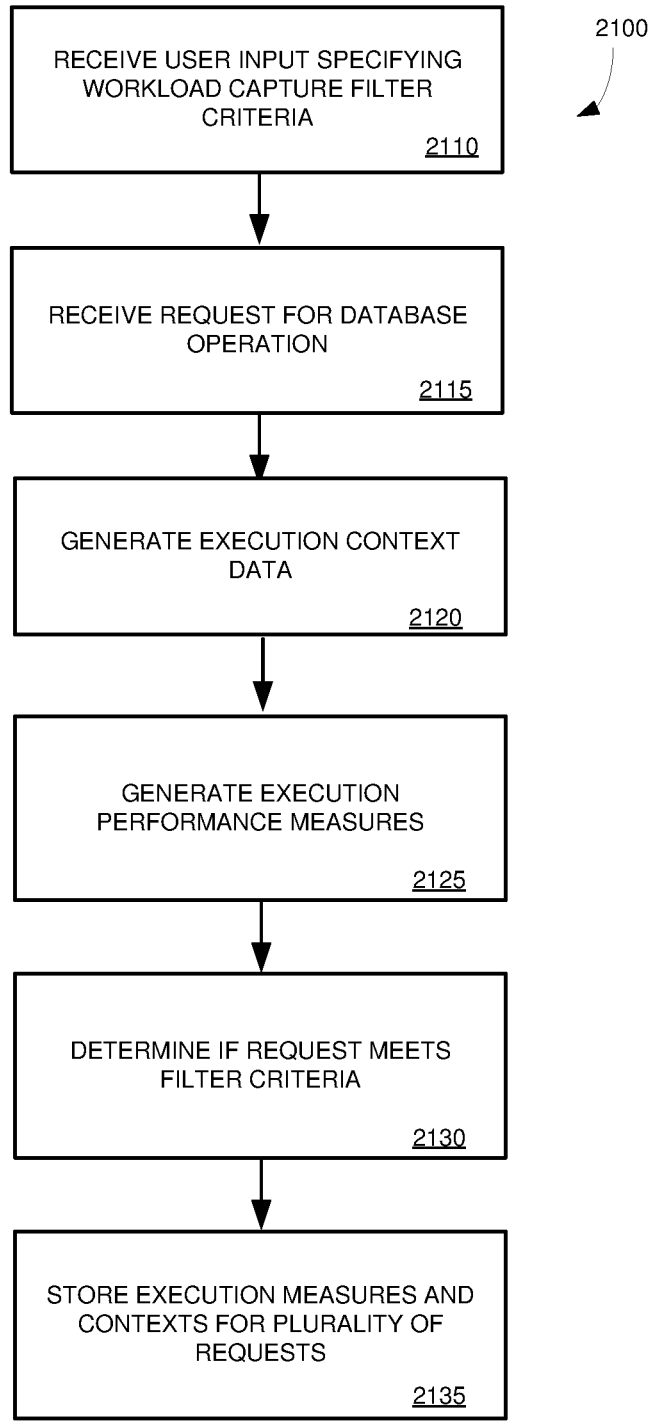
FIG. 21 is a flowchart of an example method for capturing requests for database operations meeting filter criteria in a database workload.

FIG. 21 illustrates a method 2100 for specifying workload capture filter criteria and capturing a database workload meeting the filter criteria. User input is received in step 2110 specifying workload capture filter criteria, such as requests for database operations originating with particular users or applications, or request meeting other selected criteria. In step 2115, the database system receives a request for a database operation. A component of the database system generates execution context data associated with the request in step 2120. In step 2125, a component of the database system generates performance measures associated with the request.

It is determined in step 2130 whether the request meets the filter criteria. If the filter criteria are met, the associated execution context data and the performance measures are stored in step 2135. In at least some implementations, the performance measures and the execution context data can be stored in an analytical schema, such as a star schema. For example, the performance measures can be stored as one or more fact tables associated with one or more dimensions represented by the execution context data.

Example 8—Incremental Preprocessing of Replay Operations

FIG. 6 of Example 2 provides a general depiction of how workload capture files generated from a workload at a first database system may be converted to replay files suitable for being replayed at a second database system. In some cases, the conversion can be carried out in a single process. This Example 7 provides a method for carrying out the conversion process incrementally, which can increase conversion speed and efficiency.

Figure 22:
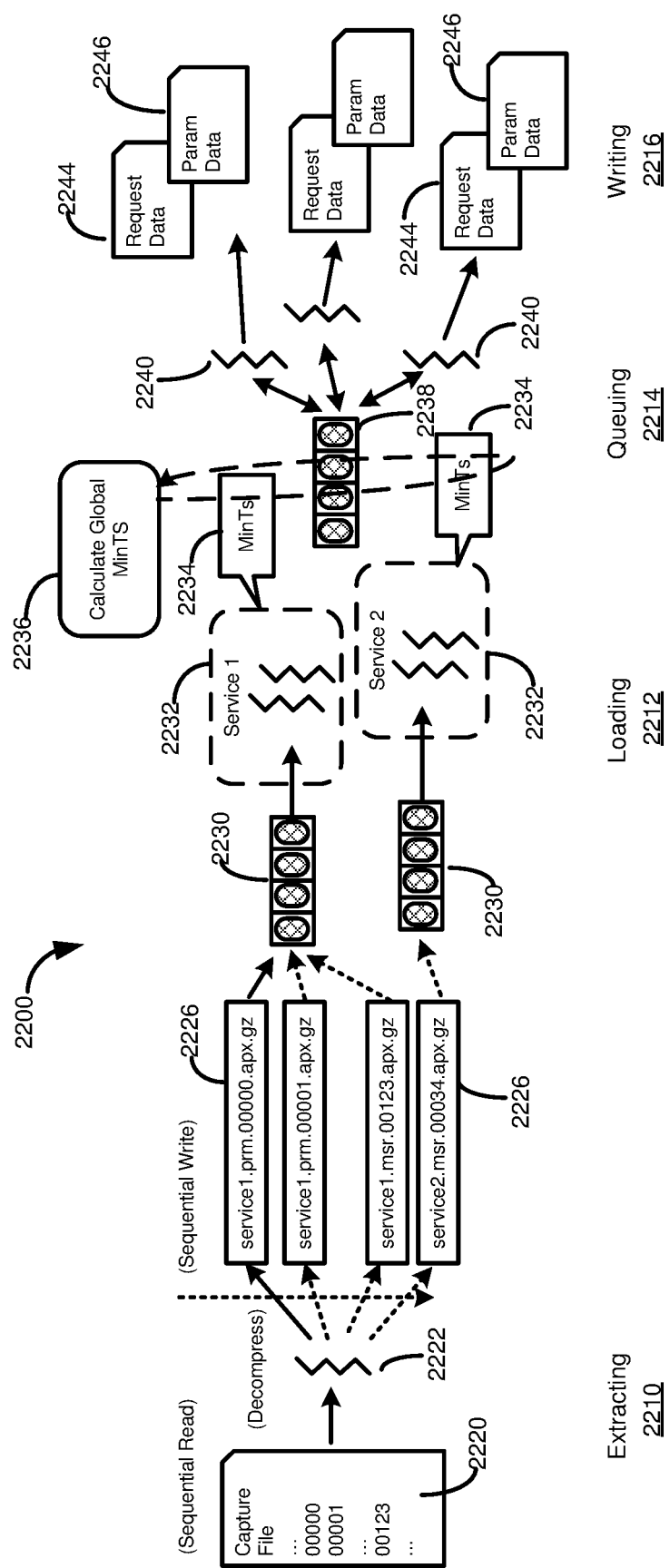
FIG. 22 is a diagram of a process for incrementally converting a database workload capture file into a format replayable at a database system.

With reference to FIG. 22, in at least some implementations, the conversion of one or more capture files into one or more replay files can be represented by the process 2200. The process 2200 include an extraction process 2210, a loading process 2212, a queuing process 2214, and a writing process 2216. In other implementations, one or more of processes 2210, 2212, 2214, and 2216 may be combined, or may be further divided into additional processes.

In extraction process 2210, a capture file 2220 can be read by one or more executor threads 2222. In particular examples, the thread or threads 2222 read the capture file 2220 sequentially. The executor threads 2222 can decompress a portion of the capture file 2220, such as into files for various database services (such as described in Example 2), including a service providing query language processing and a service providing location information for data and database system components). The executor threads 2222 can write the contents of the capture file 2220 as one or more files 2226, such as compressed files, associated with a service. Each service may include a plurality of files 2226. For example, a particular service may be associated with multiple context (or dimensions) files and one or more measure (or fact) files.

The files 2226 can be placed in a queue 2230 for the loading process 2212. In the loading process 2212, each service may be associated with a loader thread group 2232. Each loader thread group 2232 can read appropriate files 2226 from the queue 2230 to determine which elements of the files 2226 are associated with a particular capture unit, such as a session. Elements of files 2226 from different loading processes 2226 (such as from different services) can be combined based on their capture unit (such as a session). In some cases, the capture unit can be represented in an encoded format, such as a hash value. In particular aspects, a particular request for a database operation can include nested statements or operations. These statements or operations can, in some cases, be executed in parallel at multiple nodes of the database system. In such cases, the statements may be included in multiple workload capture files 2220, but can be combined during processing of the capture file or files 2220 during conversion to replay data, including the process shown in FIG. 22.

As the files are loaded by the loader thread groups 2232, context and measure information related to individual captures units, such as sessions (and their component operations) can be retrieved or collected by the loader thread groups and added to a queue 2238 in the queuing process 2214. The queue 2238 holds the information until it is ready to be written to individual stores, such as files, for the session. For example, multiple stores may be generated for context information, organized in a format useable by a replayer component to replay the workload at a second database system.

In some implementations, the queue 2238 can be a table partitioned by session. Information in the queue 2238, in particular examples, can be structured in a similar manner as context and measure information was associated with the session at the capture database system. For example, the queue 2238 can employ the star schema of FIG. 4.

The loader thread groups 2232 can maintain information about the minimum timestamp (e.g., a system timestamp, commit timestamp, or other identifier) of information to be read by the loader thread groups for their particular service. The loader thread groups 2232 can update a global timestamp 2236, which represents the minimum timestamp among all of the services being processed by the loader thread groups. The global timestamp 2236 can be compared with a timestamp for the session (or other capture unit). When the global timestamp 2236 is greater than (or, in some cases, greater than or equal to) the timestamp for a session, the session can be written to a store.

As a session (or other capture unit) is completed, and writer threads 2240 of the writing process 2216 are available, each session can be written (such as to a file or in memory) as request data 2244 and associated parameter data 2246. In some cases, request data 2244 can include context and measure information used to replay the session (including requests for database operations within the session). Request data 2244 can include performance data usable to compare execution of the requests with the execution of the requests at the workload capture database system. Parameter data 2246 can include parameters used in executing the requests, such as a statement string and parameter values used in executing query language operations.

The writer threads 2240 can combine context and measure data from the queue 2238 as appropriate for the sessions, and requests for database operations thereof. Within a session, requests for database operations, and components thereof (such as statements, and operations associated with statements), can be ordered by the writer threads 2240 during the writing process 2216, such as chronologically (such as by using timestamps, for example, a system timestamp, a commit timestamp, or another identifier), so that the requests will reproduce the workload of a first database system where the requests were captured when the requests are carried out by a second database system. For example, statements (or operations thereof) can be ordered within a session by a system clock timestamp or a global commit timestamp.

In some cases, when a session is written to the files 2244 and 2246, the data can be removed from the queue 2238, which can limit the amount of memory or storage needed for the queue. In other cases, the queue 2238 can be persisted, such as for use in comparing the performance of the database system where the workload is replayed to the performance of the workload capture database system.

The request data 2244 can include information to be replayed, such as by the replayer 355 of FIG. 3. Parameter data 2246 can include performance measures associated with execution of the session (or other unit) at the first database system, to be compared with performance measures generated during execution of the workload at the second database system (e.g., step 745 of FIG. 7). In at least some cases, the request data 2244 and parameter data 2246 can be replayed and used for comparison purposes multiple times. For example, the request data 2244 can be replayed at the second database system using different performance or operational settings. The performance at the various settings of the second database system can be compared with one another, and with the parameter data 2246.

Figure 23:
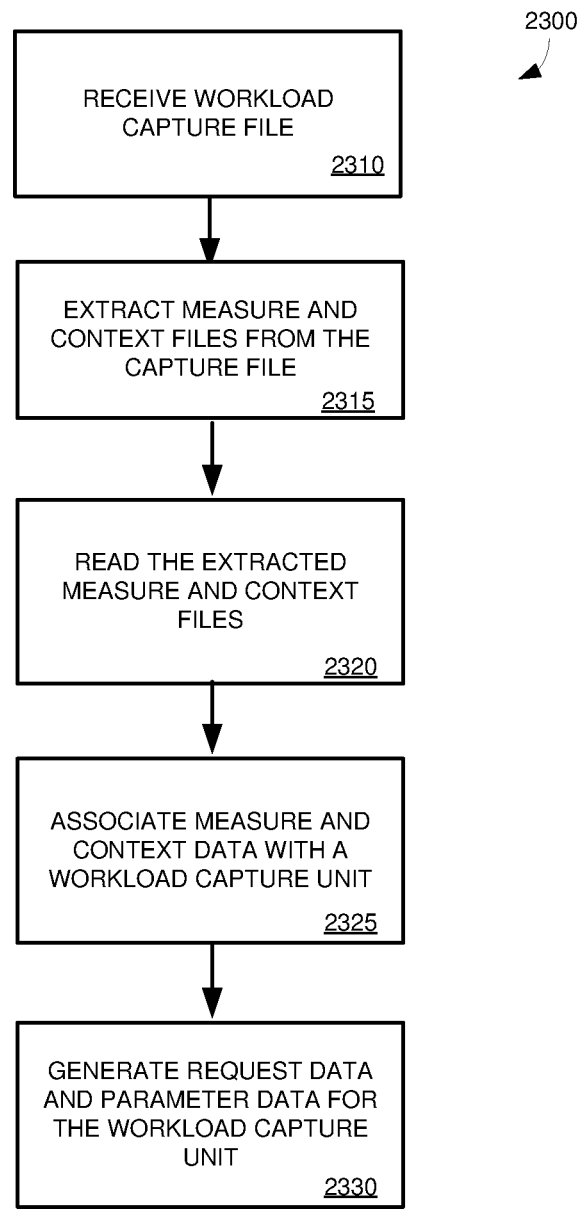
FIG. 23 is a flowchart of an example method for incrementally converting a workload capture file into request data and parameter data replayable at a database system.

FIG. 23 illustrates a method 2300 for incrementally processing a workload capture file to produce workload replay data. In step 2310, a workload capture file is received. The workload capture file includes a plurality of context files and at least one measure file. The context files and at least one measure file are extracted from the workload capture file in step 2315. In step 2320, context data and measure data of the context files and at least one measure file are read. The context data and measure data are associated with a workload capture unit, such as a session, in step 2325. In step 2330, the context data and measure data for the workload capture unit are used to generate request data and parameter data for the workload capture unit, such as a request data file and a parameter data file.

Example 9—Parallelized Workload Replay

As described above, such as in Example 7, in some cases, requests for database operations, such as query language statements, or components thereof, or requests to commit a query language statement or transaction, can be ordered prior to being replayed. Each of the requests for database operations can be a request for one, or more than one, database operation. In some cases, the ordering can occur during the processing of a captured workload, such as preprocessing a workload capture file. In other cases, the ordering can occur during the replay process. As described in Example 7, ordering of requests for database operations can be carried out using identifiers associated with the request, such as a snapshot timestamp (STS) or a commit ID (CID).

Such an ordering can help ensure that, during replay, requests for database operations are executed in the appropriate snapshot boundary. That is, for example, that requests for database operations are carried out in such a way that read and write operations are not carried out until any earlier write operations that are part of the snapshot that should be seen by the read or write operations have been replayed. The ordering can also provide that later write operations are not committed until all operations with a dependency on a particular snapshot have been assigned a snapshot timestamp.

However, such a serialized replay may not accurately reflect how requests for database operations were received or carried out at a source database system, such as a source database system where the workload was captured. For example, at least certain requests for database operations may have been carried out in parallel (such as by different users) at the source system. If the requests for database operations are carried out in a strictly serial fashion at the replay system, even if the requests are carried out in the appropriate overall order (such as respecting snapshot boundaries), database performance (such as throughput, processor use, or memory use) may be different at the replay system than if the requests were carried out identically to the source system, even if data in the database is consistent between both replay scenarios.

In addition, in some cases, it may be desirable to maximize replay concurrency. For example, it may be useful to maximize concurrency in order to stress test a database system. In another example, rather than comparing system performance from a resource use standpoint, it may be of higher important to compare system performance based on results (data consistency). In such cases, it may be desirable to carry out the replay as quickly as possible, even if the replay has higher concurrency than during original execution. Similarly, when replay is carried out for data replication purposes, it may be useful to maximize replay concurrency.

Figure 24A:
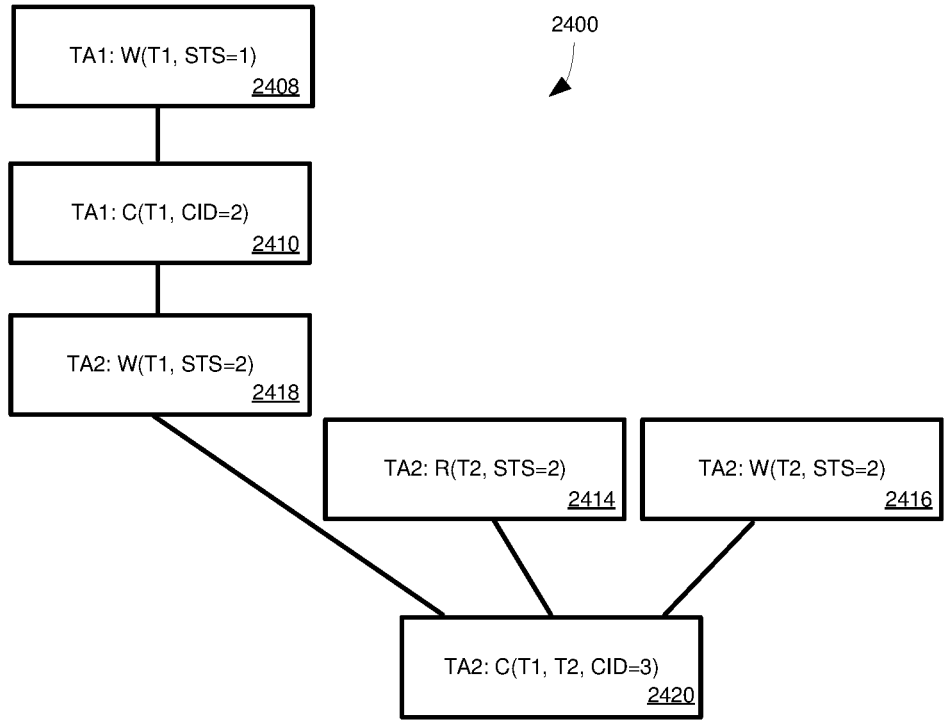
FIG. 24A is a diagram illustrating a plurality of requests for database operations and their interdependence.
Figure 24B:
FIG. 24B is a diagram of a plurality of requests for database operations ordered by chronological identifiers.

FIGS. 24A and 24B illustrate different replay scenarios. FIG. 24A illustrates requests for database operations 2400 occurring at a database system. The database system receives a request for a database operation 2408, a write operation, associated with a first database transaction TA1. Request 2408 has a snapshot timestamp of 1, and accesses table T1. A request for a database operation 2410 is a commit operation, having a commit ID of 2, on table T1. The database system receives a transaction TA2 with a read operation 2414 on table T2 having a snapshot timestamp of 2, a write operation 2416 on table T2 having a snapshot timestamp of 2, and a write operation 2418 on table T1 with a snapshot timestamp of 2. A commit operation 2420, having a commit ID of 3, commits the write operations on T1 and T2 associated with TA2.

In at least some cases, at least certain operations of TA2 can be performed in parallel, such as in parallel to one another and/or in parallel to requests for database operations of other transactions. For example, even though TA2 may have been executed after TA1 at a source database system, in at least some implementations, one or both of requests 2414 and 2416 can be executed prior to, or concurrently with, requests 2408 or 2410.

In some cases, two or more of the requests for database operations in TA2, 2414, 2416, 2418, can be performed in parallel. However, because the requests for database operations occurred within the same transaction, TA2, it is possible that a read operation may depend on the result of an earlier write operation. That is, the read operation may access a record modified or created by the earlier write operation. Or, a write operation may depend on an earlier read operation. That is, the read operation should read the state of a record before the subsequent write operations.

In some aspects, requests for database operations within the same transaction (or, in other aspects, within the same session) can be further analyzed to determine whether they can be executed concurrently, including using techniques described in this Example 8. For example, the requests for database operations may be analyzed in a more granular manner (such as by analyzing them by records accessed, rather than by tables accessed). If a dependency exists at the record level, the requests for database operations can be serialized. If no dependency exists at the record level, the requests for database operations can be replayed concurrently.

In other cases, requests for database operations within the same transaction (or, in some cases, for requests within the same session) can be serialized without considering whether a dependency exists between requests for database operations. In particular implementations, the request for database operations can be serialized as part of the parallelization procedure of this Example 8. Serialization can be carried out in another manner, including as part of the replay process, such as by the replayer 355 of FIG. 3 or by a component of the second database system 310. For example, a session layer (such as including the session manger 1520 of FIG. 15), can serialize requests for database operations within the same transaction. In particular examples, the requests for database operations within a transaction can be serialized using chronological identifiers or sequence identifiers associated with the requests. In further examples, a workload captured using statement level snapshot isolation can be used to help determine whether statements within a transaction are dependent, or to serialize statements within a transaction. Returning to FIG. 24, once both write operations of TA2 have been completed, the commit operation for TA2 may be carried out.

FIG. 24B illustrates transactions TA1 and TA2, and their component requests for database operations, in a strict serial order, ordered by snapshot timestamp and commit ID. Replaying the requests for database operations in the order of FIG. 24B will produce the same execution (read or write) results as the order of FIG. 24A, even if certain operations are carried out concurrently. However, it can be seen that the details of the execution are different. As FIG. 24B is serialized, it may take longer to execute than using the order of FIG. 24A, which allows for at least certain requests to be carried out concurrently, or out of a chronological order. If at least some of the operations in FIG. 24A are carried out concurrently, or out of chronological order, the system of FIG. 24A may have higher memory and processor use, and higher throughput/faster execution times, than a system executing operations as shown in FIG. 24B. Thus, it may be difficult to determine whether such performance differences result from hardware or software configuration differences between database systems executing the different scenarios, or if the performance differences are due to the differences in the scenarios themselves.

According to this Example 8, captured requests for database operations can be replayed accounting for dependencies (execution dependencies) between requests. Accounting for dependencies between requests for database operations can include capturing and analyzing dependencies between access units, such as tables or portions of a table, such as a table partition or table records. For each of the requests for database operations, information regarding the operation can be captured, such as one or more of an identifier associated with the access unit (such as one or more of a table ID, a partition ID, or a record ID) accessed by the request, a chronological identifier (such as one or more of a snapshot timestamp or a commit ID), and a transaction identifier. Other information regarding the requests for database operations can be captured, such as a session identifier. Although this Example 8 is generally described with respect to dependencies using tables as the access unit, it should be appreciated that the discussion applies analogously to other access units, such as table partitions or table records. In addition, a workload to be processed according to this Example 8 can be a workload captured using filter criteria, such as described in Example 6.

In at least some cases, the information can be captured according to an embodiment of the present disclosure, such as using the capture process and capture file structure described in Example 2. In other cases, the information can be captured, or stored, in another manner. For example, the captured information can be stored other than in a star schema.

Although, in particular implementations, the captured information can be used to replay a database workload to compare the performance of a replay database system with a source database system, the captured information can be replayed for other purposes, such as for replicating data. For example, a database system can be structured with multiple nodes, with at least some nodes (e.g., slave or replica nodes) replicating data maintained at another node (e.g., a source or master node). The workload capture and replay can, in some cases, be used to capture requests for database operations at a master or source node and replay them at a slave or replica node to provide replicated data. This Example 8 can provide for improved replication by parallelizing replay of requests for database operations, which can speed the replication process.

The captured information, in at least some cases, can be stored in an abstract data type, such as a graph. In a particular example, the graph is a directed, acyclic graph. Requests for database operations can be represented as vertices in the graph. Edges between vertices can represent chronological/execution dependencies between vertices. Vertices without dependencies (not connected by an edge) can be replayed in parallel. If a child vertex is dependent on one or more parent vertices, replay of the child vertex is not carried out until the child's parent vertices have executed.

Referring back to FIG. 24A as an example, vertices 2408 and 2410, and 2410 and 2418, are each in a parent-child relationship with one another, and so the later, child vertices cannot be replayed until the earlier, parent vertices have been replayed. Similarly, vertices 2414/2416 and 2420, and 2414/2416/2418 and 2420 are in a parent-child relationship, and so the child vertex cannot be replayed until the earlier, parent vertices have been replayed. However, vertices 2408, 2414, and 2416 have no edge with, or dependency on, any parent vertices, and can be replayed regardless of the replay status of any other vertex in FIG. 24A. As discussed above, in at least some implementations, replay of vertices within the same session or transaction can be serialized even if no dependency is identified, or such vertices can be further analyzed using a more granular access unit to determine whether the vertices can be replayed concurrently.

Significantly, in at least some aspects, replay can occur even though a vertex has a later chronological identifier than another, unreplayed vertex. For example, as shown, the write operation 2410 of TA1 on T1 may be performed concurrently with the read and write operations 2414, 2416 of TA2 on table T2. Vertices 2414 and 2416 have a snapshot timestamp of 2, while vertex 2408 has a snapshot timestamp of 1. However, because the graph of FIG. 24A demonstrates that there is no edge between vertices 2414/2416 and vertex 2408, vertices 2414 and 2416 can be replayed before, or in parallel with, vertex 2408.

Note that this execution order may different than the original execution order. That is, while two or more of requests 2414, 2416, 2418 may originally have been carried out in parallel, they would not have been carried out until after the commit of TA2 in request 2410, as that incremented the snapshot timestamp of the database system from 1 to 2 (the snapshot timestamp assigned to request 2414, 2416, 2418). However, because TA1 changed T1, and requests 2414, 2416 access T2, requests 2414, 2416 do not depend on the commit of TA1, and so can be replayed prior to the commit of TA1 in request 2410.

In at least some cases, a request for a database operation is not replayed out of a chronological order even if it exhibits no dependency on another vertex. For example, replaying vertices 2414 and/or 2416 with or before vertex 2408 may not result in inconsistent data between the requests as-executed on a first database system and on a second database system. However, as described above, executing requests for database operations outside of a particular chronological order can cause the execution to no longer accurately reflect execution at the source database system, including the use of system resources at the first database system. Accordingly, in some implementations, replay of requests for database operations having the same chronological identifier (e.g., snapshot timestamp) are replayed once earlier requests for database operations have been replayed. A counter can be used to track the current minimum STS value of the replayed requests for database operations, with the counter incrementing upon each commit operation. For instance, referring again to FIG. 24A, when requests for database operations are to be replayed respecting both dependencies between requests and an overall chronology, execution of request 2414 and 2416 is delayed until both requests 2408 and 2410 have been executed. After transaction TA1 has been committed in request 2410, and the system timestamp incremented from 1 to 2, any of requests 2414, 2416, and 2418 can be executed in parallel, as there is no dependency between them. As discussed above, in at least some implementations, replay of requests for database operations within the same session or transaction can be serialized even if no dependency is identified, or such requests can be further analyzed using a more granular access unit to determine whether the requests can be replayed concurrently.

In some aspects, captured requests for database operations can be replayed as long as dependencies between vertices are respected, even if the replay occurs outside of a chronological (e.g., snapshot timestamp/commit ID) order. This may be useful, for example, when replay is being used for data replication, result comparison, or stress testing, rather than performance comparison of database systems. In such a case, as described above, request 2414 and/or 2416 may be executed prior to, or in parallel with, any of requests 2408, 2410, 2418.

Replay of requests for database operations, and the determination of dependencies between requests (including in a graph), can depend on various types of dependencies between the requests for database operations, and their associated chronological identifiers (e.g., commit ID or snapshot timestamp values). One type of dependency is the dependence of a write/commit operation on an earlier read operation, which can represent a read-write dependency. In this case, at the source system, the assignment of the snapshot timestamp to the statement typically should occur before the assignment of the commit ID to the transaction (or write operation). In this way, the commit ID of the write operation will be higher than the snapshot timestamp of the read operation. So, the write operation will not be visible to the read operation, as only requests for database operations have a snapshot timestamp equal to, or lower than, the snapshot timestamp of the read operation will be visible to the read operation. Expressed another way:

$$W1(T1)R2(T1)C1: STS(R2)<CID(C1)$$

That, is for database operations of a write W1 on a table T1 and a read operation R2 on T1, followed by a commit operation C1, when snapshot timestamp and commit ID values are assigned at the replay system, the snapshot timestamp of R2 should be less than the commit ID assigned to the commit/write operation. So, when the operations are replayed, C1 commit ID generation should start after assigning a snapshot timestamp to R2.

As another type of dependency, a statement/read operation can depend on an earlier write/commit operation, which can be referred to as a write-read dependency. Typically, a commit ID should be assigned to the write operation before the snapshot timestamp is assigned to the read operation. In that way, the read operation will be assigned a timestamp that is greater or equal to the write operation, and so the earlier write operation will be visible to the later read operation. Expressed another way:

$$W1(T1)C1R2(T1): STS(R2) \geq CID(C1)$$

That is, for database operations of a write on table T1 followed by a commit, and then a read operation on T1, the snapshot timestamp of the read operation R2 should be greater than or equal to the commit ID of the write operation. During replay, snapshot timestamp generation for the read operation should be carried after the generation of the commit ID.

As yet another type of dependency, a write operation can depend on an earlier write operation, which can be referred to as a write-write dependency. Typically, a snapshot timestamp should be assigned to the later write operation after the commit of the earlier write operation. In this way, a later write operation will have a snapshot timestamp that is greater than or equal to the commit ID of the earlier write operation, and so the results of the earlier write operation will be visible to the later write operation. Expressed another way:

$$W1(T1)C1W2(T1)C2: CID(C2) \geq CID(C1)$$

This relationship can also be expressed in terms of table locking, where W1 acquires a lock on table T1 before W2 acquires a lock on T1. Expressed yet another way:

$$STS(W2) \geq CID(C1) > STS(W1)$$

Or, for a first write operation W1, the snapshot timestamp of W1 should be less than the commit ID of W1, and, for a later write operation W2, the snapshot timestamp of W2 should be greater than or equal to the commit ID C1 (and, therefore, also be greater than the snapshot timestamp of W1). In order to respect this dependency, when replayed, a lock request for W2 should start after the commit ID C1 has been generated (or, the snapshot timestamp assigned to W2 should be generated after the commit ID C1 has been generated).

As discussed above, in at least some implementations, the above procedure is not carried out for statements within the same transaction (or, in some implementations, for statements within the same session). For example, the statements may be replayed serially (with the serialization occurring as part of the procedure of this Example 8, by a replayer, or by a component (e.g., the session layer) of a replay database system). Or, in a further implementation, statements within a particular transaction (or session) can be analyzed at a more granular level (for example, by carrying out the procedure of this Example 8 using a record as the access unit, rather than a table). Replay of statements which are still dependent at the more granular level can be serialized.

Figure 25:
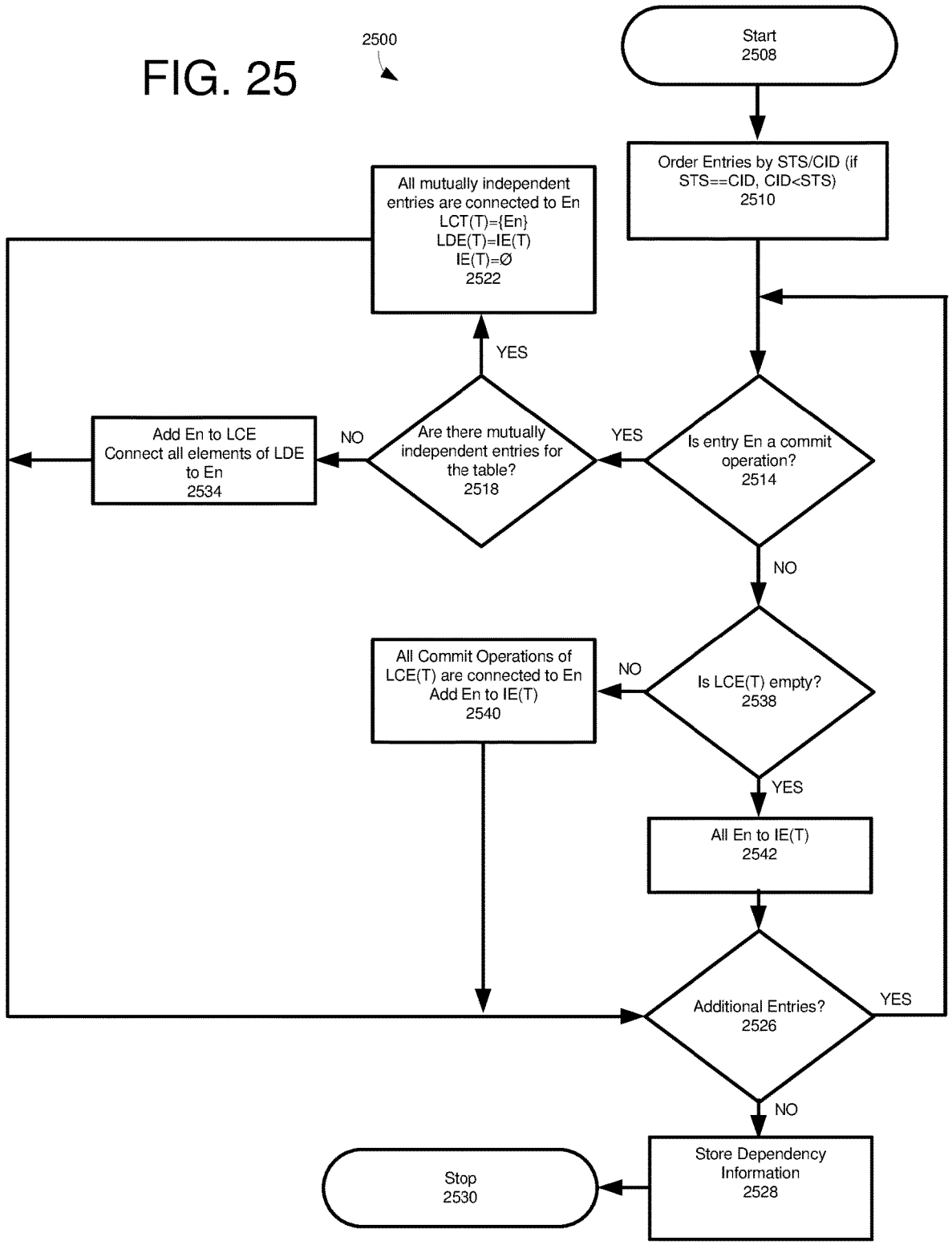
FIG. 25 is a flowchart of a method for determining execution dependencies between requests for database operations.

FIG. 25 presents a flowchart of a method 2500 according to an aspect of the present disclosure for determining dependencies between requests for database operations, including for use in generating a graph of the relationship between vertices representing requests for database operations. The method 2500 uses the following terminology. $E_n$ represents a particular request for a database operation (e.g., read, write, commit) on a particular access unit (e.g., table, partition, record). $T_n$ represents a set of accessed access units for $E_n$. IE(T) is the associated mutually independent entry set for a particular access unit T. LCE(T) is the last independent commit entry set of T, and LDE(T) is the state if IE(T) before IE(T) is cleared.

The method 2500 can represent a particular implementation of the following procedure for determining execution dependencies in a group of requests for database operations ordered by chronological identifier (e.g., STS and CID):

Scan the entries (E) for the requests from the beginning and, for $\forall T \in T_n$:

If $E_n$ is a commit (RW dependency)
If IE(T)≠Ø then $\forall E \in IE(T)$ are connected to $E_n$, and let LCE(T):={$E_n$}, IE(T):=Ø, LDE(T):=IE(T)

If IE(T)=¢ then let LCE(T):=LCE(T) U {$E_n$} (independent commits) and connect $\forall E \in LDE(T)$ to $E_n$
Else if LCE(T)≠Ø (WR dependency, WW dependency)
$\forall C \in LCE(T)$ is connected to $E_n$ then let IE(T):=IE(T) U {$E_n$}
Else IE(T)=IE(T) U {$E_n$}

In at least some cases, the time complexity of the procedure can be O(# entries*the expected size of T).

With reference to FIG. 25, the method begins in step 2508. In step 2510 the individual request for a database operation (also termed entries) are ordered by a chronological identifier, such as a snapshot timestamp or a commit ID. In the event a commit ID for an entry is equal to the snapshot timestamp of another entry, the entry with the commit ID is placed higher in the order (e.g., is processed before) than the entry having the snapshot timestamp. In at least some examples, the higher ordering of commit operations is because the commit operation causes the snapshot timestamp value of the database system to increment. For example, if a current snapshot timestamp is 10, and a commit operation is carried out, the snapshot timestamp will be incremented to 11, and 11 will be assigned as the commit ID of the commit operation. In some aspects, if multiple requests for database operations have the same snapshot timestamp, they can be ordered within that timestamp group in any order. However, if desired, additional rules can be implemented to provide an ordering within a timestamp group, such as ordering read requests before write requests (or vice versa), prioritizing requests for database operations based on a particular database user, client, or table (or subunits thereof) accessed by the requests for operations, or by prioritizing requests associated with particular nodes in a distributed database system.

After being placed in order, entries, $E_n$, are analyzed using the following steps. In decision 2514, it is determined whether $E_n$ represents a commit operation. If $E_n$ is a commit operation, the method 2500 proceeds to decision 2518. In decision 2518, the method 2500 determines whether IE(T) contains any entries. If IE(T) contains entries, then, in step 2522, all of the members of IE(T) are connected to the entry, $E_n$, currently being analyzed. $E_n$ is assigned as the last independent commit entry, LCE(T), the members of IE(T) are added to LDE(T), and IE(T) is cleared (all entries are removed from the set to provide an empty set).

After step 2522, the method 2500 proceeds to decision 2526 to determine whether there are additional entries $E_n$ to be processed. If there are additional entries, the method 2500 proceeds to the next entry and returns to decision 2514. If there are no additional entries, the method 2500 stores dependency information for the entries in step 2528, and the method ends in step 2530. In some aspects, storing dependency information can include storing a data structure, such as a graph, containing information regarding interdependencies (edges) between entries (vertices). In other aspects, storing dependency information can include associating, and storing, dependency information with each of the entries. For example, the dependency information can be stored with information sufficient to execute a request for a database operation associated with the entry. In a particular example, the dependency information can be stored by the writer threads 2240 in the request data 2244 and/or the parameter data 2246 in the process 2200 of FIG. 22.

If, in decision 2518, it was determined that IE(T) did not contain any entries, the method 2500 proceeds to step 2534. In step 2534, $E_n$ is added to the last independent commit entry set of T, LCE(T), and all of the elements of LDE(T) are connected to $E_n$. The method 2500 then proceeds to decision 2526 to determine whether additional entries are to be processed.

If, in decision 2514, it was determined that $E_n$ was not a commit operation, the method 2500 proceeds to decision 2538. In decision 2538, the method 2500 determines whether there are any members in LCE(T). If so, all of the commit operations in LCE(T) are connected to $E_n$, and $E_n$ is added to IE(T) in step 2540. The method 2500 then proceeds to decision 2526 to determine whether additional entries are to be processed.

The method 2500 proceeds to step 2542 if it is determined in decision 2538 that LCE(T) is not empty. In step 2542, $E_n$ is added to IE(T), and then the method 2500 proceeds to decision 2526 to determine whether additional entries are to be processed.

As an example of how the method 2500 applies, consider a table T1 having:
IE(T1): $\{E_2(TS10, DEP:E_0E_1)\}$
LCE(T1): $\{E_0, E_1\}$
LDE(T1): Ø

For a next entry $E_3$, a read operation on table T1 having a snapshot timestamp of 10, method 2500 determines in step 2514 that the entry is not a commit. In decision 2538, LCE(T1) is determined not to be empty, so the method 2500 proceeds to step 2540. In step 2540, $E_3$ is connected to (e.g., dependent on) $E_0$ and $E_1$ (the members of LCE(T1)), and $E_3$ is added to IE(T1) (the members of which are also dependent on the members of LCE(T1)) to provide:
IE(T1): $\{E_2, E_3$ (DEP: $E_0, E_1)\}$
LCE(T1): $\{E_0, E_1\}$
LDE(T1): Ø

Figures 26A, 26B, 26C:
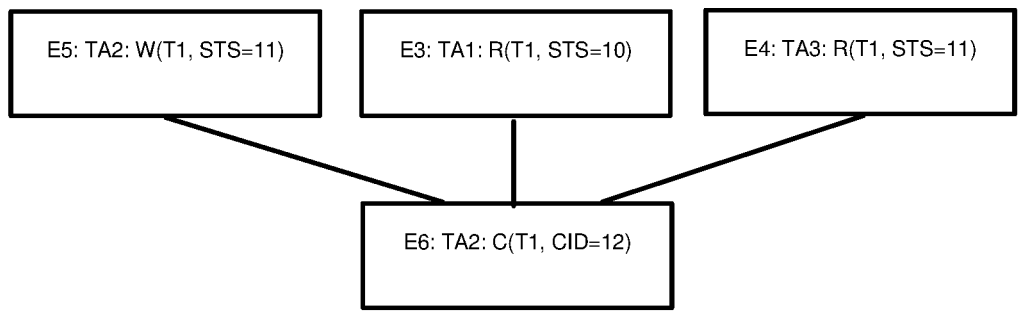
FIG. 26A is a table of requests for database operations.
FIG. 26B is a table of the requests for database operations of FIG. 26A, ordered by chronological identifiers.
FIG. 26C is a graph of a portion of the requests for database operations of FIG. 26B, where edges between vertices indicate interdependent requests for database operations.

For a next entry $E_4$, a commit operation on T1 with a commit ID of 11, decision 2514 of method 2500 determines that $E_4$ is a commit entry, and so the method proceeds to step 2518. In step 2518, it is determined that IE(T1) is not empty, and so the method 2500 proceeds to step 2522. $E_4$ is connected (e.g., made dependent on) all elements of IE(T1), $E_2$ and $E_3$. LDE(T1) is set to $E_2$ and $E_3$, and IE(T) is made an empty set. After processing $E_4$, the parameters of method 2500 for T1 are:
IE(T1): Ø
LCE(T1): $\{E_4(DEP: E_2, E_3)\}$
LDE(T1): $\{E_2, E_3\}$ The application of the method 2500 will be further described with respect to the data set 2604 shown in FIG. 26A-26G. FIG. 26A provides a list of unordered database read, write, and commit operations. In executing the method 2500, in step 2510, the operations are ordered by commit ID and snapshot timestamp, to provide the list of operations 2608 in FIG. 26B.

Once the operations are ordered, the method 2500 proceeds to decision 2514 to determine whether the first entry, $E_1$, is a commit operation. Entry $E_1$ is not a commit operation, it is a write operation on Table T2, so the method 2500 proceeds to decision 2538. There are currently no members in LCE(T2), so the method 2500 proceeds to step 2542, and $E_1$ is added to IE(T2). A similar procedure is followed for entries $E_2$-$E_5$, all of which are read or write operations on tables T1 or T2. At the end of processing $E_5$, the following are true:
IE(T1)=$E_3$, $E_4$, $E_5$;
IE(T2)=$E_1$, $E_2$
LCE(T1)=LCE(T2)=Ø
LDE(T1)=LDE(T2)=Ø

$E_6$ is a commit operation on T1, so according to decision 2514, the method 2500 proceeds to decision 2518. Because IE(T1) is not empty, the method proceeds to step 2522. In step 2522, $E_3$, $E_4$, and $E_5$ are connected to $E_6$, $E_6$ is added to LCE(T1) to provide $\{E_6\}$, the contents of IE(T1) are added to LDE(T1) to provide $\{E_3, E_4, E_5\}$, and IE(T1) is cleared. At this point, the generated graph is as shown in FIG. 26C.

Figure 26D:
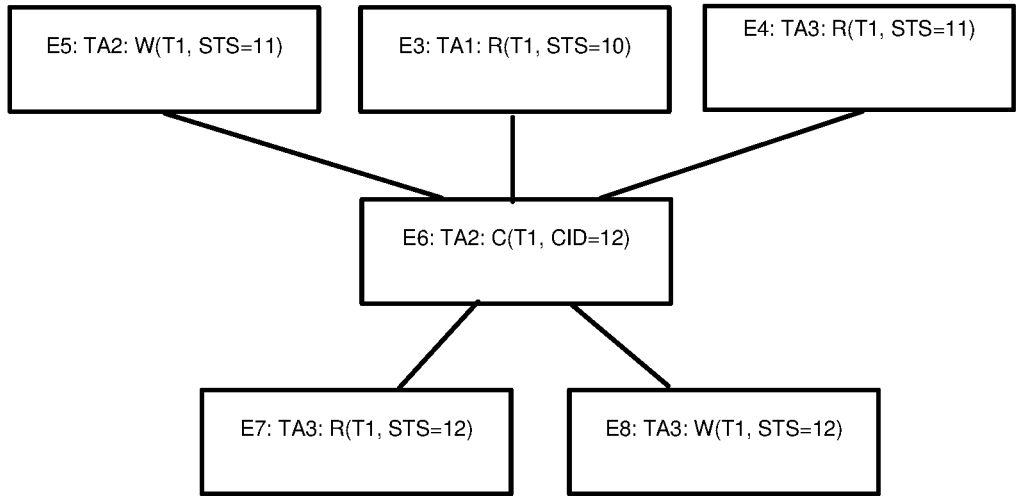
FIG. 26D is a graph of a portion of the requests for database operations of FIG. 26B, where edges between vertices indicate interdependent requests for database operations.

Processing $E_7$, a read operation on T1, at decision 2514 the method 2500 determines that the entry is not a commit operation, and so proceeds to decision 2538 to determine whether LCT(T1) is empty. In this case, LCT(T1) is not empty, so the method 2500 proceeds to step 2540. $E_7$ is connected to the members of IE(T1), $E_6$, $E_7$, which are also added to IE(T1). The method 2500 proceeds to analyze $E_8$, which is a write operation on T1, and thus processed according to the same rules as $E_7$. At this point, the generated graph is as shown in FIG. 26D, and the following are true:
IE(T1)=$E_7$, $E_8$
IE(T2)=$E_1$, $E_2$
LCE(T1)=$E_6$;
LCE(T2)=Ø
LDE(T1)=$E_3$, $E_4$, $E_5$
LDE(T2)=Ø

Figure 26E:
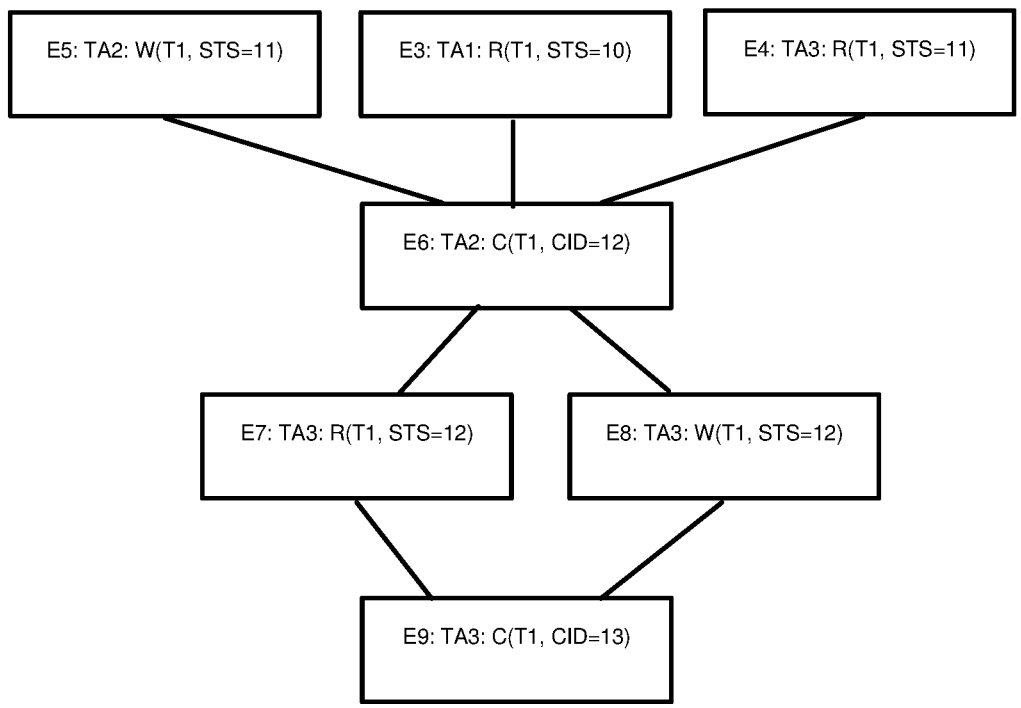
FIG. 26E is a graph of a portion of the requests for database operations of FIG. 26B, where edges between vertices indicate interdependent requests for database operations.

The method proceeds to analyze $E_9$, a commit operation on T1. Decision 2514 indicates that, because $E_9$ is a commit, decision 2518 should be carried out, which determines that IE(T1) is not empty. Accordingly, in step 2522, the members of IT(T1), $E_7$ and $E_8$, are connected to $E_9$. $E_9$ is added to LCE(T1), $E_7$ and $E_8$ are added to LDE(T1), and IE(T1) is cleared. The graph now appears as shown in FIG. 26E, and the following are true:
IE(T1)=Ø
IE(T2)=$E_1$, $E_2$
LCE(T1)=$E_9$;
LCE(T2)=Ø
LDE(T1)=$E_7$, $E_8$
LDE(T2)=Ø

Finally, $E_{10}$ is processed. $E_{10}$ is a commit of both T1 and T2, so decision 2514 indicates that decision 2518 should be carried out to determine whether IE(T1) and IE(T2) are empty. Regarding T1, IE(T1) is empty, so the method proceeds to step 2534, $E_{10}$ is added to LCE(T1) and the members of LDE(T1) are connected to $E_{10}$. Regarding decision 2518 as to the commit of T2, IE(T2) is not empty, so decision 2518 indicates that step 2522 should be carried out. The members of IE(T2), $E_1$ and $E_2$, are connected to $E_{10}$, $E_{10}$ is added to LCT(T2), $E_1$ and $E_2$ are added to LDE(T2), and IE(T2) is cleared. The final graph for entries $E_1$-$E_{10}$ is shown in FIG. 26F, and in an alternate form in FIG. 26G. The following are true after processing of $E_{10}$:
IE(T1)=Ø
IE(T2)=Ø
LCE(T1)=$E_9$, $E_{10}$;
LCE(T2)=$E_{10}$
LDE(T1)=$E_7$, $E_8$
LDE(T2)=$E_1$, $E_2$ With reference to FIG. 26G, the vertices 2622 of the graph 2620 can be traversed and processed by one or more worker processes 2626. In particular aspects, at least a portion of the vertices 2622 can be processed concurrently, and a plurality of worker processes 2626 are used. Each vertex 2622 can be processed as soon as its parent vertices, if any, are processed. So, upon initiation of replay of requests for database operations, one or more of the vertices for entries $E_3$, $E_5$, and $E_2$ can be processed concurrently by the worker processes 2626. Although two worker processes 2626 are shown, more or fewer worker processes can be used. In some implementations the number of worker processes 2626 can be adjusted, including dynamically, based on a number of simultaneously parallelizable entries. For example, worker processes 2626 may be spawned and terminated as a number of simultaneously parallelizable vertices increases or decreases during replay. In another example, the number of worker processes 2626 can be based on a number of parallelizable entries in the graph 2620, such as a maximum number of parallelizable entries. In a specific example, the number of worker processes 2626 is equal to a maximum number of simultaneously parallelizable entries.

The preceding discussion assumes that there are no dependencies between read and write statements within the same transaction (e.g., E4, E7, and E8). As discussed above, in at least some implementations, statements within the same transaction (or, in other implementations, within the same session) can be serialized or further analyzed even if they are otherwise not dependent on other statements/vertices according to the technique of this Example 8. For example, such statements may be serialized during the technique of this Example 8, by a replayer, or by a replay database system (such as by a session layer component). In further examples, the statements may be analyzed at a more granular access unit (e.g., records accessed by the statements), and replayed concurrently if there is no dependency between the statements, or serialized if the statements remain dependent.

In some cases, the graph 2620 can be traversed from a single entry point (such as the first/highest ordered vertex). As parallelizable vertices 2622 are located, they can be assigned to additional worker processes 2626. In other cases, the graph 2620 can be traversed from multiple entry points, including simultaneously. In a particular example, the graph 2620 can be traversed to locate vertices having no parents/dependencies. Two or more of such independent vertices 2622 can be simultaneously processed by worker processes 2626.

In another example, an ordered set of entries can be processed by breaking the set (or list) at various points into two or more subsets. Each subset can be used to form a graph of dependencies between vertices, such as using the method 2500 of FIG. 25. Each graph can be traversed by one or more worker processes. In this way, replay of requests for database operations can be further parallelized. The separate graphs can be merged, or otherwise analyzed, to account for any dependencies between vertices in different graphs. In a further example, an unordered, or partially ordered, set of requests for database operations can be split into multiple subsets, and each subset processed at least generally as described for the method 2500. The multiple graphs generated can be merged, or otherwise analyzed, to account for any dependencies between vertices in different graphs.

Although this Example 8 has generally been described with respect to requests for database operations such as DML statements and commit operations, it should be appreciated that other types of requests for database operations can be processed according to this Example 8. For example data definition language (DDL) statements can be processed as described above for DML (read and write) statements. Typically, DDL statements should not conflict with DML statements, because of locking associated with DDL statements.

In some cases, DDL statements can affect multiple tables (or other access units). For example, a change to a user or schema name can apply to multiple, and in some cases, all, access units. Accordingly, a commit associated with a DDL statement can become a serialization point in the graph, and possibly create a bottleneck for replay. In at least some cases, after the DDL statement has been executed, subsequent requests for database operations can be parallelized, such as using the method 2500 of FIG. 25.

When the processing of a parent vertex has completed, at least to a particular point, the parent vertex can notify dependent vertices. According to a particular aspect, if a parent vertex represents a particular type of request for a database operation, such as a data manipulation language (DML) statement, the parent can send a notification when a snapshot timestamp has been acquired by the corresponding request for a database operation. According to another aspect, if a parent vertex represents another type of request for a database operation, such as a commit operation, the parent can send a notification when a commit ID has been assigned to the request. When a child vertex has received notifications from each of its parent vertices, the child vertex can be executed/replayed, and a notification sent to any of its child vertices.

As an example, in FIGS. 26F and 26G, entry $E_{10}$ is dependent on $E_8$, $E_7$, $E_2$, and $E_1$, all of which represent DML statements. As each of $E_8$, $E_7$, $E_2$, and $E_1$ are executed, they send a notification to $E_{10}$. Once $E_{10}$ has received notifications from each of $E_8$, $E_7$, $E_2$, and $E_1$, $E_{10}$ may be processed and, in turn, provide a notification to its child nodes (if any, not shown).

In particular implementations, requests for database operations can be replayed on a distributed database system that includes a plurality of database nodes. In at least some cases, a graph may include vertices from a plurality of nodes. In such cases, the individual nodes can communicate to other nodes information regarding notifications issued by the vertices of their node. In one example, a node broadcasts execution notifications to other nodes of the distributed database system, or at least other nodes having a dependency on the particular vertex issuing the notification. The nodes, in particular examples, can maintain streaming communication channels so that execution notifications can be rapidly communicated to other nodes. In some cases, the graph can include, or otherwise be associated with, information regarding nodes on which dependent requests for database operations are located, including, at least in some cases, the location (e.g., node in the distributed database system) of the dependent vertex.

In a particular implementation, a node or nodes in a distributed database system can store information, such as in a vector or another data structure, regarding vertices from which execution notifications have been received. A worker process traversing the graph and executing entries can check the vector to determine whether all notifications have been received from all parent vertices, and thus whether a particular vertex is executable.

In some aspects, instead of, or in addition to, node to node communication regarding execution notifications issued by vertices, a master node, such as a node managing the replay of requests for database operations, can maintain information regarding execution notifications. In a particular example, the master node can maintain a value associated with the minimum entry number replayed on the database system, a chronological identifier (such as a minimum snapshot timestamp or commit ID executed in the distributed database system), or a combination thereof. The master node may periodically poll the nodes to determine their current minimum processed entry number/chronological identifier, the nodes may periodically send such information to the master node, or a combination thereof. In other cases, the master node can maintain the vector (or other data structure) regarding executed entries, such as by periodically polling nodes of the database system, receiving such information broadcast to the master node by the individual nodes, or a combination thereof. The master node can periodically broadcast an updated vector, or counter, to the distributed nodes.

When information regarding execution notifications is stored, such as in a vector or other data structure, information can be removed from storage periodically, such as when the identity of a parent vertex is no longer needed to determine the executability of a child vertex. In various implementations, the determination can be made on a system-wide or node-specific bases. In another implementation, such as when a master node maintains a minimum replayed entry or timestamp value, entries less than or equal to the minimum replayed value can be removed from storage of the individual nodes.

When used in a workload capture and replay system, at least certain aspects of this Example 8, such as the method 2500 of FIG. 25, can be carried out as part of the preprocessing of the captured workload, such as in step 715 of FIG. 7, or in the incremental processing method 2200 of FIG. 22. For example, the ordering can be carried out by the writer threads 2240. In other examples, the ordering can be carried out in another manner, such as by the replayer 355 of FIG. 3. In further aspects, this Example 8 is carried out other than in a workload capture and replay system as described in the present disclosure.

Figure 27:
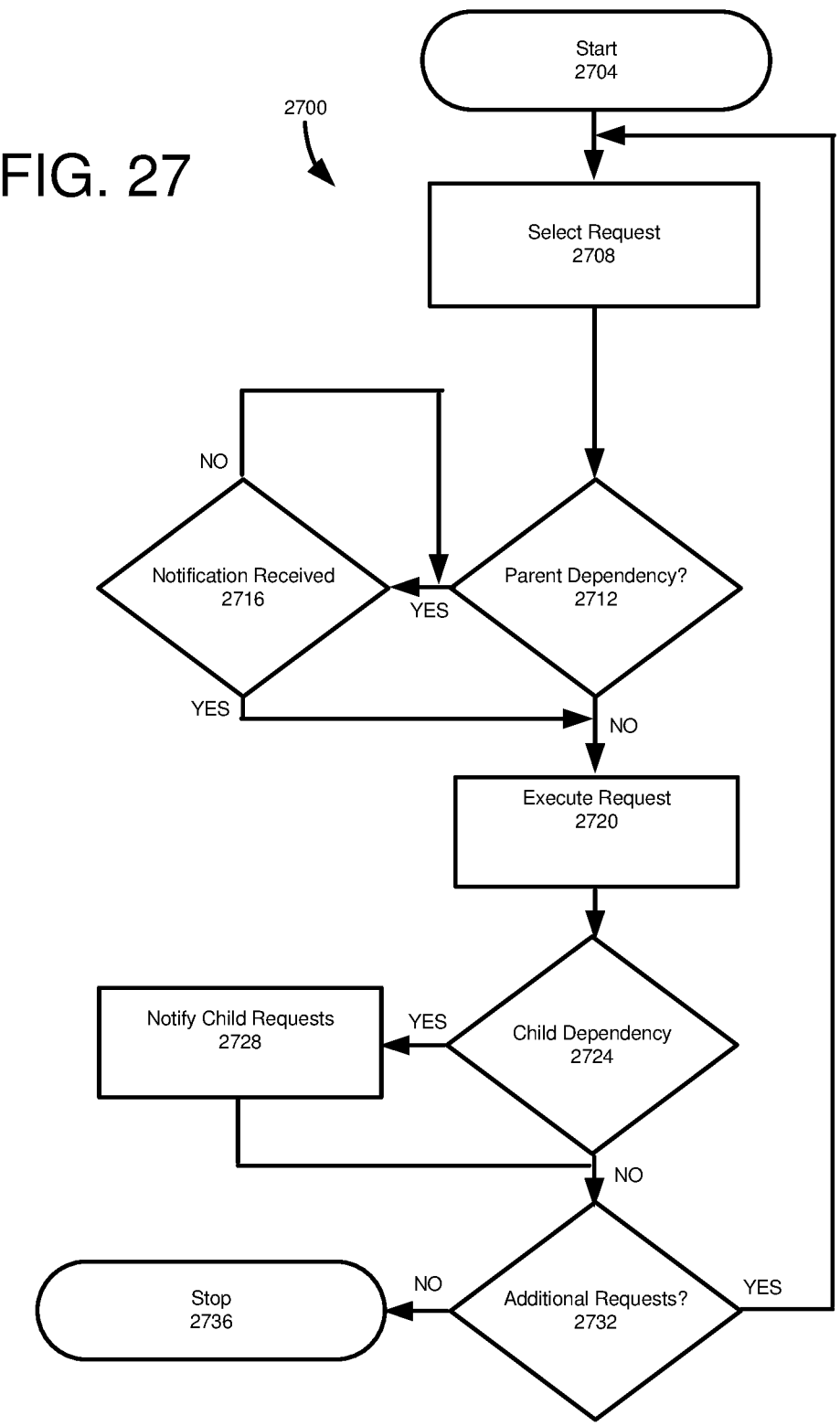
FIG. 27 is a flowchart of a method for replaying requests for database operations, including accounting for dependencies between requests.

FIG. 27 illustrates a method 2700 of replaying requests for database operations, such as using the replayer 355 of FIG. 3. In other cases, the replay, or execution, of the requests is carried out other than in a capture and replay system for analyzing database system performance.

The method 2700 begins at step 2704. In step 2708, a request for a database operation is selected to be executed, including to be analyzed to determine whether it contains interdependencies with other requests. In some cases, the analyzing can include analyzing dependency information associated with the request, such as previously determined dependency information. In other cases, the dependency information can be determined as part of the replay/execution process (including using the method 2500 of FIG. 25).

In step 2712, the method 2700 determines if the request is dependent on any parent requests. If so, in decision 2716, the method 2700 determines whether a notification (or notifications) has been received indicating that the parent request has been executed. If less than all notifications have been received from the parent vertex or vertices, the method 2700 waits until the notifications have been received. In at least some cases, the method 2700 can be carried out in parallel for multiple requests for database operations, such that if a first request is paused pending receipt of an execution notification from a parent request, a second request that is not dependent on the first request may be executed while the first request is pending.

If the request is determined in decision 2712 to not include a parent dependency, or once all parent notifications have been determined to have been received in decision 2716, the method 2700 executes the request in step 2720. In decision 2724, the request is checked for child dependencies. If the request has child dependencies, the method 2700 sends a notification that the request has been executed (or, at least, executed to a particular extent) in step 2728. In a particular aspect, if the request is a query language statement, the notification in step 2728 is sent after a snapshot timestamp has been assigned to the request. If the request is a commit operation, the notification is sent after a commit ID has been assigned. In further aspects, the method 2700 may be carried out differently. For example, rather than determining child dependencies and sending a notification if a child dependency exists, the method 2700 can provide notifications whenever a request has been executed (or executed to a certain extent), such as when snapshot timestamp has been assigned to the request (when the request is a query language statement) or when a commit ID has been assigned (when the request is a commit operation).

If the request was determined not to have child dependencies in decision 2724, or notifications were provided in step 2728, the method 2700 determines in decision 2732 whether any additional requests are to be processed. If not, the method 2700 ends at step 2736. If additional requests are to be processed, the method 2700 returns to step 2708 to select the next request for processing.

In some implementations, execution dependencies need not be determined between all requests for database operations, or all requests for database operations need not be replayed. For example, if a first request adds or modifies a record, and a second, later request deletes or modifies the record, it at least some cases, the first request can be omitted from the process of determining execution dependencies (including determining a dependency graph), particularly if no other requests (for example, read requests) depend on the first request.

Example 10—Data Hashing

Figure 28:
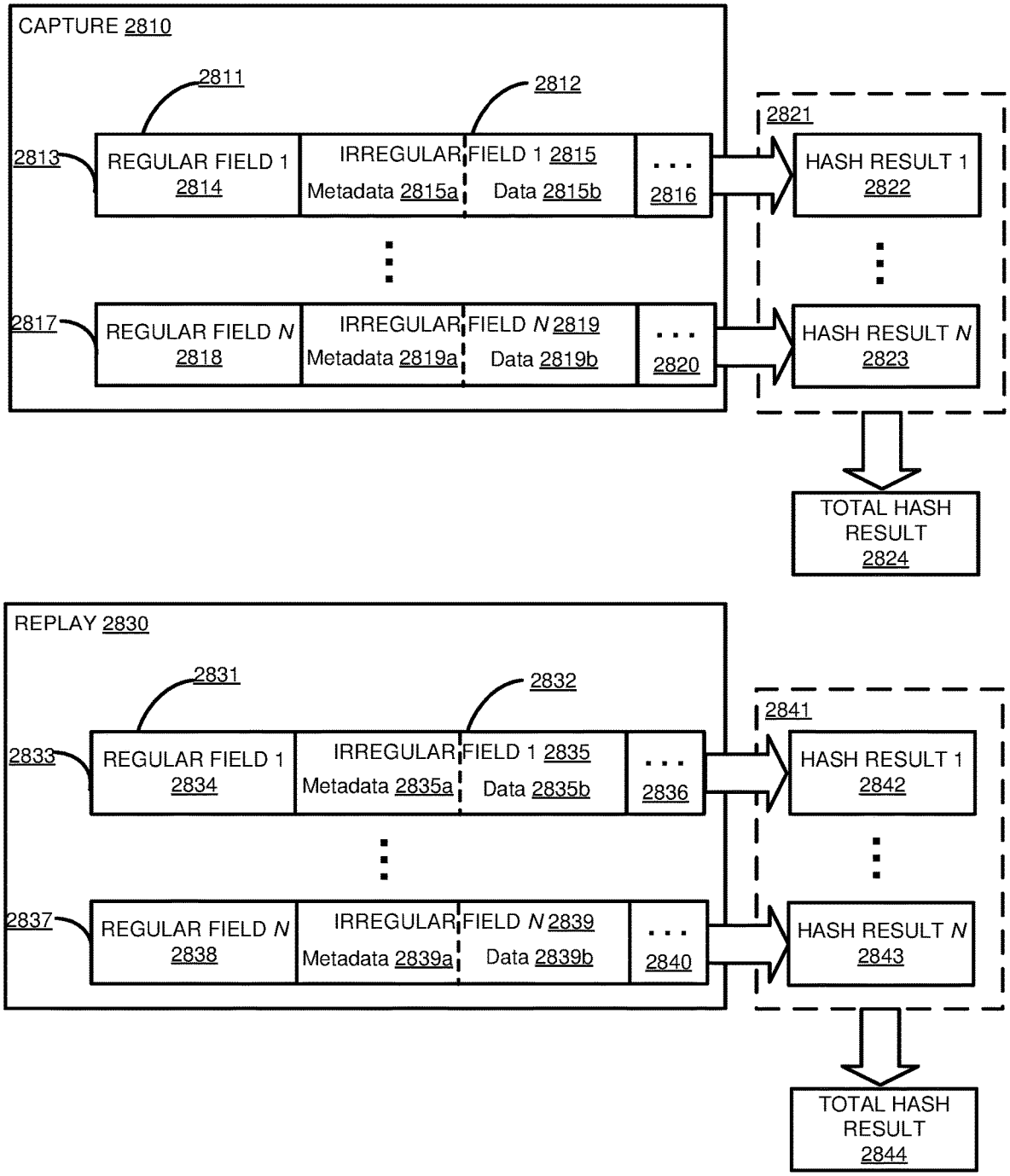
FIG. 28 is a diagram depicting hashing captured data and hashing replay data.

FIG. 28 is a diagram depicting hashing captured data and hashing replay data. Capture data 2810 may be data from a first database or environment, as described herein. The capture data 2810 may be queries or results of queries (e.g. one or more records or portions, such as particular attributes or values determined from one or more attributes of one or more records, thereof), such as results rows 2813-2817; such results rows may be arranged into one or more tables (which can be persisted tables or transient tables, such as persisted views or materialized views, or can be query results that are presented in tabular format without being maintained in a persisted or structured database object). The capture data 2810 may be from one or more queries or data sources.

For a given set of capture data 2810, the data may be one or more rows 2813-2817 having one or more columns 2811, 2812. A row 2813 may have regular field 1 2814 in a column 2811 and an irregular field 1 2815 in a column 2812, through row 2817 having regular field n 2818 in column 2811 and irregular field n 2819 in column 2812. The rows 2813-2817 may have additional fields for additional columns 2816-2820.

Generally a column 2811, 2812 is of a single type. A regular field 2814, 2818 may be of a deterministic data type, such as INTEGER, FLOAT, CHAR, or other data type that does not store metadata. An irregular field 2815, 2819 may be of a data type that has both deterministic and non-deterministic data, such as a BLOB, CLOB, NCLOB, or other varying field type. In some scenarios, other data types such as VARCHAR or NVARCHAR may be considered an irregular field having non-deterministic data, while in other scenarios, such fields may be considered regular fields. Such irregular fields may have metadata (or non-deterministic data) and a data value (or deterministic data). For example, irregular field 1 2815 may have metadata 2815a and data 2815b, and irregular field n 2819 may have metadata 2819a and data 2819b. Metadata 2815a, 2819a may include fields such as length of the data 2815a, 2819a, type, opt., chars, total, location ID, pointer (such as to additional storage for the field), or other metadata about the field. Such metadata fields may be deterministic or non-deterministic; for example, the length of the data may be deterministic (i.e., the same between different executions) while the location ID may be non-deterministic (i.e., may vary between different executions or systems). The data 2815*b*, 2819*b* generally stores the data value of the field, but may include a prefetch field (e.g. a field which may store a portion of the data value already retrieved from a different storage location storing the data value, such as may be used for a CLOB or BLOB type field) in addition to the data value or payload (full data field).

Each row 2813-2817 in the capture data 2810 may be hashed separately to generate a set of hash results 2821. For example, all the fields of a row 2813 may be hashed to generate a hash result 1 2822, and all the fields of row 2817 may be similarly hashed to generate a hash result n 2823. The fields of a given row, such as the fields 2814, 2815, 2816 for row 2813, may be hashed separately and the separate hash values then hashed together to generate the hash result, such as hash result 1 2822. Alternatively, the row itself may be hashed to generate a hash value (e.g. all the fields are treated as a single large value that is hashed); such an approach, however, may lead to inconsistencies or differences due to non-deterministic data that may be stored in the row, as described further herein. In some embodiments, some fields of a row may be grouped and hashed together directly, while other fields hashed separately before generating a row hash result from the different field hash results. For example, the first two fields of a row may be treated as a single field and hashed together, while the third field of the row is hashed separately from the first two; the two resulting hash values may then be used to generate a single hash value for the row.

Generally, each row will be hashed using the same hashing method or algorithm using the fields (or columns) of the row as the input to the hashing function. For example, the MD5 hash function may be used, or other hash functions such as SHA-1 or RIPEMD-160, to generate a hash result as described herein. The set of hash results for each row 2821 may be hashed together to generate a total hash result 2824. The total hash result 2824 may represent a unique value for the capture data 2810 (e.g., the results returned for a particular query that was executed during database capture).

Replay data 2830 may be data from a second database or environment, as described herein. The replay data 2830 may be queries or results of queries, such as results rows 2833-2837; such results rows may be arranged into one or more tables. The replay data 2830 may be from one or more queries or data sources and is generally the same queries as used for the capture data 2810 but executed in a different data source(s) and/or under different operation conditions (e.g., database software, software version, operational parameters, etc.) from the capture data 2810. That is, the capture data 2810 and the replay data 2830 may represent execution parameters or results (e.g., actual results or performance parameters, such as query execution time, memory use, processor use, etc.) on a capture system (e.g., having first hardware and first software) versus a replay system (e.g., having second hardware and second software).

For a given set of replay data 2830, the data may be one or more rows 2833-2837 having one or more columns 2831, 2832. A row 2833 may have regular field 1 2834 in a column 2831 and an irregular field 1 2835 in a column 2832, through row 2837 having regular field n 2838 in column 2831 and irregular field n 2839 in column 2832. The rows 2833-2837 may have additional fields for additional columns 2836-2840. Generally a column 2831, 2832 is of a single type. A regular field 2834, 2838 may be of a deterministic data type, such as INTEGER, FLOAT, CHAR, or other data type that does not store metadata. An irregular field 2835, 2839 may be of a data type that has both deterministic and non-deterministic data, such as a BLOB, CLOB, NCLOB, or other varying field type. In some scenarios, other data types such as VARCHAR or NVARCHAR may be considered an irregular field having non-deterministic data, while in other scenarios, such fields may be considered regular fields. Such irregular fields may have metadata (or non-deterministic data) and a data value (or deterministic data). For example, irregular field 1 2835 may have metadata 2835*a* and data 2835*b*, and irregular field n 2839 may have metadata 2839*a* and data 2839*b*. Metadata 2835*a*, 2839*a* may include fields such as length of the data 2835*a*, 2839*a*, type, opt., chars, total, location ID, pointer (such as to additional storage for the field), or other metadata about the field. The data 2835*b*, 2839*b* generally stores the data value of the field, but may include a prefetch field in addition to the data value or payload (full data field).

Each row 2833-2837 in the capture data 2830 may be hashed separately to generate a set of hash results 2841. For example, all the fields of a row 2833 may be hashed to generate a hash result 1 2842, and all the fields of row 2837 may be similarly hashed to generate a hash result n 2843. Generally, each row will be hashed using the same hashing method or algorithm, using the fields (or columns) of the row as the input to the hashing function. The set of hash results for each row 2841 may be hashed together to generate a total hash result 2844. The total hash result 2844 may represent a unique value for the replay data 2830.

Generally, the replay data 2830 is the same as the capture data 2810 (but from a different source, or generated in a different system, or using different operational or configuration parameters). Thus, the value of regular field 1 2814 in the capture data 2810 is generally the same as the value of the regular field 1 2834 in the replay data 2830. Similarly, the value of the data 2815*b* of the irregular field 1 2815 in the capture data 2810 is generally the same as the value of the data 2835*b* of the irregular field 1 2835 in the replay data (and so on for the other rows).

However, in some cases the metadata of irregular fields is not the same between the capture data 2810 and the replay data 2830. For example, metadata 2815*a* of the irregular field 1 2815 in the capture data 2810 may include a location ID. Such a location ID may not be the same in the corresponding metadata 2835*a* of irregular field 1 2835 in the replay data 2830, because the location ID is likely to be different being that the data is in or originates from a different system or source. Thus, while the data of the fields in the capture data 2810 is generally the same as the data in the corresponding fields in the replay data 2830, the metadata generally may not be the same for corresponding rows and fields.

Example 11—Data Hashing Across Rows

Figure 29:
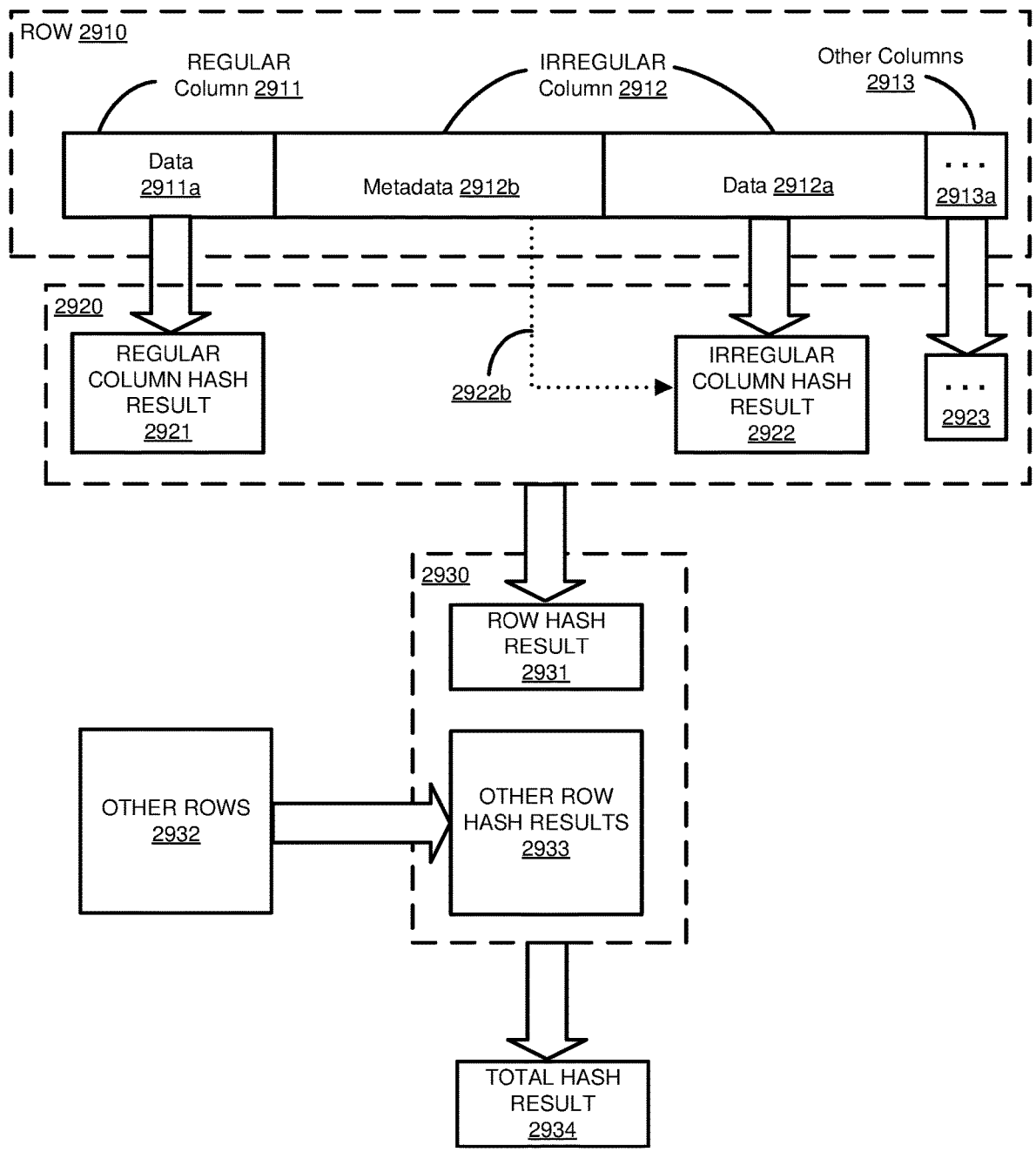
FIG. 29 is a diagram depicting data hashing across rows.

FIG. 29 is a diagram depicting data hashing across rows. Hashing a row in capture or replay data, as described herein, may be accomplished as illustrated. A row 2910 may have one or more columns 2911, 2912, 2913. Each column 2911, 2912, 2913 may have a particular data type, which may be a regular type, such as regular column 2911, or an irregular type, such as irregular column 2912. A first field in the row 2910 may be in regular column 2911 and store data 2911*a*. A second field in the row 2910 may be in irregular column 2912 and store data 2912a and metadata 2912b. Other fields 2913a may store data and/or metadata for other columns 2913 in the row 2910.

Each field in a row may be hashed separately. Thus, the data 2911a in the first field in the regular-type column 2911 may be hashed to generate regular column hash result 2921. Fields having a regular data type (or in a regular-type column) may be hashed using the entire field, as generally the entire field contains deterministic data, or only holds the data value of the field.

For the next field, in irregular-type column 2912, the data 2912a may be hashed to generated irregular column hash result 2922. For irregular-type fields (fields in an irregular-type column), generally only the data portion of the field is hashed, as the data portion may be deterministic but the metadata portion is generally non-deterministic. By only using the data portion of an irregular-type field to generate a hash result for the field, the hash result generated for that field will generally be the same in the capture data and the replay data (if the same hashing function or algorithm is used).

In some embodiments, some or all of the metadata 2912b of an irregular-type field 2912 may not be excluded from generating the hash, and may be used 2922b along with the data 2912a to generate the hash result 2922. In such cases, some or all of the metadata 2912b is generally deterministic metadata, which may be consistent across capture data and replay data, similar to the field data 2912a. For example, a VARCHAR field, which may be the type for irregular-type column 2912, may have metadata 2912b that is the length of the data portion of the field 2912a. Such a metadata length value will generally be consistent between capture data and replay data, as the data value 2912a is generally the same. Thus, the metadata 2912b for a VARCHAR field having only metadata for the field length may be used 2922b in generating the hash result 2922. In another example, a CLOB field may have several metadata fields, one of which may be a total field size. The total field size is generally deterministic and so may be used in generating the hash value for the CLOB field, while the other metadata fields may be excluded. Or, two or more deterministic metadata fields may be hashed together. Such deterministic metadata, however, may still be excluded in other scenarios.

In some scenarios, non-deterministic data may be not relevant to the hashing of a data set. For example, there may be no fields with non-deterministic data in the data set, or the non-deterministic data obtained during capture may be overwritten to the corresponding row in the replay results. In such scenarios, generating an order-independent total hash value may still be useful for comparing large data sets, even when non-deterministic data is not excluded or considered.

For other fields 2913a in the row 2910, hash results 2923 may be generated as well, similarly as described for either regular-type columns 2911 or irregular-type columns 2912, depending on their field type.

The separate hash results 2921, 2922, 2923 from hashing each field of the row 2910 may be the set of hash results 2920 for the row. These hash results 2920 may be used to generate a single hash result for the row 2931. The row hash result 2931 may be generated by adding the separate field hash results 2921, 2922, 2923 together and then hashing the result. Alternatively, the row hash result 2931 may be generated by inputting the separate field hash results 2921, 2922, 2923 into a hash function or algorithm that accepts multiple inputs.

Other row hash results 2933 may be generated from other rows 2932 similarly as described for row 2910. Such other rows 2932 may be the other rows in capture data or replay data, as described herein. The separate row hash results 2931, 2933 from hashing each of the rows 2910, 2932 may be the set of row hash results 2930 for a data set, such as capture data or replay data. These row hash results 2933 may be used to generate a single total hash result 2934 for all the rows 2910, 2932 which may be in a data set. The total hash result 2934 may be calculated in a similar manner as the calculation for a row hash result 2931, 2933. The total hash result 2934 may be generated by adding the separate row hash results 2931, 2933 together and then hashing the result. Alternatively, the total hash result 2934 may be generated by inputting the separate row hash results 2931, 2933 into a hash function or algorithm that accepts multiple inputs.

In this way, an order-independent, multi-row hash result may be calculated for data sets that contain non-deterministic data. Such a result allows for comparison by the hash value between two large data sets that may have minor, or non-deterministic, differences but no substantive differences.

Example 12—Order-Independent, Multi-Row Hash Calculation

Figure 30:
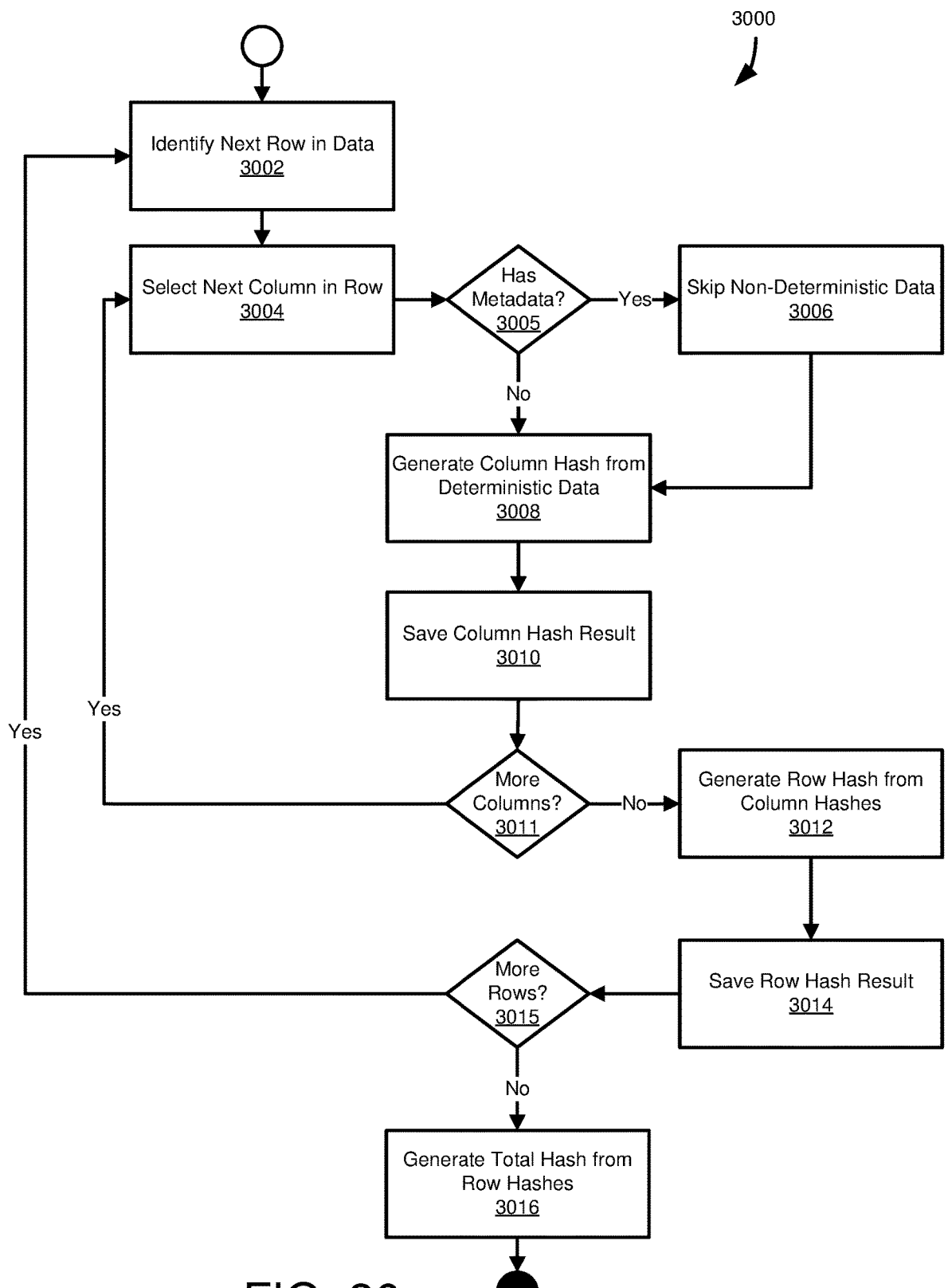
FIG. 30 is a flowchart illustrating a process for calculating an order-independent, multi-row calculation of a hash value for a data set.

FIG. 30 is a flowchart illustrating a process 3000 for calculating an order-independent, multi-row calculation of a hash value for a data set. The process begins by selecting a row in a data set at 3002. The data set may be the capture data or replay data, as described herein. The next field, or column, in the row is selected at 3004.

The field is tested to determine if it has metadata or other non-deterministic data at 3005. The test may include determining the data type for the field, which may indicate if the field has metadata or not. For example, regular-type fields generally do not have metadata while irregular-type fields generally do have metadata.

If the field is determined to have metadata or other non-deterministic data ("yes" at 3005), then the non-deterministic data is skipped at 3006. Skipping the non-deterministic data may include avoiding using all or a portion of the non-deterministic data in the hashing calculation. This may include removing it from a memory buffer or stripping it from the field, or setting a new or separate variable with the data portion of the field.

Once the non-deterministic data is skipped at 3006, the deterministic data (or selected non-deterministic data) of the field may be used to generate a hash result for the field (or column) at 3008. Similarly, if the field is determined to not have any metadata or other non-deterministic data ("no" at 3005), then a hash result is generated for the field, which is generally only composed of deterministic data, at 3008. Generating the hash result may include using a hash function or algorithm, such as MD5, SHA-1, or any other hash function. The hash result for this field (or column) is then maintained or saved at 3010. Maintaining or saving the field hash result may include storing it in a temporary memory buffer or other variable.

The row is tested for further fields (or columns) at 3011. If there are further columns in the row ("yes" at 3011), then the next column in the row is selected at 3004, and the process continues for that column. If there are no further columns in the row ("no" at 3011), then all fields for the row have been hashed.

A hash result may be generated for the row at 3012. This may include using the hash results generated for each field in the row in steps 3004 through 3010 to generate the row hash result. In one embodiment, the field hash results may be summed and then the result input into a hash function to generate a row hash result. The hash result for this row is then maintained or saved at 3014. Maintaining or saving the row hash result may include storing it in a temporary memory buffer or other variable.

The data set is tested for further rows at 3015. If there are further rows in the data set ("yes" at 3015), then the next row is selected at 3002, and the process continues for that row. If there are no further rows in the data set ("no" at 3015), then rows for the data set have been hashed.

A total hash result may be generated for the data set at 3016. This may include using the hash results generated for each row in the data set in step 3012, repeated, to generate the total hash result. In one embodiment, the row hash results may be summed and then the result input into a hash function (which can be the same hash function as for individual rows or a different hash function) to generate a row hash result.

By processing the fields of each row separately and avoiding at least a portion, and in some cases all, of the non-deterministic field data, the hash results are generally consistent for the same data set generated in different systems or environments. By processing the rows separately, the hash results are row independent, allowing for the same row results to be returned in a different order in different systems or environments.

Example 13—Parallelized Hash Calculations

Figure 31A:
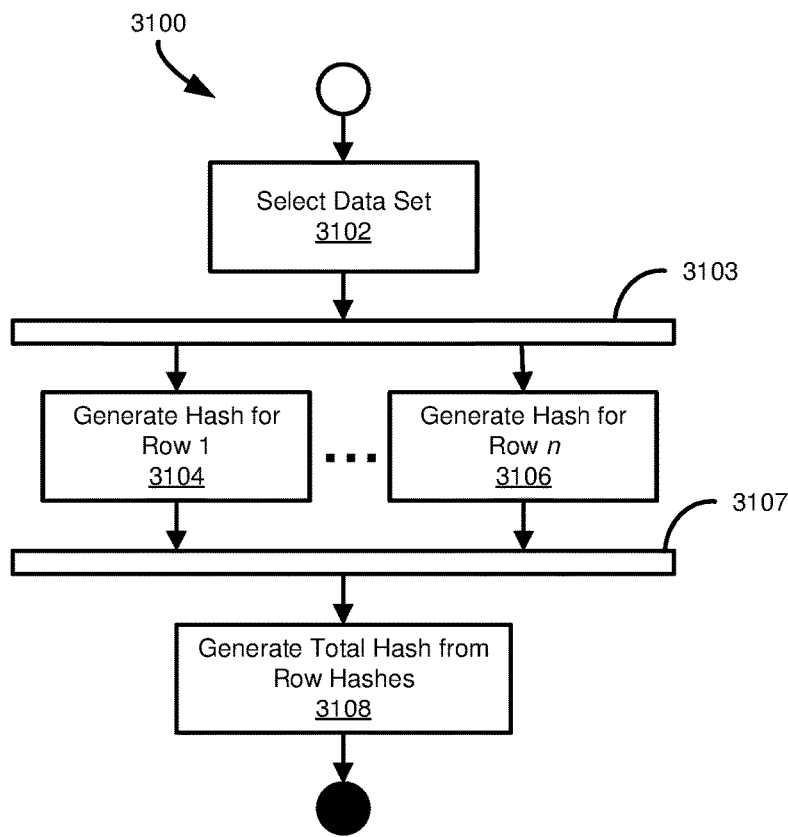
FIG. 31A is a flowchart illustrating a parallelized process for generating a total hash for a data set.

FIG. 31A is a flowchart illustrating a parallelized process 3100 for generating a total hash for a data set. A data set is selected for hashing at 3102. The data set may be captured data or replay data, as described herein, or another set of data. Generally, such a data set may contain one or more rows, which in turn may contain one or more fields.

The process may be parallelized 3103 to process the rows contained in the data set. A hash may be generated for row 1 at 3104. In parallel, a hash may be generated for row n at 3106. Similarly a hash may be generated for all rows from row 1 to row n, that are part of the selected data set, in parallel to steps 3104 and 3106. The process for generating such a row hashes may be as described elsewhere herein.

As the steps 3104-3106 generating the hashes for each row are completed, the parallelization of the process 3100 may be closed. The separate row hashes may be used to generate a total hash for the data set at 3108, as described herein.

Processing the hashing of each row in parallel may improve the performance (resource usage, time to complete) of the process 3100 generating the hash for the data set. Further, the rows are processed independently, so row order does not affect the final hash result. Additionally, the rows need not have the same sets of fields (columns) compared with each other, as they are processed separately.

Figure 31B:
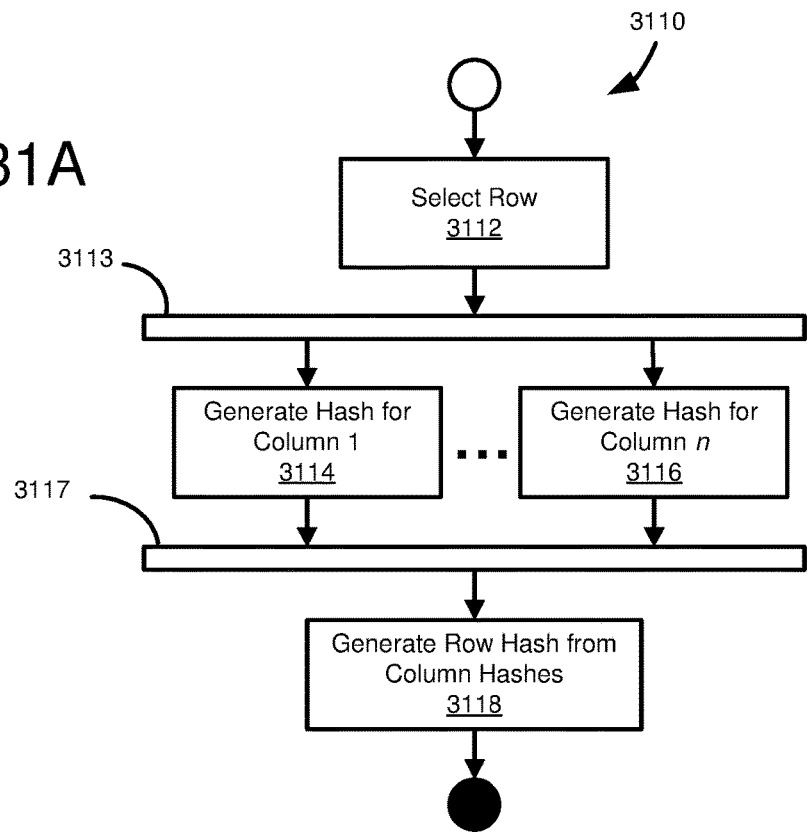
FIG. 31B is a flowchart illustrating a parallelized process for generating a total hash for a row.

FIG. 31B is a flowchart illustrating a parallelized process 3110 for generating a total hash for a row. The process 3110 may be part of the row hash generation step 3104-3106 in the data set hashing process 3100 in FIG. 31A. A row is selected for hashing at 3112. The row may be part of a data set, such as captured data or replay data, as described herein. Generally, such a row may contain one or more fields (or columns).

The process may be parallelized 3113 to process the fields contained in the row. A hash may be generated for field 1 at 3114. In parallel, a hash may be generated for column n at 3116. Similarly a hash may be generated for all columns from column 1 to column n, that are part of the selected row, in parallel to steps 3114 and 3116. The process for generating such a column hashes may be as described elsewhere herein.

As the steps 3114-3116 generating the hashes for each column are completed, the parallelization of the process 3110 may be closed. The separate column hashes may be used to generate a total hash for the row at 3118, as described herein.

Processing the hashing of each column in parallel may improve the performance (resource usage, time to complete) of the process 3110 generating the hash for the data set. Further, the columns are processed independently, so column order does not affect the final hash result. Additionally, each column may be handled separately, and so may be handled differently, such as by excluding metadata from columns that have metadata, as described herein.

The processes 3100 and 3110 shown in FIGS. 31A-B may be combined as an implementation of the process 3000 shown in FIG. 30. Such a highly parallelized process, having multiple tiers of parallelization, may provide significant advantages in resource usage or calculation time for large data sets, or in other instances.

Example 14—Capture Data Classifications

Figure 32:
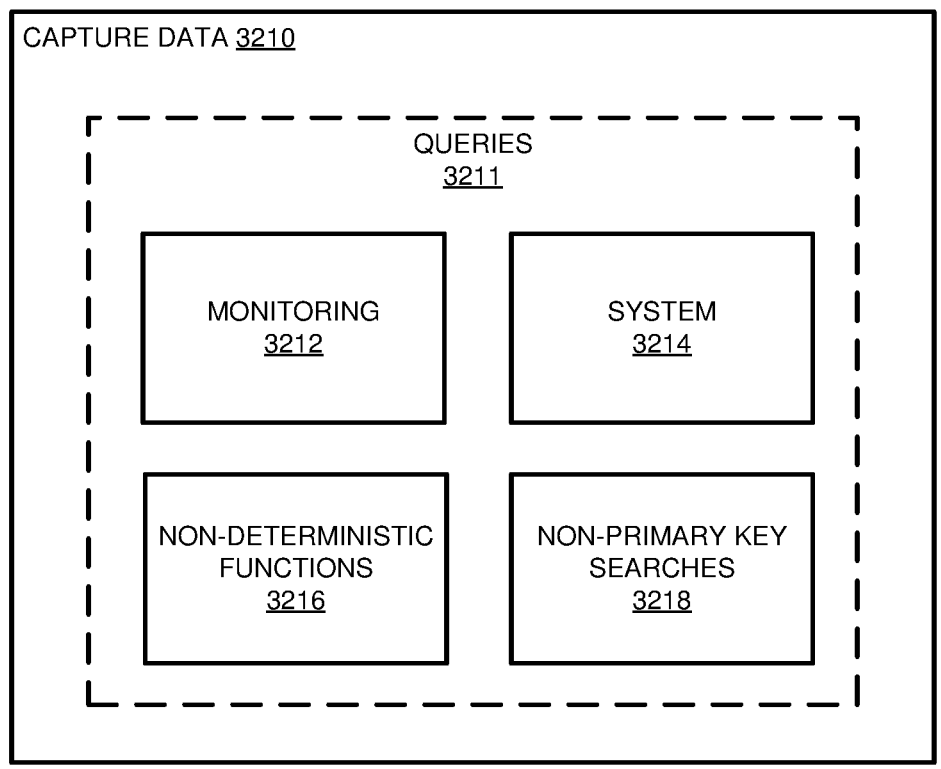
FIG. 32 is a diagram depicting a subset of capture data classifications.

FIG. 32 is a diagram depicting a subset of capture data classifications. A data set, such as capture data 3210, may be further classified based on the query 3211 which generates some or all of the data set. The data set may also be a replay data set, or other data set or data workload as described herein.

A query 3211 used to generate the capture data 3210 may be classified as a monitoring query 3212. A monitoring query 3212 may be a view query. For example, such a query may be: SELECT*FROM M_SQL_PLAN_CACHE.

A query 3211 used to generate the capture data 3210 may be classified as a system query 3214. A system query 3214 may be a system table query. For example, such a query may be: SELECT*FROM SYS.TABLE.

A query 3211 used to generate the capture data 3210 may be classified as a non-deterministic function query 3216. A non-deterministic function may provide or calculate a non-deterministic value or metadata. For example, such a query may be: SELECT CURRENT_TIMESTAMP. Another example is: RAND( ) FROM DUMMY. Other types of non-deterministic function queries 3216 may include queries that select based on a non-deterministic function, such as selecting records with a particular timestamp.

A query 3211 used to generate the capture data 3210 may be classified as a non-primary key query 3218. A non-primary key query 3218 may be a limited query selecting off a non-primary field. For example, such a query may be: SELECT*FROM TEST_TABLE WHERE A='value'.

Other types of queries may be classified differently. For example, primary key searches may have a separate classification (not shown). The described queries, monitoring view queries 3212, system table queries 3214, non-deterministic functions 3216, and non-primary key searches 3218, may be identified as having a higher likelihood of generating false positive errors in testing during data replay, or otherwise not useful for running during data replay.

Example 15—Classifying Queries

Figure 33A:
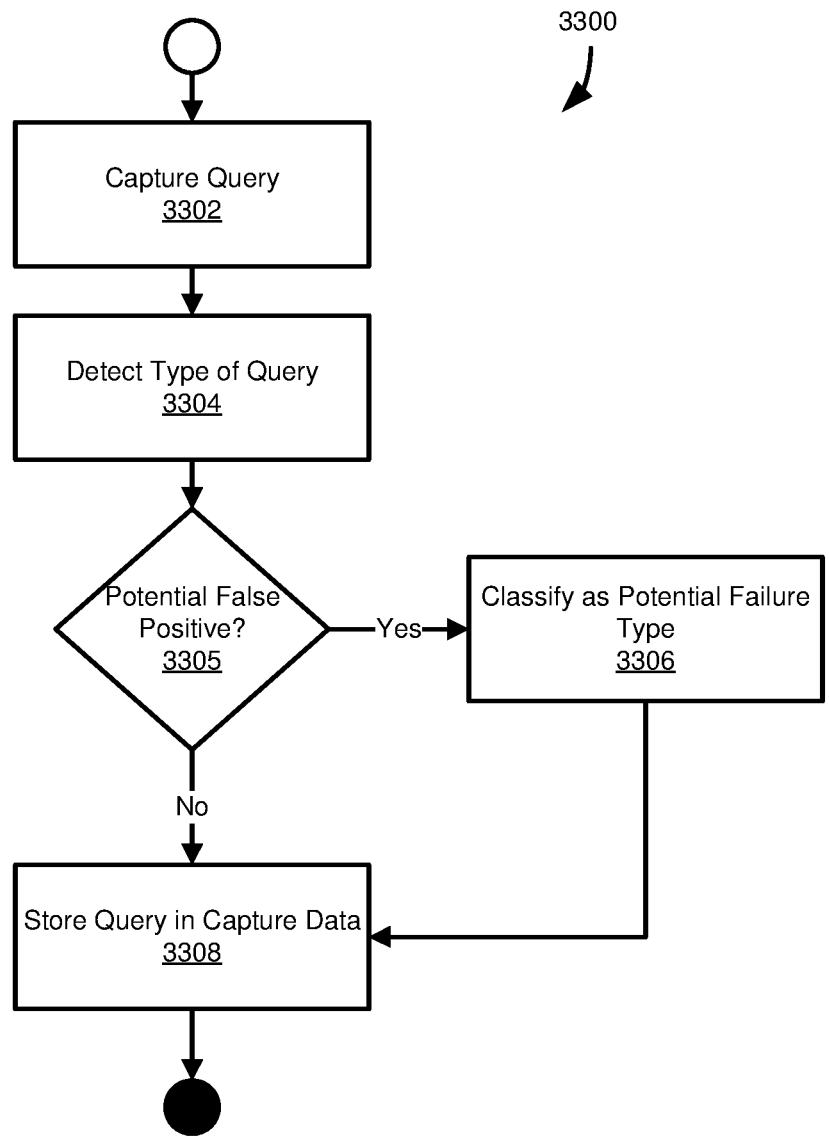
FIG. 33A is a flowchart illustrating a process for classifying queries.

FIG. 33A is a flowchart illustrating a process 3300 for classifying queries. A query may be captured at 3302. The query may be captured from a source database system or a particular environment, such as described herein. The query itself may be captured and maintained as part of the captured data, or the results of the query may be captured and maintained while the query is stored in temporary memory or other variable for use during the process 3300. Generally, the process 3300 may be performed during data capture by a detector at the primary database. However, in some scenarios, the process 3300 (or a portion of the process) may be performed during replay or from another action using the capture data.

The query is analyzed to detect the type of query at 3304. This may be accomplished as part of the data capture process, such as immediately after the query is captured at 3302. Alternatively, the type of query may be detected during analysis later, if the query was maintained as part of the capture data. The types of queries detected may be those shown in FIG. 32, or may be other types of queries.

Detecting the type of query may be accomplished through logic developed (e.g. coded in software, which may include the use of if-then statements, switch statements, regular expressions, or other logical statements) for identifying the characteristics of the different types of queries. This may include using a look-up table or file containing a list of queries or query characteristics and a type associated with the characteristic(s). For example, queries with a "WHERE" clause may be identified as non-primary key queries, or further logic may be used to ensure that the "WHERE" clause does not use a primary key. As another example, queries that retrieve from a specific table, such as SYS-.TABLES, may be listed as system table queries. Similar logic and/or look-up lists may be used to identify the other types of queries, as well as additional or other characteristics of the queries.

The detected type of query is tested at 3305. If the type of query is a query that can potentially generate false positives during replay ("yes" at 3305), then the query is classified as a potential false positive, or failure, type of query at 3306. Such classification may include setting a flag associated with the query. Such a flag may be included in the capture data, along with the query and/or the returned results of the query. The flag may be a simple flag indicating if the query is a potential false positive type or not, or it may indicate the type of query detected (e.g. monitoring, system, non-deterministic function, or non-primary key search).

The query, or the query results or both, may then be stored in the capture data at 3308. The classification of the query, as set at 3306, may be stored in the capture data as well, at 3308. If the type of query is a query that is not known to potentially generate false positives during replay ("no" at 3305), then the query is stored in the capture data at 3308. In an alternative embodiment, the query may be classified regardless of the type of query, and this classification may indicate if the query is of a type that may potentially generate a false positive during replay or not.

Example 16—Using Query Classification

Figure 33B:
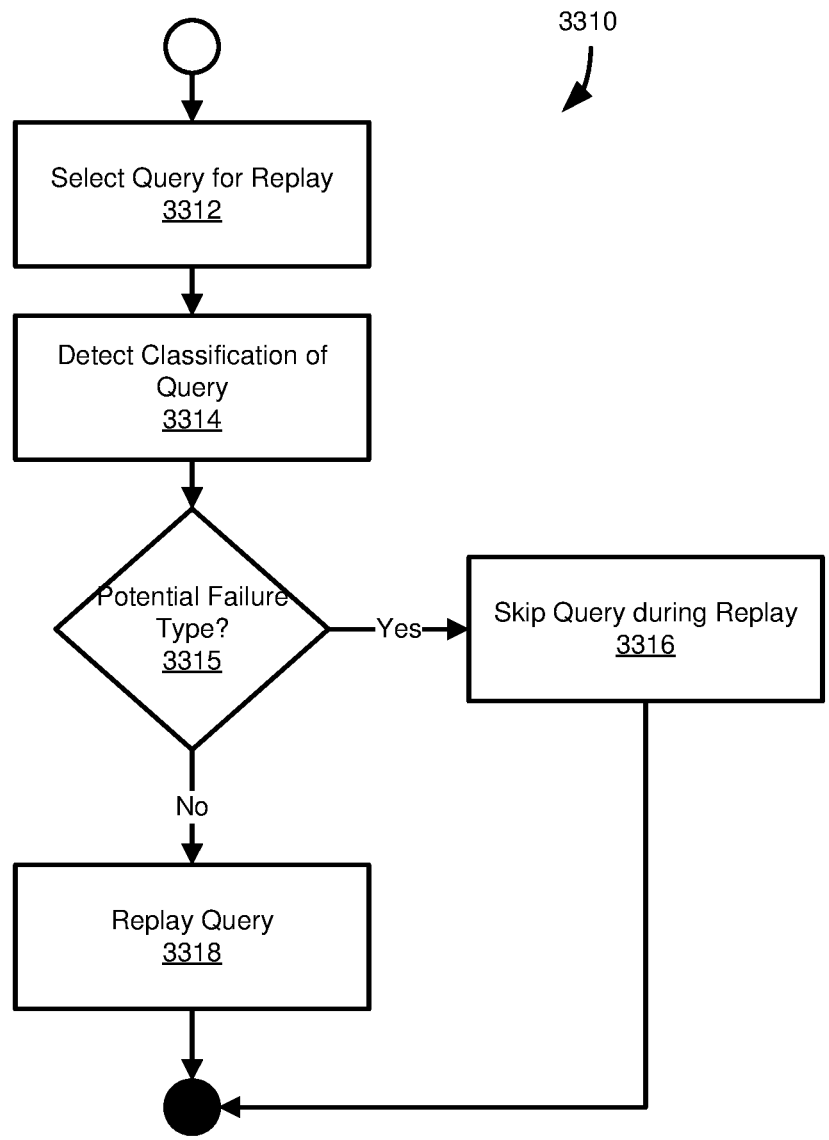
FIG. 33B is a flowchart illustrating a process for using query classification during data replay.

FIG. 33B is a flowchart illustrating a process 3310 for using query classification during data replay. Once a query is classified, such as is accomplished in FIG. 33A, the query can be used or manipulated based on that classification. During data replay, as described herein, use of the query or data results may be determined by logic using the query classification.

A query may be selected for replay at 3312. The query may be selected from the capture data, or from another source. The classification of the query may be detected at 3314. Detection of the classification may be accomplished by reading a flag in the capture data associated with the selected query. Alternatively, detection of the classification of the query may be accomplished by the process 3300, or a portion of the process, shown in FIG. 33A. For example, the query may be classified in place of (or as part of) detection of the classification of the query.

The query classification is tested at 3315. If the query is not classified as a potential failure type, or a type that may generate a false positive, ("no" at 3315), then the query may be replayed in the appropriate database or other system at 3318.

If the query is classified as a potential failure type, or a type that may generate a false positive, ("yes" at 3315), then the query is skipped as part of replay at 3316. This may include not running the query during replay at a database or other system or environment. Other queries may be included in the replay data, which may follow the process 3310.

Other actions may be taken in place of, or in addition to, skipping the query at 3316. In some scenarios, it may be desirable to replay a query classified as a potential false positive. In such cases, the query may be run, but an additional flag may be set indicating the query was run. Further, the flag may also contain information about the reason or basis for running the query; alternatively, the reason may be contained in a separate field associate with the flag. Such a flag may also be set, with or without a reason as well, when a query is skipped. Thus, there may be a first flag to indicate the classification of the query, and a second flag to indicate the action(s) taken based on the classification of the query.

Another scenario may be to replay the query, rather than skipping, but from an alternative data source, or with an alteration to the query, that may reduce the chance for a false positive result. A further scenario may be to run the query, rather than skipping, but replace the result with the original result from the capture data.

In this way, the classification of queries that may generate false positive (error) results or otherwise may generate failures during replay may be used to limit failure or false positive results by indicating which queries to exclude during replay, or take other action to reduce the likelihood of a false positive result.

Example 17—Further Process for Data Hashing and Filtering

Figure 34A:
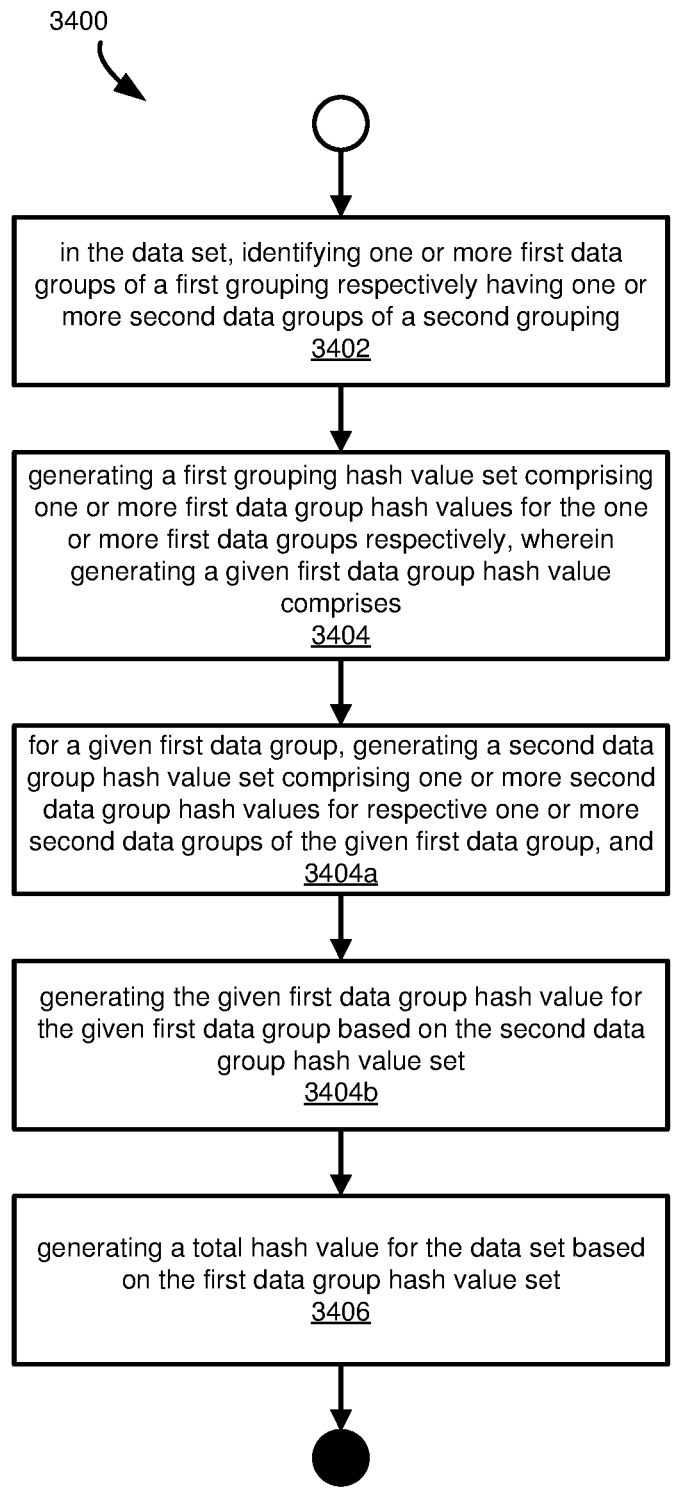
FIG. 34A is a flowchart illustrating a process for independently hashing a data set.

FIG. 34A is a flowchart illustrating a process 3400 for independently hashing a data set. For a data set, one or more first data groups of a first grouping, separately having one or more second data groups of a second grouping, may be identified at 3402. A first data group hash value set, having one or more first data group hash values for the respective one or more first data groups, may be generated at 3404. Generating a given first data group hash value may be accomplished as follows. For a given first data group, a second data group hash value set may be generated, having one or more second data group hash values for the respective one or more second data groups of the given first data group, at 3404a. The first data group hash value for the given first data group may be generated based on the second data group hash value set at 3404b. A total hash value for the data set may be generated based on the first data group hash value set at 3406. A first data group of the first grouping may be a row, while a second data group of the second grouping may be a column. Alternatively, the first data group of the first grouping may be a column, while the second data group of the second grouping may be a row.

Figure 34B:
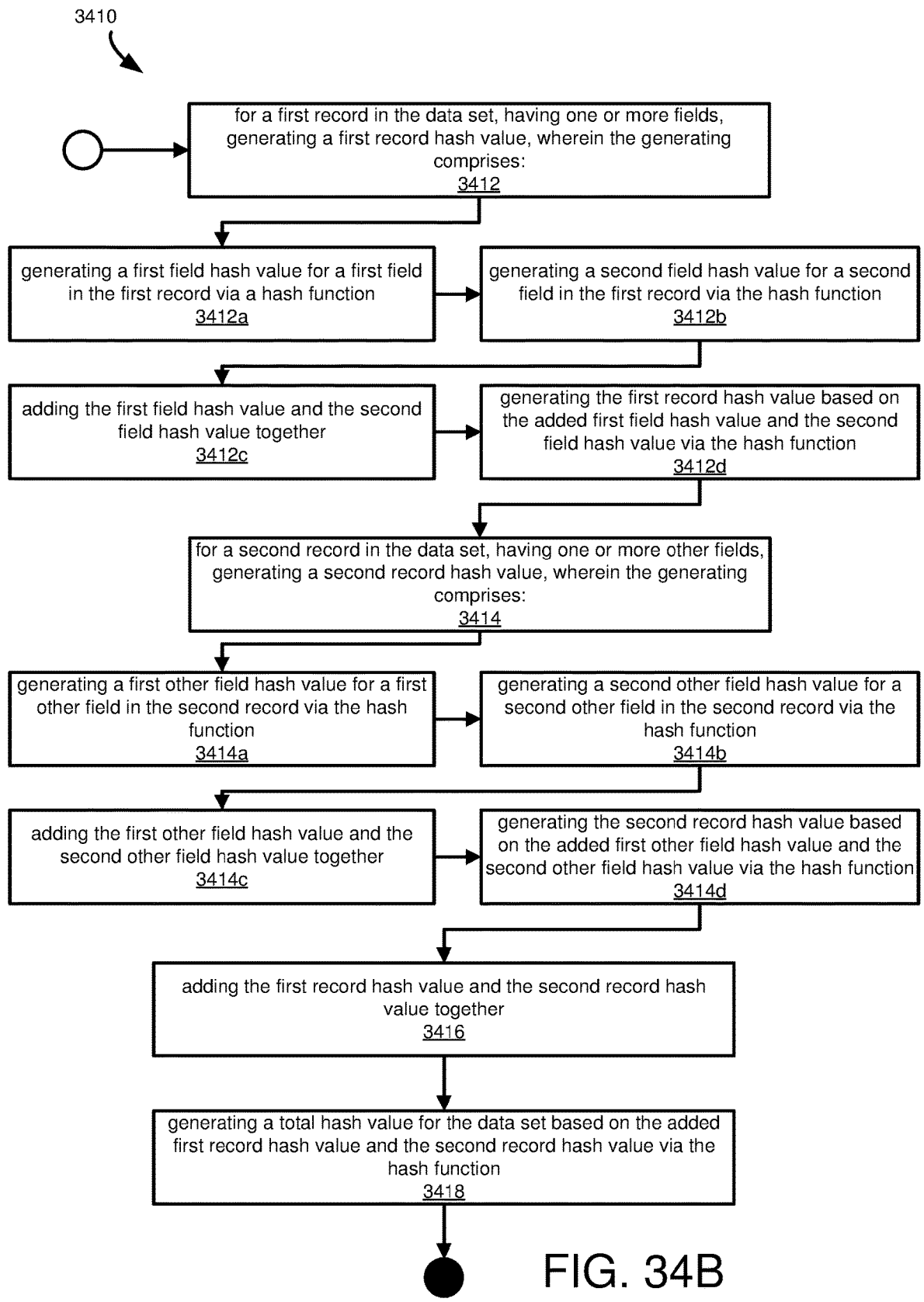
FIG. 34B is a flowchart illustrating a process for preprocessing a data set.

FIG. 34B is a flowchart illustrating a process 3410 for preprocessing a data set. For a first record in the data set, having one or more fields, a first record hash value may be generated at 3412. Generating the first record hash value may be accomplished as follows. A first field hash value for a first field in the first record may be generated via a hash function at 3412*a*. A second field hash value for the second field in the first record may be generated via the hash function at 3412*b*. The first field hash value and the second field hash value may be added together at 3412*c*. The first record hash value may be generated based on the added first field hash value and the second field hash value via the hash function at 3412*d*.

For a second record in the data set, having one or more other fields, a second record hash value may be generated at 3414. Generating the second record hash value may be accomplished as follows. A first other field hash value for a first other field in the second record may be generated via the hash function at 3414*a*. A second other field hash value for a second other field in the second record may be generated via the hash function at 3414*b*. The first other field hash value and the second other field hash value may be added together at 3414*c*. The second record hash value may be generated based on the added first other field hash value and the second other field hash value via the hash function at 3414*d*.

The first record hash value and the second record hash value may be added together at 3416. A total hash value for the data set based on the added first record hash value and the second record hash value may be generated via the hash function at 3418.

Figure 34C:
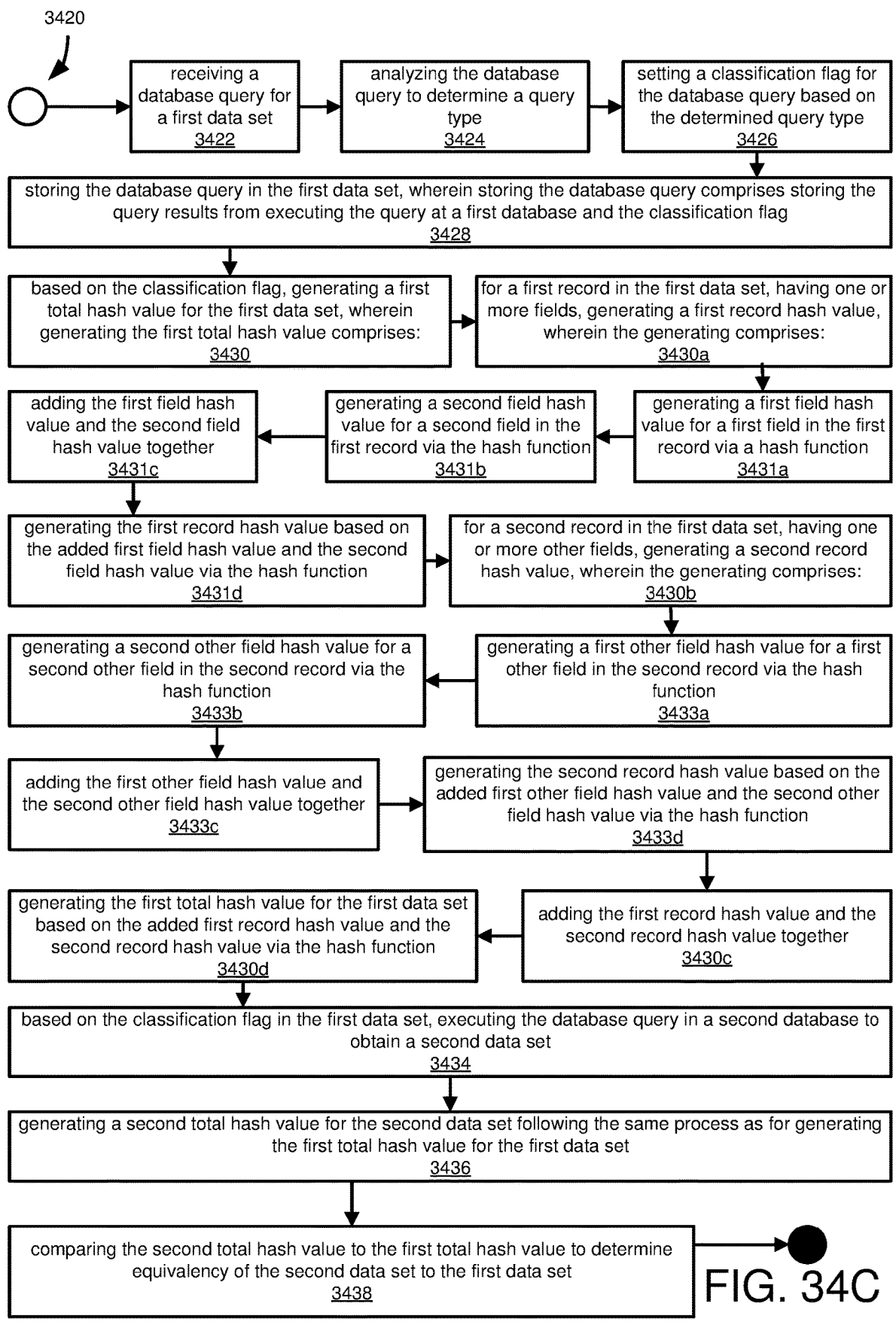
FIG. 34C is a flowchart illustrating a process for preprocessing a data set including filtering and independently hashing.

FIG. 34C is a flowchart illustrating a process 3420 for preprocessing a data set including filtering and independently hashing. A database query for a first data set may be received at 3422. The database query may analyzed to determine a query type at 3424. A classification flag for the database query may be set based on the determined query type at 3426. The database query may be stored in the first data set at 3428, which may include storing the query results from executing the query at a first database and the classification flag. Based on the classification flag, a first total hash value for the first data set may be generated at 3430. Generating the first total hash value may be accomplished as follows.

For a first record in the first data set, having one or more fields, a first record hash value may be generated at 3430*a*. Generating the first record hash value may be accomplished as follows.

A first field hash value for a first field in the first record may be generated via a hash function at 3431*a*. A second field hash value for the second field in the first record may be generated via the hash function at 3431*b*. The first field hash value and the second field hash value may be added together at 3431*c*. The first record hash value may be generated based on the added first field hash value and the second field hash value via the hash function at 3431*d*.

For a second record in the first data set, having one or more other fields, a second record hash value may be generated at 3430*b*. Generating the second record hash value may be accomplished as follows.

A first other field hash value for a first other field in the second record may be generated via the hash function at 3433*a*. A second other field hash value for a second other field in the second record may be generated via the hash function at 3433*b*. The first other field hash value and the second other field hash value may be added together at 3433*c*. The second record hash value may be generated based on the added first other field hash value and the second other field hash value via the hash function at 3433*d*.

The first record hash value and the second record hash value may be added together at 3430*c*. A total hash value for the first data set based on the added first record hash value and the second record hash value may be generated via the hash function at 3430*d*.

Based on the classification flag in the first data set, the database query may be executed in a second database to obtain a second data set at 3434. A second total hash value for the second data set may be generated at 3436, following the same process as for generating the first total hash value for the first data set. The second total hash value may be compared to the first total hash value to determine equivalency of the second data set to the first data set at 3438.

Example 18—Computing Systems

Figure 35:
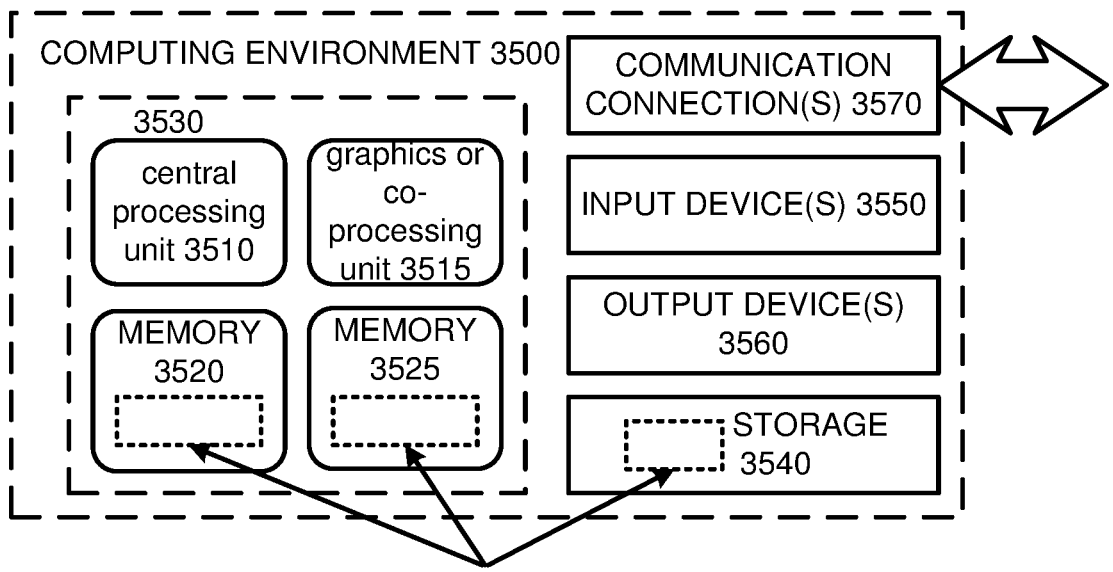
FIG. 35 is a diagram of an example computing system in which some described embodiments can be implemented.

FIG. 35 depicts a generalized example of a suitable computing system 3500 in which the described innovations may be implemented. The computing system 3500 is not intended to suggest any limitation as to scope of use or functionality of the present disclosure, as the innovations may be implemented in diverse general-purpose or special-purpose computing systems.

With reference to FIG. 35, the computing system 3500 includes one or more processing units 3510, 3515 and memory 3520, 3525. In FIG. 35, this basic configuration 3530 is included within a dashed line. The processing units 3510, 3515 execute computer-executable instructions, such as for implementing a database environment, and associated methods, described in Examples 1-17. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 35 shows a central processing unit 3510 as well as a graphics processing unit or co-processing unit 3515. The tangible memory 3520, 3525 may be volatile memory (e.g., registers, cache, RAM), non-volatile memory (e.g., ROM, EEPROM, flash memory, etc.), or some combination of the two, accessible by the processing unit(s) 3510, 3515. The memory 3520, 3525 stores software 3580 implementing one or more innovations described herein, in the form of computer-executable instructions suitable for execution by the processing unit(s) 3510, 3515. The memory 3520, 3525, may also store database data, such as data in the row store 262 or the column store 264 of FIG. 2.

A computing system 3500 may have additional features. For example, the computing system 3500 includes storage 3540 (such as for storing persisted data 272 of FIG. 2), one or more input devices 3550, one or more output devices 3560, and one or more communication connections 3570. An interconnection mechanism (not shown) such as a bus, controller, or network interconnects the components of the computing system 3500. Typically, operating system software (not shown) provides an operating environment for other software executing in the computing system 3500, and coordinates activities of the components of the computing system 3500.

The tangible storage 3540 may be removable or non-removable, and includes magnetic disks, magnetic tapes or cassettes, CD-ROMs, DVDs, or any other medium which can be used to store information in a non-transitory way and which can be accessed within the computing system 3500. The storage 3540 stores instructions for the software 3580 implementing one or more innovations described herein.

The input device(s) 3550 may be a touch input device such as a keyboard, mouse, pen, or trackball, a voice input device, a scanning device, or another device that provides input to the computing system 3500. The output device(s) 3560 may be a display, printer, speaker, CD-writer, or another device that provides output from the computing system 3500.

The communication connection(s) 3570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 19—Cloud Computing Environment

Figure 36:
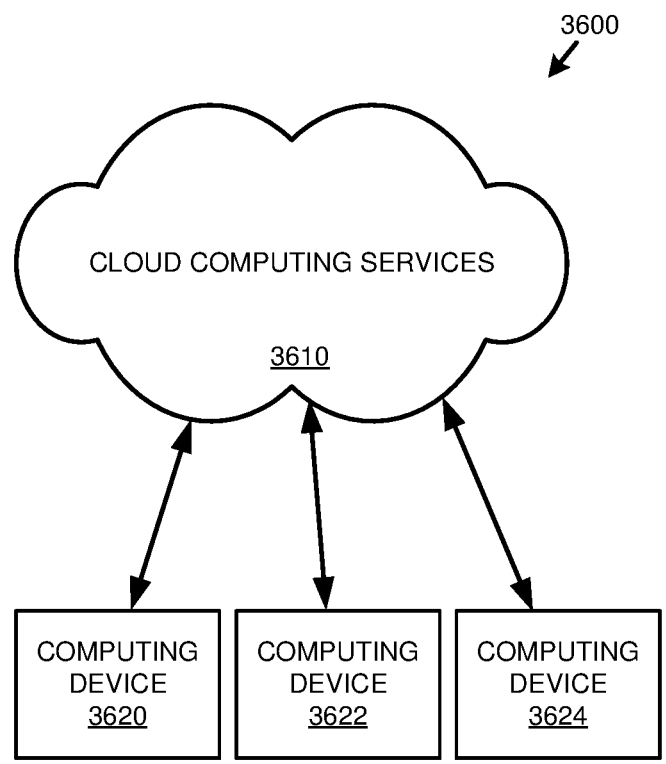
FIG. 36 is an example cloud computing environment that can be used in conjunction with the technologies described herein.

FIG. 36 depicts an example cloud computing environment 3600 in which the described technologies can be implemented. The cloud computing environment 3600 comprises cloud computing services 3610. The cloud computing services 3610 can comprise various types of cloud computing resources, such as computer servers, data storage repositories, networking resources, etc. The cloud computing services 3610 can be centrally located (e.g., provided by a data center of a business or organization) or distributed (e.g., provided by various computing resources located at different locations, such as different data centers and/or located in different cities or countries).

The cloud computing services 3610 are utilized by various types of computing devices (e.g., client computing devices), such as computing devices 3620, 3622, and 3624. For example, the computing devices (e.g., 3620, 3622, and 3624) can be computers (e.g., desktop or laptop computers), mobile devices (e.g., tablet computers or smart phones), or other types of computing devices. For example, the computing devices (e.g., 3620, 3622, and 3624) can utilize the cloud computing services 3610 to perform computing operators (e.g., data processing, data storage, and the like).

Example 20—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 35, computer-readable storage media include memory 3520 and 3525, and storage 3540. The term computer-readable storage media does not include signals and carrier waves. In addition, the term computer-readable storage media does not include communication connections (e.g., 3570).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform operations for preprocessing a data set, the operations comprising:
    for a first record in the data set, having one or more fields, generating a first record hash value, wherein the generating comprises:
        generating a first field hash value for a first field in the first record via a hash function,
        generating a second field hash value for a second field in the first record via the hash function,
        adding the first field hash value and the second field hash value together, and
        generating the first record hash value based on the added first field hash value and the second field hash value via the hash function;
    for a second record in the data set, having one or more other fields, generating a second record hash value, wherein the generating comprises:
        generating a first other field hash value for a first other field in the second record via the hash function,
        generating a second other field hash value for a second other field in the second record via the hash function,
        adding the first other field hash value and the second other field hash value together, and
        generating the second record hash value based on the added first other field hash value and the second other field hash value via the hash function;
    adding the first record hash value and the second record hash value together; and,
    generating a total hash value for the data set based on the added first record hash value and the second record hash value via the hash function.

generating a second total hash value for a second data set following the same process as for generating the total hash value for the data set; and,
    comparing the second total hash value to the total hash value to determine equivalency of the second data set to the data set.

2. The one or more non-transitory computer-readable storage media of claim 1, wherein at least a portion of non-deterministic data of the one or more fields or the one or more other fields is excluded during hashing.

3. The one or more non-transitory computer-readable storage media of claim 1, wherein the data set comprises the results from executing a set of queries at a first database system and the second data set comprises the results from executing the set of queries at a second database system, and further wherein the comparing the second total hash value to the total hash value determines if the first database system returns the same results as the second database system for the set of queries.

4. The one or more non-transitory computer-readable storage media of claim 3, further comprising:
    providing a report of database system equivalency between the first database system and the second database system based on the compared second total hash value and total hash value.

5. The one or more non-transitory computer-readable storage media of claim 1, further comprising:
    receiving a database query for the first data set;
    analyzing the database query to determine a query type;
    setting a classification flag for the database query based on the determined query type; and,
    storing the database query in the first data set, wherein storing the database query comprises storing results of the database query and the classification flag.

6. The one or more non-transitory computer-readable storage media of claim 5, wherein the total hash value is generated based on the classification flag.

7. A computing system, the computing system comprising:
    a memory;
    one or more processing units coupled to the memory; and
    one or more non-transitory computer readable storage media storing instructions that, when loaded into the memory, cause the one or more processing units to perform operations for:
    receiving a database query for a first data set;
    analyzing the database query to determine a query type;
    setting a classification flag for the database query based on the determined query type;
    storing the database query in the first data set, wherein storing the database query comprises storing query results from executing the query at a first database and the classification flag;
    based on the classification flag, generating a first total hash value for the first data set, wherein generating the first total hash value comprises:
        for a first record in the first data set, having one or more fields, generating a first record hash value, wherein the generating comprises:
            generating a first field hash value for a first field in the first record via a hash function,
            generating a second field hash value for a second field in the first record via the hash function,
            adding the first field hash value and the second field hash value together, and generating the first record hash value based on the added first field hash value and the second field hash value via the hash function;
for a second record in the first data set, having one or more other fields, generating a second record hash value, wherein the generating comprises:
generating a first other field hash value for a first other field in the second record via the hash function,
generating a second other field hash value for the second other field in the second record via the hash function,
adding the first other field hash value and a second other field hash value together, and
generating the second record hash value based on the added first other field hash value and the second other field hash value via the hash function;
adding the first record hash value and the second record hash value together;
generating the first total hash value for the first data set based on the added first record hash value and the second record hash value via the hash function;
based on the classification flag in the first data set, executing the database query in a second database to obtain a second data set;
generating a second total hash value for the second data set following the same process as for generating the first total hash value for the first data set; and,
comparing the second total hash value to the first total hash value to determine equivalency of the second data set to the first data set.

8. The system of claim 7, further comprising:
providing a report of database system equivalency between a first database system housing the first database and a second database system housing the second database based on the compared second total hash value and total hash value.

9. The system of claim 7, wherein the query type comprises one of monitoring type, system type, non-deterministic function type, or non-primary key search type.

10. The system of claim 9, wherein the classification flag indicates a potential failure type query when the query type is one of monitoring type, system type, non-deterministic function type, or non-primary key search type.

11. A method, implemented in a computing device comprise at least one processor and at least one memory coupled to the at least one processor, the method comprising:
for a first record in the data set, having one or more fields, generating a first record hash value, wherein the generating comprises:
generating a first field hash value for a first field in the first record via a hash function,
generating a second field hash value for a second field in the first record via the hash function,
adding the first field hash value and the second field hash value together, and
generating the first record hash value based on the added first field hash value and the second field hash value via the hash function;
for a second record in the data set, having one or more other fields, generating a second record hash value, wherein the generating comprises:
generating a first other field hash value for a first other field in the second record via the hash function,
generating a second other field hash value for a second other field in the second record via the hash function,
adding the first other field hash value and the second other field hash value together, and
generating the second record hash value based on the added first other field hash value and the second other field hash value via the hash function;
adding the first record hash value and the second record hash value together; and,
generating a total hash value for the data set based on the added first record hash value and the second record hash value via the hash function;
generating a second total hash value for a second data set following the same process as for generating the total hash value for the data set; and,
comparing the second total hash value to the total hash value to determine equivalency of the second data set to the data set.

12. The method of claim 11, wherein at least a portion of non-deterministic data of the one or more fields or the one or more other fields is excluded during hashing.

13. The method of claim 11, wherein the data set comprises the results from executing a set of queries at a first database system and the second data set comprises the results from executing the set of queries at a second database system, and further wherein the comparing the second total hash value to the total hash value determines if the first database system returns the same results as the second database system for the set of queries.

14. The method of claim 13, further comprising:
providing a report of database system equivalency between the first database system and the second database system based on the compared second total hash value and total hash value.

15. The method of claim 11, further comprising:
receiving a database query for the first data set;
analyzing the database query to determine a query type;
setting a classification flag for the database query based on the determined query type; and,
storing the database query in the first data set, wherein storing the database query comprises storing results of the database query and the classification flag.

16. The method of claim 15, wherein the total hash value is generated based on the classification flag.

17. The method of claim 15, wherein the query type comprises one of monitoring type, system type, non-deterministic function type, or non-primary key search type.

18. The method of claim 15, wherein the classification flag indicates a potential failure type query when the query type is one of monitoring type, system type, non-deterministic function type, or non-primary key search type.

* * * * *